United States Patent
Subasic et al.

(10) Patent No.: US 12,366,650 B2
(45) Date of Patent: Jul. 22, 2025

(54) METHOD AND SYSTEM FOR HIGH-INTEGRITY VEHICLE LOCALIZATION

(71) Applicant: Hitachi Rail GTS Canada Inc., Toronto (CA)

(72) Inventors: Bojan Subasic, Toronto (CA); Alon Green, Toronto (CA); Walter Kinio, Toronto (CA); Marco De Thomasis, Toronto (CA); David Beach, Toronto (CA)

(73) Assignee: Hitachi Rail GTS Canada Inc., Toronto (CA)

( * ) Notice: Subject to any disclaimer, the term of this patent is extended or adjusted under 35 U.S.C. 154(b) by 363 days.

(21) Appl. No.: 17/564,964

(22) Filed: Dec. 29, 2021

(65) Prior Publication Data

US 2022/0206136 A1 Jun. 30, 2022

Related U.S. Application Data

(60) Provisional application No. 63/132,755, filed on Dec. 31, 2020, provisional application No. 63/173,339, filed on Apr. 9, 2021.

(51) Int. Cl.
*G01S 13/86* (2006.01)
*G01S 7/41* (2006.01)
*G01S 13/74* (2006.01)

(52) U.S. Cl.
CPC ............... *G01S 13/86* (2013.01); *G01S 7/411* (2013.01); *G01S 13/74* (2013.01)

(58) Field of Classification Search
None
See application file for complete search history.

(56) References Cited

U.S. PATENT DOCUMENTS

| 6,348,889 | B1 | 2/2002 | Ashihara et al. |
| 7,420,501 | B2 | 9/2008 | Perl |
| 8,432,309 | B2 | 4/2013 | MacDonald et al. |
| 9,793,602 | B2 | 10/2017 | Aminzadeh et al. |

(Continued)

FOREIGN PATENT DOCUMENTS

| CA | 3120502 A1 | 6/2020 | |
| CN | 109490874 A | * 3/2019 | ............. G01S 13/08 |

(Continued)

OTHER PUBLICATIONS

The extended European search report issued by the European Patent Office on Nov. 26, 2024, which corresponds to European Patent Application No. 21914846.7-1201 and is related to U.S. Appl. No. 17/564,964.

(Continued)

*Primary Examiner* — Vladimir Magloire
*Assistant Examiner* — Brandon James Henson
(74) *Attorney, Agent, or Firm* — Studebaker Brackett PLLC

(57) ABSTRACT

Embodiments of a method of locating a guideway mounted vehicle are disclosed. In one embodiment, a communication signal is transmitted to a wayside communication device. A range estimation is obtained based on the communication signal. A radar signal is transmitted to at least one reflector. An accuracy of the range estimation is increased based on the radar signal.

31 Claims, 26 Drawing Sheets

(56) References Cited

U.S. PATENT DOCUMENTS

| | | | |
|---|---|---|---|
| 10,270,423 B2 | 4/2019 | Wall | |
| 10,804,601 B2 | 10/2020 | Bennett | |
| 10,965,388 B2 * | 3/2021 | Patel | H04B 17/27 |
| 2003/0128153 A1 * | 7/2003 | Paradie | G01S 13/46 |
| | | | 342/72 |
| 2014/0333482 A1 * | 11/2014 | Singh | G01S 5/14 |
| | | | 342/463 |
| 2016/0139259 A1 * | 5/2016 | Rappaport | G01S 13/0209 |
| | | | 342/21 |
| 2016/0334511 A1 * | 11/2016 | Ling | G01S 13/931 |
| 2017/0133739 A1 * | 5/2017 | Tallon | G01S 19/35 |
| 2017/0276482 A1 * | 9/2017 | Sane | G01C 15/002 |
| 2019/0195998 A1 | 6/2019 | Campbell | |
| 2019/0243378 A1 | 8/2019 | Satyavolu | |
| 2019/0261262 A1 * | 8/2019 | Stiles | H04B 10/1123 |
| 2020/0070860 A1 * | 3/2020 | Green | B61L 25/021 |
| 2021/0364593 A1 * | 11/2021 | Fellhauer | G01S 5/0273 |

FOREIGN PATENT DOCUMENTS

| | | |
|---|---|---|
| CN | 111722632 A | 9/2020 |
| EP | 2902798 A1 | 8/2015 |
| EP | 3454079 A1 | 3/2019 |
| EP | 3950462 A1 | 2/2022 |
| JP | 2001187573 | 7/2001 |
| WO | 2015/043974 A1 | 4/2015 |
| WO | WO-2015114313 A1 * | 8/2015 ............... G01S 3/48 |
| WO | WO2017/065678 | 4/2017 |
| WO | 2018105225 A1 | 6/2018 |
| WO | WO-2018158711 A1 * | 9/2018 .......... B61L 15/0054 |
| WO | 2019/154992 A1 | 8/2019 |

OTHER PUBLICATIONS

"Communications on the Move (COTM) for Railways", Hughes Network Systems, LLC, Jul. 2014, pp. 1-8, https://www.hughes.com/sites/hughes.com/files/2017-04/Comms-on-the-Move-Railways_H51432_HR_07-14-141.pdf.

Zhou et al., "Filter-Antenna Consisting of Conical FSS Radome and Monopole Antenna", IEEE Transactions on Antennas and Propagation, Jun. 201, pp. 3040-3045, https://www.researchgate.net/profile/Jiafu_Wang2/publication/241638370_Filter-Antenna_Consisting_of_Conical_FSS_Radome_and_Monopole_Antenna/links/547aea9d0cf293e2da2b788f/Filter-Antenna-Consisting-of-Conical-FSS-Radome-and-Monopole-Antenna.pdf.

Karalar et al., Tufan C., "An RF ToF Based Ranging Implementation for Sensor Networks," 2006 IEEE International Conference on Communications, 2006, pp. 3347-3352.

International Search Report and Written Opinion issued in corresponding International Application No. PCT/IB2021/062441, dated Apr. 26, 2022, pp. 1-12, Canadian Intellectual Property Office, Quebec, Canada.

* cited by examiner

METHOD AND SYSTEM FOR HIGH-INTEGRITY VEHICLE LOCALIZATION

PRIORITY CLAIM

The instant application is a U.S. non-provisional patent application that claims priority to U.S. Provisional Application No. 63/132,755, filed Dec. 31, 2020, and claims priority to Provisional Application No. 63/173,339, filed Apr. 9, 2021, the entire contents of which are incorporated by reference herein.

BACKGROUND

Vehicles that travel over a wide variety of locations and environments face challenges: determining the current location of the vehicle, tracking the location of the vehicle as the vehicle moves, and/or accurately determining the speed of the vehicle. Some locations are not suitable for conventional vehicle localization and speed determination systems or methods.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
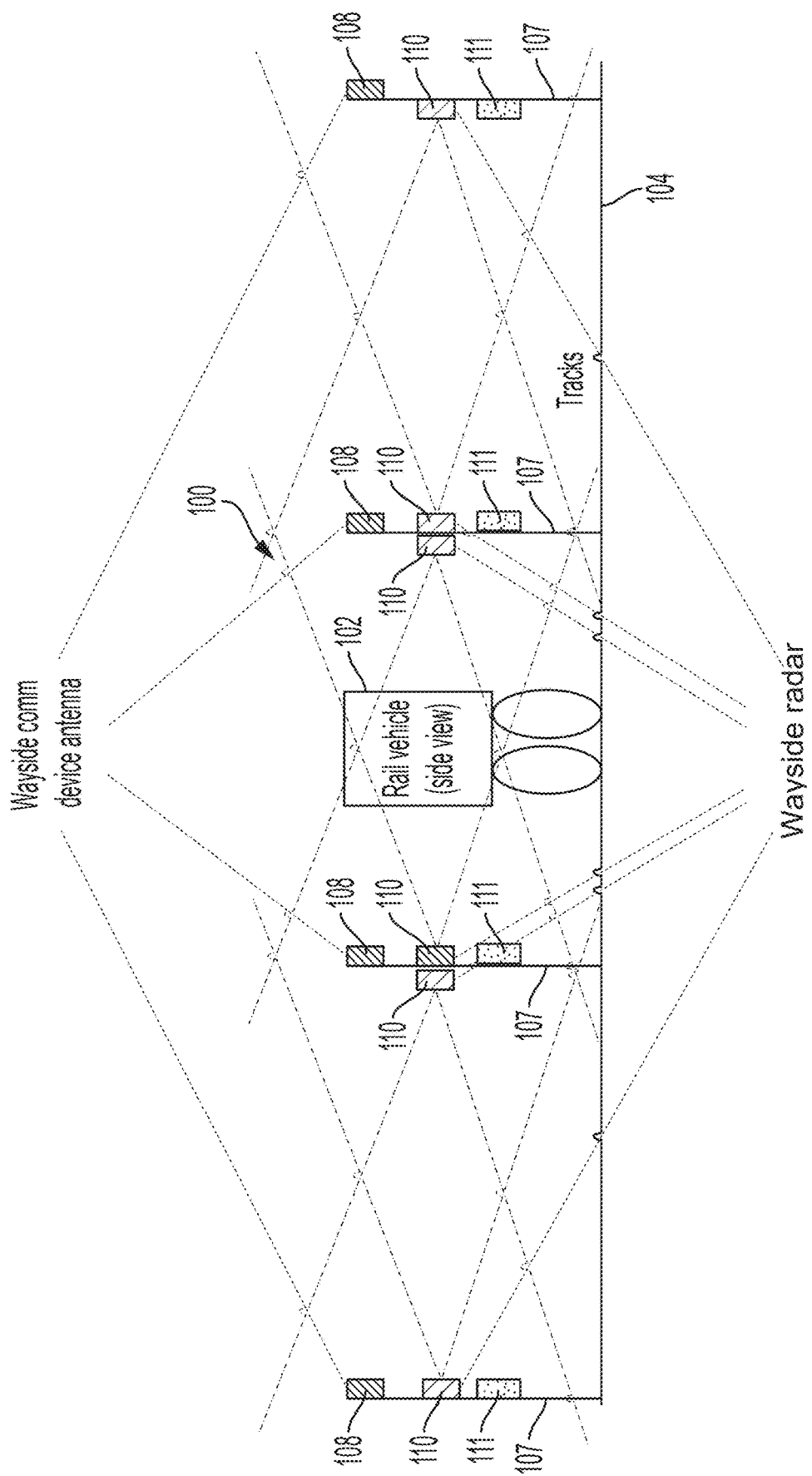
FIG. 1A is a side view of wayside components of a high-integrity vehicle localization system, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments of methods of localizing a guideway-mounted vehicle are disclosed. In some embodiments, one or more on-board communication devices are on a guideway-mounted vehicle. At various locations along a wayside of the guideway, one or more wayside communication devices are placed at each of the locations. One or more communication signals are transmitted between the one or more on-board communication devices and wayside communication devices. The one or more communication signals are used to determine estimate of the range between the guideway-mounted vehicle and the wayside communication device. In some embodiments, the range estimate is sufficient to localize the vehicle within a few dozen meters. To increase the accuracy of the range estimate, one or more radar signals are transmitted to a reflector associated with the wayside communication device. The accuracy of the range estimate is increased based on the radar signal return.

In some embodiments, the range resolution of the system using electromagnetic signals to determine a range is given by the speed of light c divided by two times the bandwidth. The higher the bandwidth the better the resolution and therefore the better the accuracy. In some embodiments, communication devices have smaller bandwidth than radars, i.e., radar range measurement accuracy is better than range measurement based on communication system. In some embodiments, the accuracy of the range estimate is increased because of the inherent increase in resolution that results from a radar measurement with higher bandwidth. In some embodiments, the accuracy of the range estimate is increased because both the radar measurement and the measurement made using the communication devices are fed into a fusion algorithm. In some embodiments, the accuracy of the range estimate is increased both because the radar measurement is more accurate and because the radar measurement and the measurement made using the communication devices are fed into a fusion algorithm.

FIG. 1A depicts a side view of wayside components of a high-integrity vehicle localization system 100, in accordance with some embodiments. A guideway-mounted vehicle 102 moves along a guideway 104 such as a track, rail, monorail, road, or the like. The vehicle 102 is a train, subway, monorail, or another path-constrained vehicle, including automobiles or buses that have been configured to move along a constrained path.

Various locations 107 have been set up along a wayside of the guideway 104. In FIG. 1A, at least one wayside communication device 108, at least one reflector 110, and at least one wayside radar system 111 are located at each location 107. In some embodiments, the wayside communication device(s) 108, reflector(s) 110, or the wayside radar system (s) 111 are not included at one or more of the locations 107. In at least one embodiment, one or more the locations 107 include the wayside communication device 108 and the reflector 110, and lack the wayside radar system 111. As explained in further detail below, in some embodiments, a communication signal is transmitted to a wayside communication device 108 as the vehicle 102 is approaching a location 107. In some embodiments, a communication signal is transmitted from the wayside communication device 108 as the vehicle is approaching a location 107. A vehicle location estimation is obtained based on the communication signal received or transmitted by the wayside communication device 108. In some embodiments, the locations 107 are at regularly spaced intervals along the wayside of the guideway 104. In other embodiments, the locations 107 are not at regularly spaced intervals along the wayside of the guideway 104.

In some embodiments, the wayside radar system 111 is configured to transmit a radar signal as the vehicle 102 is approaching a location. The accuracy of the vehicle location estimation is increased based on the radar signal. For example, in some embodiments, a vehicle location estimated obtained with the radar signal is inherently more accurate than a vehicle location estimation obtained with the communication signal. Thus, the vehicle location estimation obtained with the radar replaces the vehicle location estimation obtained with the communication signal. In other embodiments, both the vehicle location estimation obtained with the communication signal and the vehicle location estimation obtained with the radar signal are input into a fusion algorithm. The fusion algorithm computes a third and more accurate vehicle location estimation based on the vehicle location estimation obtained with the radar signal and the vehicle location estimation obtained with the communication signal.

In some embodiments, both the wayside radar system 111 and the wayside communication device 108 used to obtain a vehicle location estimation are 'line-of sight' devices. In some embodiments, the wayside radar system 111 and the wayside communication device 108 are not short range. In some embodiments, the wayside communication devices 108 are anywhere from 0 to a few hundred meters from the guideway 104. In some open environments, the wayside communication device 108 are a few meters from the center line of the guideway 104 (e.g., 10 to 20 m). In some closed environments (e.g., tunnels), the wayside communication devices 108 are installed on a wall directly adjacent to the guideway 104.

In some embodiments, to obtain a vehicle location estimation based on the communication signal, a range estimation, an angle of departure, and an angle of arrival are measured based on the communication signal. The range estimation is based on a correlation between the signal-to-noise ratio and the range between an onboard communication device and the wayside communication device. The correlation is expected to behave in accordance with Poisson's distribution. In some embodiments, the range estimation based on the communication signal has an error range of a few meters. The range estimation allows for determination of the vehicle location estimation of the vehicle 102 until a next more accurate localization can be obtained. In some embodiments, an angle of departure and an angle of arrival are also measured based on the communication signal.

In some embodiments, the wayside communication signal is modulated to include a unique identification (ID). Once the unique ID is obtained, the unique ID is used to obtain a location data. In some embodiments, the location data identifies a location of the wayside communication device 108 in a geographic coordinate system (e.g., latitude, longitude). Based on the range estimation, the angle of arrival (AoA), and the angle of departure (AoD), a vehicle position of the vehicle 102 is obtained relative to the wayside communication device 108. Once the location data is obtained, a vehicle location estimation is computed that identifies a location of the vehicle 102 in the geographic coordinate system.

In some embodiments, the wayside radar signal is reflected from one or more reflective surface of the vehicle 102. As such, the reflected wayside radar signal includes a unique radar signature that is used to detect that the vehicle 102 is approaching/leaving the location 107. In some embodiments, a range estimation, an AoA, and an AoD is obtained based on the wayside radar signal. In some embodiments, the location data identifies a location of the wayside radar system 111 or the wayside communication device 108 in a geographic coordinate system (e.g., latitude, longitude). Based on the range estimation, the angle of arrival (AoA), and the angle of departure (AoD), a vehicle position of the vehicle 102 is obtained relative to the wayside communication device 108 and/or the wayside radar system 111. Once the location data is obtained, a vehicle location estimation is computed that identifies a location of the vehicle 102 in the geographic coordinate system.

In some embodiments, an on-board radar system is mounted to the vehicle 102, as explained in further detail below. A radar signal is then transmitted to at least one reflector 110 at the location 107. The reflectors 110 are objects designed to reflect radar signals or similarly strongly reflecting objects with high RCS. An accuracy of the range estimation is increased based on the radar signal return. In some embodiments, the reflectors 110 are built and installed in such a way that their spatial separation and RCS as an array results at a unique signature such that the location 107 is identified based on the unique signature of the reflected radar signals (also referred to herein as a radar signal return). In some embodiments, the location of the vehicle is obtained based on a range estimation (e.g., through time of flight (TOF) measurements) and angle of arrival/departure of the radar signal from the vehicle 102 to the reflectors and back to the vehicle, the reflectors RCS and spatial position.

In some embodiments, both the (on-board/wayside) radars and the (on-board/wayside) communication devices are RF devices. A radar is designed to measure the spatial location of objects relative to the radar's local coordinate system and also to measure the radial speed of these objects. The (on-board/wayside) communication devices are designed to wirelessly transmit data between nodes. However, the (on-board/wayside) communication devices are also used to determine the location of objects. In some embodiments, the (on-board/wayside) communication devices make range estimations with less accuracy than radars due to bandwidth constraints, the number of antennas used by the communication device and the arrangement of the communication devices. However, in some embodiments, the (on-board/wayside) communication devices and the radars utilize the same amount of bandwidth and thus are capable of obtaining range estimations with similar amounts of accuracy. The accuracy of the range estimations is increased by feeding both the range and angle of arrival/departure estimations of the radars and the communication devices into a fusion algorithm, as explained in further detail below. In some embodiments, the communications signals are in a frequency range of 2.4 GHz-10 GHz. In some embodiments, the communication signals are WiFi signals in a frequency band at or near 5 GHz. In some embodiments, the communication signals are 802.11 signals, such as Long-Term Evolution LTE signals and 5G signals. 5G and LTE signals are in frequency ranges from 450 MHz to 7 GHz. In some embodiments, the 5G and LTE signals are in frequency bands around 60 GHz band. In some embodiments, the radar signals are generated by automotive radars and have frequency ranges between 76-81 GHz. In some embodiments, the (on-board/wayside) radar systems and the (on-board/wayside) communication devices differ in terms of range resolution due to bandwidth constraints, the number of antennas, and the spatial resolution (azimuth and elevation angles) of the radar systems and the (on-board/wayside) communication devices.

Figure 1B:
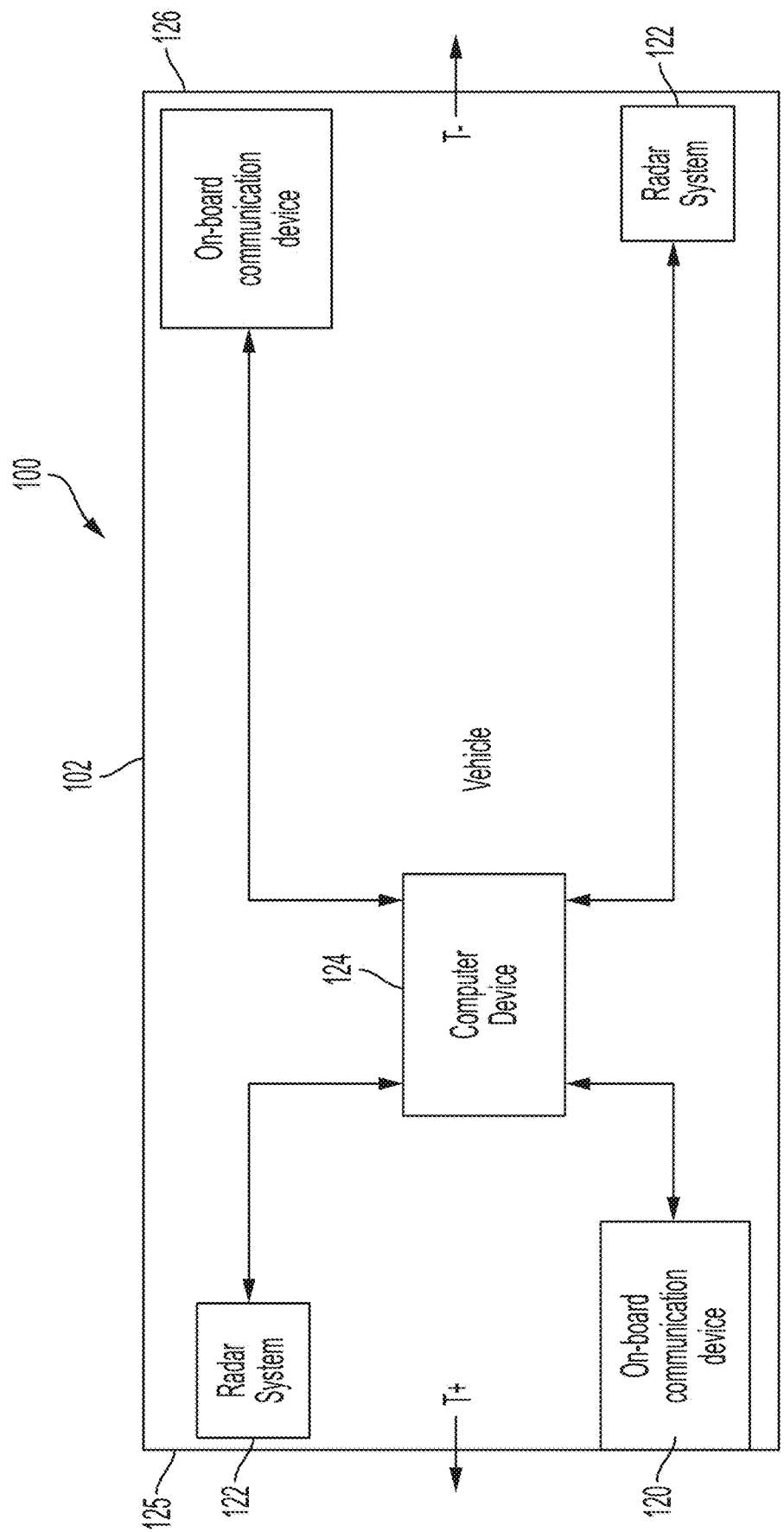
FIG. 1B is a top view of on-board components of a high-integrity vehicle localization system, in accordance with some embodiments.

FIG. 1B is a top view of on-board components of a high-integrity vehicle localization system 100, in accordance with some embodiments.

The on-board components of the high-integrity vehicle localization system 100 are the on board components on or in the vehicle 102. The high-integrity vehicle localization system 100 includes one or more on-board communication devices 120 and one or more radar systems 122. In FIG. 1B, one of the on-board communication devices 120 is located at one end 125 of the vehicle 102 and another one of the on-board communication devices 120 is located at another end 126 of the vehicle 102. The end 125 is opposite the end 126. Furthermore, both ends are normal to the direction of travel (T+, T−) of the vehicle 102.

Each of the on-board communication devices 120 and each of the radar systems 122 is communicatively associated with a computer device 124. The computer device 124 is configured to operate the high-integrity vehicle localization system 100 in order to determine high-accuracy location data that identifies the location of the vehicle 102.

The on-board communication devices 120 are configured to transmit or receive a communication signal to or from the wayside communication device 108 (See FIG. 1A). In some embodiments, the on-board communication device 120 transmits a communication signal to the wayside communication device 108. The wayside communication device 108 then transmits data back to the on-board communication device 120. A range between the on-board communication device 120 and the wayside communication device 108 is estimated based on either the transmitted communication or with measurements based on the communication signal in order to determine the range estimation. In some embodiments, the wayside communication device 108 transmits the communication signal and the on-board communication device 120 is configured to make measurements (e.g., signal-to-noise ratio measurements) to obtain the range estimation. In some embodiments, the wayside communication device 108 transmits another communication signal as a reply to the communication signal transmitted by the on-board communication device 120. The range estimation is based on an amount of time it takes for the communication signal generated by the on-board communication device 120 to reach the wayside communication device 108 and back to the on-board communication device 120. In some embodiments, the on-board communication device 120 transmits the communication signal and the wayside communication device 108 is configured to make measurements (e.g., signal-to-noise ratio measurements) to obtain the range estimation. In some embodiments, the on-board communication device 120 transmits another communication signal as a reply to the communication signal transmitted by the wayside communication device 108. The range estimation is based on an amount of time it takes for the communication signal generated by the wayside communication device 108 to reach the on-board communication device 120 and back to the wayside communication device 108. The range is estimated independently by the on-board and wayside communication devices and each is aware of the range estimated by its peer. In some embodiments, a range estimation, an AoA, and an AoD is obtained based on the on-board communication signal. Based on the range estimation, the AoA, and the AoD, a vehicle position of the vehicle 102 is obtained relative to the wayside communication device 108 and/or the wayside radar system 111. Once location data related to the location 107 is obtained, a vehicle location estimation is computed that identifies a location of the vehicle 102 in the geographic coordinate system.

In some embodiments, the wayside communication device 108 is used as a landmark and transmits a unique ID (e.g., wayside radio n) where the range estimation of the wayside communication device 108 is determined based on a communication signal that carries a unique ID. Location data identifying a location of the wayside communication device 108 is then looked up (for example, in a database or a stored table) based on the unique ID. In some embodiments, a range estimate from the wayside communication device 108 to the vehicle 102 is determined based on the measured range between the vehicle's on-board communication device 120 and the wayside communication device 108 using signal-to-noise ratio range estimation techniques (e.g. Received Signal Strength Indicator (RSSI)). A location of the vehicle 102 is estimated based on the location data that identifies the location of the wayside communication device 108 and the range estimate from the wayside communication. In some embodiments, the signal-to-noise ratio behaves according to Poisson distribution as a function of the range between the on-board communication device 120 and the wayside communication device 108. In some embodiments, this range estimate is low precision (e.g., dozens of meters). In some embodiments, the wayside communication device 108 and the on-board communication device 120 are configured to generate a range estimation when using the communication signal to identify a region the reflectors 110 associated with the wayside communication device 108 at a particular location 107. The wayside communication devices 108 and the on-board communication devices 120 generate the communication signal in accordance with 802.11 communication protocols including Wi-Fi, LTE, 5G, Bluetooth or UWB protocols. In at least some embodiments, communication protocols other than 802.11 communication protocols are used for the communication signal.

In some embodiments, the region with the reflectors 110 is determined by the association between the antenna of the wayside communication device 108 and the reflectors 110. The Received Signal Strength Indicator (RSSI) creates a window or a region where the reflectors 110 are expected to reside. In some embodiments, the window/region is narrowed by fine measurement round trip time (FM RTT). In some embodiments, more accurate measurements are made by a radar system 122 where the arrangement of the reflectors 110 is classified based on the radar cross section (RCS) of the reflectors 110.

In some embodiments, the range estimation is obtained using TOF range estimation techniques (e.g., fine measurement round trip time (FM RTT)) which determines the range based on the measured TOF and the known value of the speed of light. In some embodiments, the range estimation is obtained using angle of arrival and/or angle of departure measurements.

Reflectors 110 are of any suitable shape. In some embodiments, the reflectors 110 include reflectors that are cubic trihedral retroreflectors, cubic dihedral retroreflectors, triangular trihedral retroreflectors, triangular dihedral retroreflectors, half sphere (dish shape) retroreflectors, or another shape usable in conjunction with radar systems.

In some embodiments, the reflectors 110 are installed nearby the wayside communication device 108, the antenna of the wayside communication device 108, and/or an antenna array of the wayside communication device 108. In some embodiments, the reflector 110 is a radome that at least partially encapsulates an antenna of the wayside communication device 108. In some embodiments, the reflectors 110 at each location 107 are formed as an array of reflectors 110. In some embodiments, the array of reflectors 110 include reflectors 110 of different shapes and/or different sizes. The reflector shape and size influence the reflector RCS measured by the radar which is a key attribute in the reflectors classification algorithm.

In some embodiments, the array of reflectors 110 are configured in a geometrical arrangement creating a unique or semi-unique radio frequency (RF) signature, in terms of RCS, for a radar system. In some embodiments, the geometrical arrangement includes reflectors at different heights above a ground plane with respect to the wayside communication device antenna(s) at a particular location. In some embodiments, the geometrical arrangement includes reflectors 110 at different longitudinal positions (position along guideway 104) with respect to the wayside communication device antenna or antennas array of the wayside communication device 108 at a particular location 107. In some embodiments, the geometrical arrangement includes reflectors 110 at different lateral positions (perpendicular to the predefined guideway 104) with respect to wayside communication device antenna or antennas array of the wayside communication device 108 at a particular location 107.

In some embodiments, multiple vehicle location estimations are obtained from the multiple wayside communication devices 108 and multiple on-board communication devices 120. In some embodiments, there is a one to one correspondence between on-board communication devices 120 and wayside communication devices 108 at each location 107. In other words, each on-board communication device 120 obtains a range estimation with a different and a particular one of the wayside communication devices 108 at a particular location. In some embodiments, each of the on-board communication devices 120 obtains vehicle location estimations with every one of the wayside communication devices 108 at each location 107. In some embodiments, each of the on-board communication devices 120 obtains a vehicle location estimation with some but not all of the wayside communication devices 108 at each location 107. In some embodiments, the various vehicle location estimations are fused using the fusion algorithm to obtain a more accurate vehicle location estimation.

In some embodiments, the vehicle 102 includes a single on-board communication device 120 and each location 107 includes multiple wayside communication devices 108. The single on-board communication device 120 is configured to obtain a vehicle location estimation from each of the wayside communication devices 108 at each location 107. In some embodiments, each vehicle 102 includes multiple on-board communication devices 120 and each location 107 includes a single wayside communication device 108. The multiple on-board communication devices 120 are each configured to obtain a vehicle location estimation from the single wayside communication device 108. In some embodiments, the vehicle 102 includes a single on-board communication device 120 and each location 107 includes a single wayside communication device 108. The single on-board communication device 120 is configured to obtain a vehicle location estimation from the single wayside communication device 108. These and other configurations are within the scope of this disclosure.

The vehicle location estimation obtained with the communication signal gives adequate localization for the vehicle 102 until its accuracy can be increased with the radar systems 111, 122. As mentioned above, the radar systems 111, 122 are used to transmit radar signals to increase the accuracy of the range and angular position (AoA/AoD) estimation based on the radar signal return. In some embodiments, an array of reflectors of different sizes and/or positions are configured to reflect the radar signal from the on-board radar system 122 with a predetermined radar cross section (RCS) (or the equivalent intensity property if LiDAR are used) with respect to each wayside communication device antenna or antenna array of the wayside communication device 108. The predefined RCS is stored in a database along with highly accurate location data identifying the particular location 107 associated with the predefined RCS. The highly accurate location data is used in conjunction with one or more TOF and AoA/AoD measurements from the reflectors 110 to obtain a more accurate range estimation for the vehicle 102.

In some embodiments, a wayside radar system 111 and/or a radar system 122 includes a Commercial off the Shelf (COTS) three dimensional (3-D) automotive radar system and/or a four dimensional (4-D) imaging radar system. In some embodiments, COTS 3-D radars are configured to measure the range, relative radial Doppler speed (from a radar system's relative reference coordinate system), and angular position of the reflectors 110 within a field of view (FOV) at a particular location 107. In some embodiments, 3-D COTS radar systems have no beam steering capability or very limited beam steering capability. In some embodiments, the angular position of the reflectors 110 is measured only in the horizontal plane (i.e., azimuth angle but no elevation angle).

In some embodiments, 4-D radar systems have good beam steering capability and are operable to generate a point cloud image of the reflectors 110 within the FOV of the 4-D radar system. In some embodiments, the 4-D radar systems are configured to measure the range, relative radial Doppler speed, and angular position to the reflectors 110 within the radar's FOV. In some embodiments, the angular position includes both the azimuth angle and elevation angle relative to the radar system's relative reference coordinate system. In some embodiments, the 4-D radar systems are configured to measure reflected radar signals that provide high performance resolution and highly accurate measurements of the reflectors 110. For example, the 4-D radar system has a range resolution of 10 cm at ranges up to 50 m and 50 cm at ranges greater than 50 m, in some embodiments. In some embodiments, the 4-D radar system has a maximum range of at least 50 m and is some cases have a maximum range greater than 150 m. In some embodiments, the 4-D radar systems have an angular resolution better than 1°. In some embodiments, 4-D radar systems typically have both beam forming and beam steering capabilities. In some embodiments, COTS 3-D radar systems have a range and speed resolution that are similar to 4-D radar systems. However, in some embodiments, COTS 3-D radar systems have an angular resolution that is poorer than 4-D radar systems and are unable to measure an elevation angle. Furthermore, in some embodiments, COTS 3-D radar systems have no beam forming or beam steering capability.

In some embodiments, the wayside radar system 111 and/or the radar system 122 is configured to generate radar signals within a frequency band of 76 GHz to 81 GHz. In some embodiments, the wayside radar system 111 and/or the radar system 122 includes a light detection and ranging (LiDAR) radar system. In some embodiments, the LiDAR radar system is a coherent LiDAR, a non-coherent LIDAR, a mechanical LiDAR, phased-array LiDAR, or a flash LiDAR. In some embodiments, the wayside radar system 111 and/or the radar system 122 configured to include a camera to increase the accuracy of the range estimation.

In some embodiments, the antenna of the wayside communication devices 108 is used in place of a retroreflector array, if the antenna can be detected by the radar system 122, the antenna is reflective in the radar system frequency band and transparent in the communication system frequency band. In some embodiments, the radar system 122 is a Lidar or a camera. In some embodiments, the radar system 122 detects the antenna(s) arrangement of the wayside communication device 108. For example, in some embodiments the radar system 122 is a 4-D radar that detects the wayside communication device antenna or antenna array arrangement. In some embodiments, the radar system 122 does not detect the antennas of the wayside communication device 108. For example, in some embodiments, the radar system 122 is a COTS 3-D radar and does not detect the wayside communication device antenna or antenna array arrangement. In some embodiments, an association is made between the reflectors 110 and the wayside communication device(s) 108. In some embodiments, a range, angle of arrival and angle of departure is measured by the on-board communication device to the wayside communication device. In some embodiments, an associated position of the guideway-mounted vehicle 102 is compared with the ranges, angles of arrival and angles of departure measured by the radar to the reflectors. If the two are within a certain acceptance threshold and the reflector signatures (RCS) matches the expected signatures (based on the wayside communication device location) then association is confirmed and the position is determined. In some embodiments, the reflectors 110 are a frequency selective radome at the antenna of the wayside communication device 108.

In some embodiments, the position of the vehicle 102 relative to the wayside communication device 108 is determined. The range of the vehicle 102 from the wayside communication device 108 is estimated with one or more communication signals based on the RSSI and/or FM RTT range estimation techniques that in some embodiments are augmented by the angle of arrival/angle of departure, and the wayside communication device ID.

Additionally, in some embodiments, an array of the reflector 110 is arranged to reflect a radar signal so that the reflected radar signal has a unique radar signature. The unique radar signature of the reflected radar signal is detected to check if the reflected radar signal RCS matches the reflectors RCS. In some embodiments, the unique radar signature is the unique signature of the reflector array. From this, a stored location of the reflectors is obtained since the unique signature is used to identify the reflectors 110. The location of the vehicle 102 is determined based on the stored location of the stored location of the reflectors 110 (or wayside communication device 108), the range measurements, angle of arrival and angle of departure radar measurements, and the confirmation that the corresponding reflectors signature matches the expected signature.

In some embodiments, a digital version of the unique signature is transmitted to a server to find a match in a database. Once the match is found, the location data associated with the identified reflectors and the position of the train relative to the reflectors is used to identify the location of the vehicle 102. In this manner, location of the wayside communication device is used to identify the location of the reflectors 110 that produce the unique radar signature.

In some embodiments, the vehicle location estimation obtained with the communication signal from the on-board communication device 120, the vehicle location estimation obtained with the communication signal from the wayside communication device 108, the vehicle location estimation obtained with the radar signal from the on-board radar system 122, and/or the vehicle location estimation obtained with the radar signal from the wayside radar system 111 are compared to one another to determine whether differences between the vehicle location estimations are within a defined error range. In some embodiments, the error range is defined by parameters, such as speed and time. In some embodiments, the error range is defined by safety standards, such as EN 50129 and EN 50126. For example, assume that the train is moving at 10 m/sec. Furthermore, assume that the train location is determined by the wayside system at time t1 and then is received at the onboard system at time t2=t1+1 sec. Additionally, assume that the train location is determined by the wayside system at time t3=t1+1.5 sec. In some embodiments, the error range is greater than Err=10 m/sec×1.5 sec+margin where the margin represents the location estimation accuracy.

If the differences between the vehicle location estimations are within the defined error range, the vehicle's location is known with sufficient accuracy so as to be considered with high level of safety integrity (i.e. SIL 4), in some embodiments. If the differences between the vehicle location estimations are not within the defined error range, the vehicle's location is not known with sufficient accuracy so as to be considered with lower, than SIL 4, level of safety integrity, in some embodiments. In some embodiments, specialized safety procedures and precautions are implemented in response determining that the differences between the vehicle location estimations are not within the defined error range.

Figure 1C:
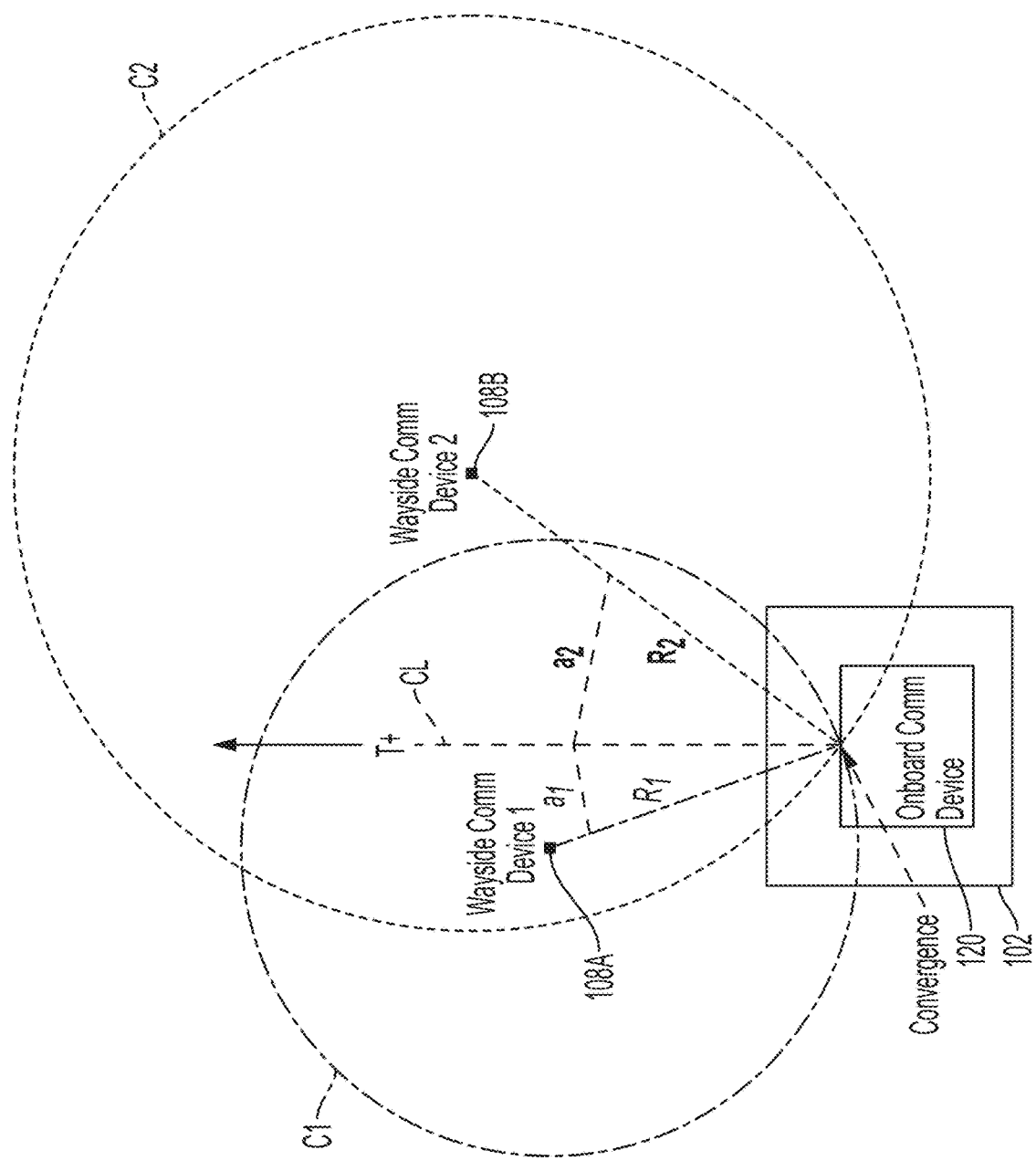
FIG. 1C is a top view of localization methods based on (a) solely range measurements and (b) range measurements and angle of arrival/departure measurements.

FIG. 1C is a block diagram of a guideway-mounted vehicle 102 and two wayside communication devices 108A, 108B.

An on-board communication device 120 is mounted in the vehicle 102. A center line CL of the vehicle 102. The center line CL is parallel with the direction of travel T+. The wayside communication device 108A is on one side of the center line CL while the wayside communication device 108B is on the other side of the center line CL.

FIG. 1C is an illustration of obtaining two range measurements R1 and R2 between the on-board communication device 120 and the wayside communication devices 108A, 108B. The range measurement R1 is to the wayside communication device 108A and the range measurement R2 is to the wayside communication device 108B. One technique for determining the location of the vehicle 102, without angular information regarding the communication signals is by using the two different range measurements R1 and R2 with the wayside communication devices 108A, 108B in separate positions. The circle C1 represents the possible positions of the train knowing only the range R1 from wayside communication device 108A. The circle C2 represents the possible positions of the vehicle 102 knowing only the range R2 from the wayside communication device 108B. The intersection of the two circles C1, C2 thus at the convergence point (marked in FIG. 1C) is the position of the vehicle, assuming that the direction of motion of the vehicle 102 is known. However, the on-board communication device 120 and/or the wayside communication devices 108A, 108B are also configured to measure the position of the train with a single range measurement (either R1 or R2) angular information, such as AoD/AoA, is also measured. In FIG. 1C, the AoD is measured for R1 to be α1 relative to the center line CL. The position of the vehicle 102 is determined knowing both R1 to be α1. The AoD is measured for R2 to be α2 relative to the center line CL. The position of the vehicle 102 is determined knowing both R2 to be α2.

Figure 2:
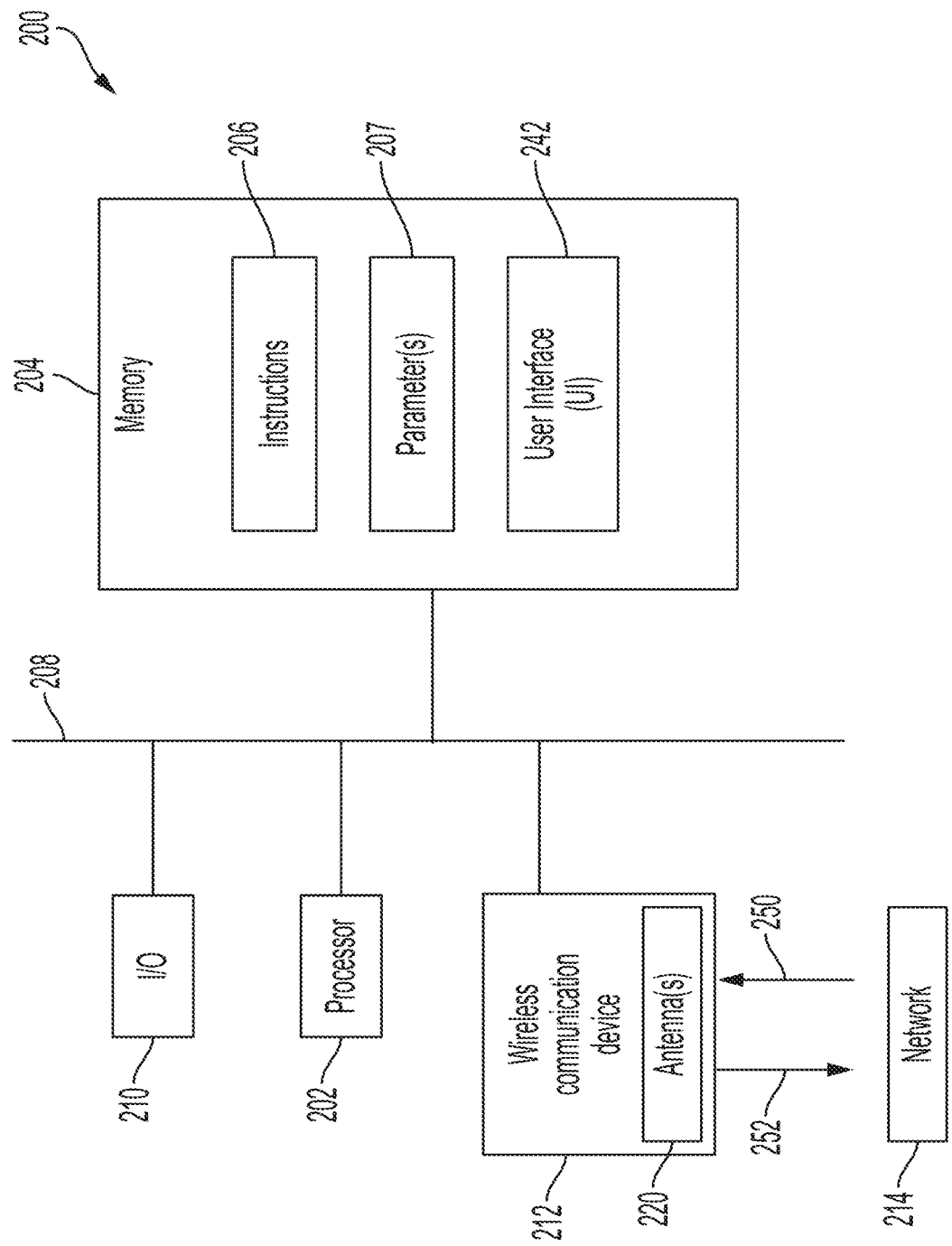
FIG. 2 is a block diagram of a wayside communication device, in accordance with some embodiments.

FIG. 2 is a block diagram of a wayside communication device 200, in accordance with some embodiments.

In some embodiments, each wayside communication device 108 in FIG. 1A has the configuration of the wayside communication device 200 shown in FIG. 2.

In some embodiments, wayside communication device 200 includes a general purpose computing device including a hardware processor 202 and a non-transitory, computer-readable storage medium 204. Computer-readable storage medium 204, amongst other things, is encoded with, i.e., stores, computer program code 206, i.e., a set of executable instructions. Execution of computer program code 206 by hardware processor 202 represents (at least in part) a vehicle localization and speed determination tool which implements a portion or all of the methods described herein in accordance with one or more embodiments (hereinafter, the noted processes and/or methods).

Processor 202 is electrically coupled to computer-readable storage medium 204 via a bus 208. Processor 202 is also electrically coupled to an I/O interface 210 by bus 208. A wireless communication device 212 is also electrically connected to processor 202 via bus 208. Wireless communication device 212 is connected to a network 214, so that processor 202 and computer-readable storage medium 204 are capable of connecting to external elements via network 214. Processor 202 is configured to execute computer program code 206 encoded in computer-readable storage medium 204 in order to cause wayside communication device 200 to be usable for performing a portion or all of the noted processes and/or methods. In one or more embodiments, processor 202 is a central processing unit (CPU), a multi-processor, a distributed processing system, an application specific integrated circuit (ASIC), and/or a suitable processing unit.

In one or more embodiments, computer-readable storage medium 204 is an electronic, magnetic, optical, electromagnetic, infrared, and/or a semiconductor system (or apparatus or device). For example, computer-readable storage medium 204 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 204 includes a compact disk-read only memory (CD-ROM), a compact disk-read/write (CD-R/W), and/or a digital video disc (DVD).

In one or more embodiments, computer-readable storage medium 204 stores computer program code 206 configured to cause wayside communication device 200 to be usable for performing a portion or all of the noted processes and/or methods. In one or more embodiments, computer-readable storage medium 204 also stores information which facilitates performing a portion or all of the noted processes and/or methods. In one or more embodiments, computer-readable storage medium 204 stores library 207 of parameters (e.g., vehicle location estimations, range estimations, location data, signal data, TOF data, angle of arrival, angle of departure) as disclosed herein.

Wayside communication device 200 includes I/O interface 210. I/O interface 210 is coupled to external circuitry. In one or more embodiments, I/O interface 210 includes a keyboard, keypad, mouse, trackball, trackpad, touchscreen, and/or cursor direction keys for communicating information and commands to processor 202.

Wayside communication device 200 also includes wireless communication device 212 coupled to processor 202. Wireless communication device 212 allows wayside communication device 200 to communicate with network 214, to which one or more other computer systems are connected. Wireless communication device 212 includes wireless network interfaces such as BLUETOOTH, WIFI, LTE, 5G, WIMAX, GPRS, or WCDMA. In one or more embodiments, a portion or all of noted processes and/or methods, is implemented in two or more wayside communication devices 200.

Wayside communication device 200 is configured to receive information through I/O interface 210. The information received through I/O interface 210 includes one or more of instructions, data, and/or other parameters for processing by processor 202. The information is transferred to processor 202 via bus 208. Wayside communication device 200 is configured to receive information related to a UI through I/O interface 210. The information is stored in computer-readable storage medium 204 as user interface (UI) 242.

The wireless communication device 212 is configured to receive a communication signal 250 via one or more antennas 220. In some embodiments, the communication signal 250 includes a carrier signal that is modulated with one or more information bearing signals. In some embodiments, the wireless communication device 212 is configured to demodulate the communication signal 250 so that information of the information bearing signal(s) is obtained. In some embodiments, the information of the information bearing signal(s) is transformed into parameters in library 207 that is readable by a computer and stored in the computer-readable storage medium 204.

In some embodiments, the wireless communication device 212 is configured to transmit a communication signal 252 configured to be used to obtain a range and AoA/AoD estimations via one or more antennas 220. In other embodiments, the wireless communication device 212 is configured to receive the communication signal 250 that carries range and AoA/AoD estimations data that indicates a range estimation obtained based on the communication signal 252.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer-readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

Figure 3:
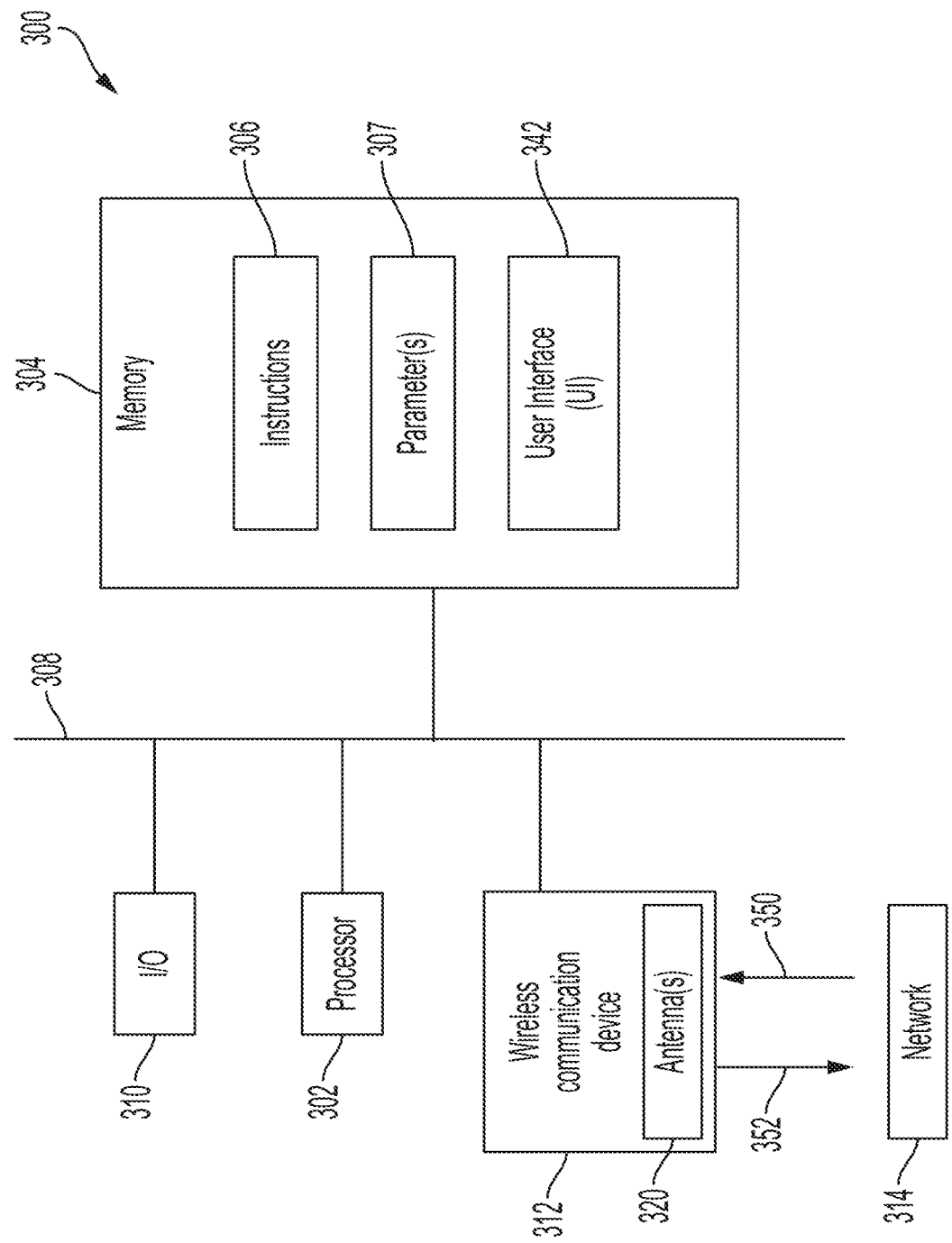
FIG. 3 is a block diagram of an on-board communication device, in accordance with some embodiments.

FIG. 3 is a block diagram of an on-board communication device 300, in accordance with some embodiments.

In some embodiments, each on-board communication device 120 in FIG. 1B has the configuration of the on-board communication device 300 shown in FIG. 3.

In some embodiments, on-board communication device 300 includes a general purpose computing device including a hardware processor 302 and a non-transitory, computer-readable storage medium 304. Computer-readable storage medium 304, amongst other things, is encoded with, i.e., stores, computer program code 306, i.e., a set of executable instructions. Execution of computer program code 306 by hardware processor 302 represents (at least in part) an vehicle localization and speed determination tool which implements a portion or all of the methods described herein in accordance with one or more embodiments (hereinafter, the noted processes and/or methods).

Processor 302 is electrically coupled to computer-readable storage medium 304 via a bus 308. Processor 302 is also electrically coupled to an I/O interface 310 by bus 308. A wireless communication device 312 is also electrically connected to processor 302 via bus 308. Wireless communication device 312 is connected to a network 314, so that processor 302 and computer-readable storage medium 304 are capable of connecting to external elements via network 314. Processor 302 is configured to execute computer program code 306 encoded in computer-readable storage medium 304 in order to cause on-board communication device 300 to be usable for performing a portion or all of the noted processes and/or methods. In one or more embodiments, processor 302 is a central processing unit (CPU), a multi-processor, a distributed processing system, an application specific integrated circuit (ASIC), and/or a suitable processing unit.

In one or more embodiments, computer-readable storage medium 304 is an electronic, magnetic, optical, electromagnetic, infrared, and/or a semiconductor system (or apparatus or device). For example, computer-readable storage medium 304 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 304 includes a compact disk-read only memory (CD-ROM), a compact disk-read/write (CD-R/W), and/or a digital video disc (DVD).

In one or more embodiments, computer-readable storage medium 304 stores computer program code 306 configured to cause on-board communication device 300 to be usable for performing a portion or all of the noted processes and/or methods. In one or more embodiments, computer-readable storage medium 304 also stores information which facilitates performing a portion or all of the noted processes and/or methods. In one or more embodiments, computer-readable storage medium 304 stores library 307 of parameters (e.g. vehicle location estimations, range estimations, location data, signal data, TOF data, angle of arrival, angle of departure) as disclosed herein.

On-board communication device 300 includes I/O interface 310. I/O interface 310 is coupled to external circuitry. In one or more embodiments, I/O interface 310 includes a keyboard, keypad, mouse, trackball, trackpad, touchscreen, and/or cursor direction keys for communicating information and commands to processor 302.

On-board communication device 300 also includes wireless communication device 312 coupled to processor 302. Wireless communication device 312 allows on-board communication device 300 to communicate with network 314, to which one or more other computer systems are connected. Wireless communication device 312 includes wireless network interfaces such as BLUETOOTH, WIFI, LTE, 5G, WIMAX, GPRS, or WCDMA. In one or more embodiments, a portion or all of noted processes and/or methods, is implemented in two or more on-board communication device 300.

The on-board communication device 300 is configured to receive information through I/O interface 310. The information received through I/O interface 310 includes one or more of instructions, data, and/or other parameters for processing by processor 302. The information is transferred to processor 302 via bus 308. On-board communication device 300 is configured to receive information related to a UI through I/O interface 310. The information is stored in computer-readable storage medium 304 as user interface (UI) 342.

The wireless communication device 312 is configured to receive a communication signal 350 via one or more antennas 320. In some embodiments, the communication signal 350 includes a carrier signal that is modulated with one or more information bearing signals. In some embodiments, the wireless communication device 312 is configured to demodulate the communication signal 350 so that information of the information bearing signal(s) is obtained. In some embodiments, the information of the information bearing signal(s) is transformed into parameters in library 307 that is readable by a computer and stored in the computer-readable storage medium 304.

In some embodiments, the wireless communication device 312 is configured to transmit a communication signal 352 that is configured to be used to obtain a range and AoA/AoD estimations via one or more antennas 320. In other embodiments, the wireless communication device 312 is configured to receive the communication signal 350 that carries range and AoA/AoD estimations data that indicates a range estimation obtained based on the communication signal 352.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

Figure 4:
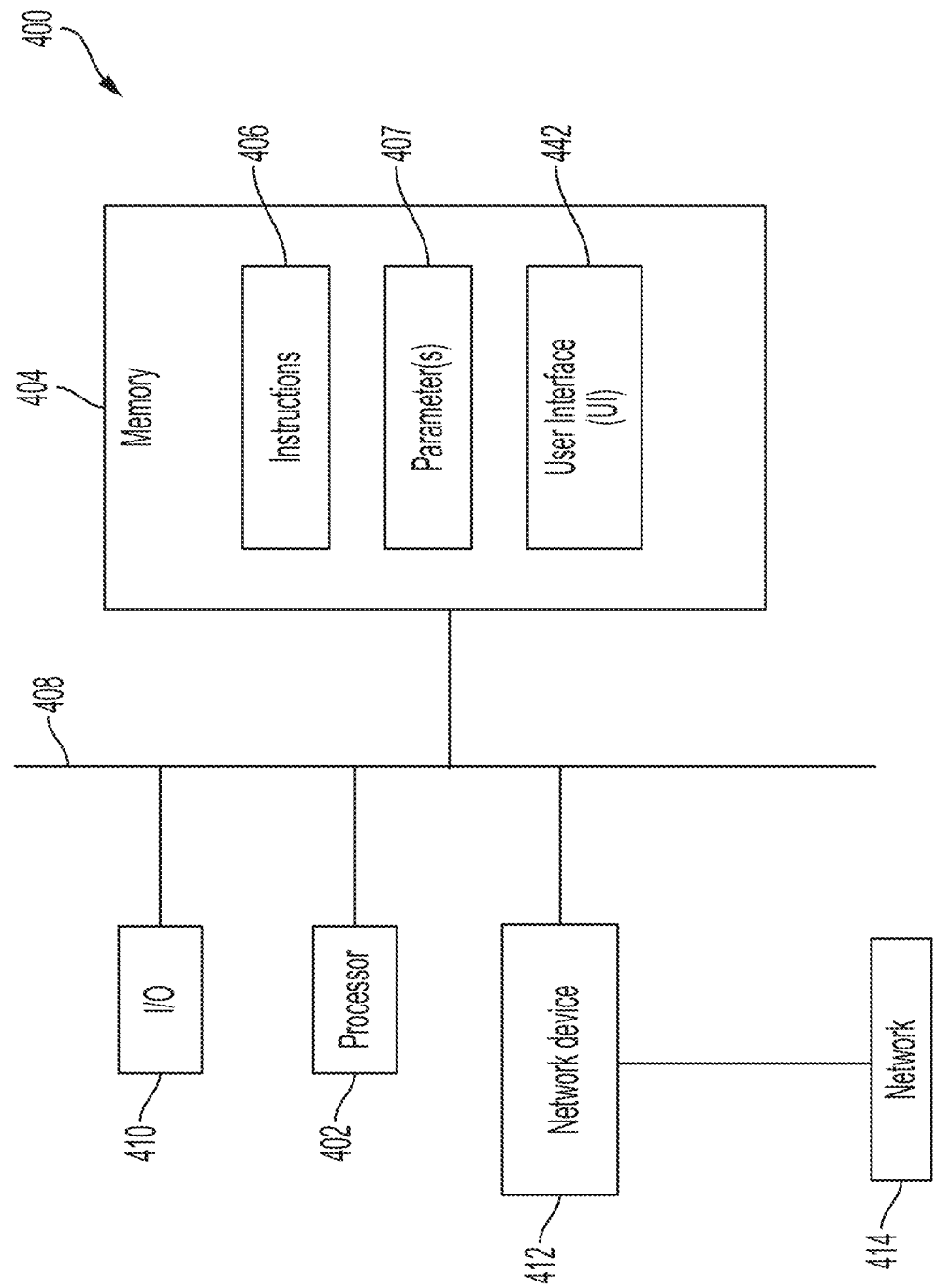
FIG. 4 is a block diagram of a computer device, in accordance with some embodiments.

FIG. 4 is a block diagram of a computer device 400, in accordance with some embodiments.

In some embodiments, the computer device 124 in FIG. 1B has the configuration of the computer device 400 shown in FIG. 4.

In some embodiments, computer device 400 includes a general purpose computing device including a hardware processor 402 and a non-transitory, computer-readable storage medium 404. Computer-readable storage medium 404, amongst other things, is encoded with, i.e., stores, computer program code 406, i.e., a set of executable instructions. Execution of computer program code 406 by hardware processor 402 represents (at least in part) an vehicle localization and speed determination tool which implements a portion or all of the methods described herein in accordance with one or more embodiments (hereinafter, the noted processes and/or methods).

Processor 402 is electrically coupled to computer-readable storage medium 404 via a bus 408. Processor 402 is also electrically coupled to an I/O interface 410 by bus 408. A network device 412 is also electrically connected to processor 402 via bus 408. Network device 412 is connected to a network 414, so that processor 402 and computer-readable storage medium 404 are capable of connecting to external elements via network 414. Processor 402 is configured to execute computer program code 406 encoded in computer-readable storage medium 404 in order to cause computer device 400 to be usable for performing a portion or all of the noted processes and/or methods. In one or more embodiments, processor 402 is a central processing unit (CPU), a multi-processor, a distributed processing system, an application specific integrated circuit (ASIC), and/or a suitable processing unit.

In one or more embodiments, computer-readable storage medium 404 is an electronic, magnetic, optical, electromagnetic, infrared, and/or a semiconductor system (or apparatus or device). For example, computer-readable storage medium 404 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 404 includes a compact disk-read only memory (CD-ROM), a compact disk-read/write (CD-R/W), and/or a digital video disc (DVD).

In one or more embodiments, computer-readable storage medium 404 stores computer program code 406 configured to cause computer device 400 to be usable for performing a portion or all of the noted processes and/or methods. In one or more embodiments, computer-readable storage medium 404 also stores information which facilitates performing a portion or all of the noted processes and/or methods. In one or more embodiments, computer-readable storage medium 404 stores library 407 of parameters (e.g. vehicle location estimations, range estimations, location data, signal data, TOF data, angle of arrival, angle of departure, radar signatures, azimuth, zenith, elevation) as disclosed herein.

Computer device 400 includes I/O interface 410. I/O interface 410 is coupled to external circuitry. In one or more embodiments, I/O interface 410 includes a keyboard, keypad, mouse, trackball, trackpad, touchscreen, and/or cursor direction keys for communicating information and commands to processor 402.

Computer device 400 also includes network device 412 coupled to processor 402. Network device 412 allows computer device 400 to communicate with network 414, to which one or more other computer systems are connected. Network device 412 includes wireless network interfaces such as BLUETOOTH, WIFI, LTE, 5G, WIMAX, GPRS, or WCDMA or wired network interfaces such as ETHERNET, USB, or IEEE-1364. In one or more embodiments, a portion or all of noted processes and/or methods, is implemented in two or more computer devices 400.

Computer device 400 is configured to receive information through I/O interface 410. The information received through I/O interface 410 includes one or more of instructions, data, and/or other parameters for processing by processor 402. The information is transferred to processor 402 via bus 408. Computer device 400 is configured to receive information related to a UI through I/O interface 410. The information is stored in computer-readable storage medium 404 as user interface (UI) 442.

In some embodiments, the processes are realized as functions of a program stored in a non-transitory computer-readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

Figure 5:
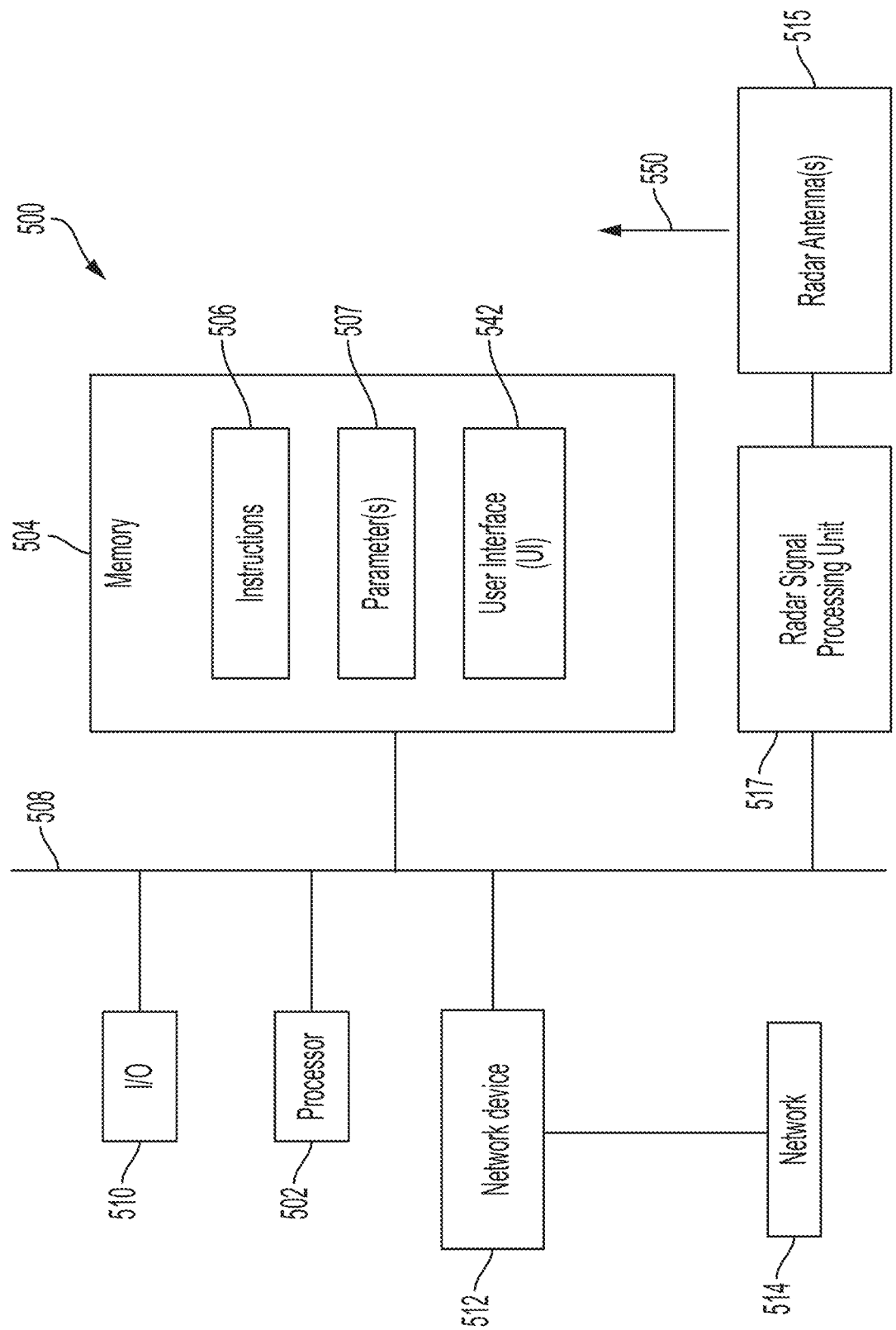
FIG. 5 is a block diagram of a radar system, in accordance with some embodiments.

FIG. 5 is a block diagram of a radar system 500, in accordance with some embodiments.

In some embodiments, the wayside radar system 111 in FIG. 1A has the configuration of the radar system 500 shown in FIG. 5. In some embodiments, each radar system 122 in FIG. 1B has the configuration of the radar system 500 shown in FIG. 5.

In some embodiments, radar system 500 includes a general purpose computing device including a hardware processor 502 and a non-transitory, computer-readable storage medium 504. Computer-readable storage medium 504, amongst other things, is encoded with, i.e., stores, computer program code 506, i.e., a set of executable instructions. Execution of computer program code 506 by hardware processor 502 represents (at least in part) an vehicle localization and speed determination tool which implements a portion or all of the methods described herein in accordance with one or more embodiments (hereinafter, the noted processes and/or methods).

Processor 502 is electrically coupled to computer-readable storage medium 504 via a bus 508. Processor 502 is also electrically coupled to an I/O interface 510 by bus 508. A network device 512 is also electrically connected to processor 502 via bus 508. Network device 512 is connected to a network 514, so that processor 502 and computer-readable storage medium 504 are capable of connecting to external elements via network 514. Processor 502 is configured to execute computer program code 506 encoded in computer-readable storage medium 504 in order to cause radar system 500 to be usable for performing a portion or all of the noted processes and/or methods. In one or more embodiments, processor 502 is a central processing unit (CPU), a multi-processor, a distributed processing system, an application specific integrated circuit (ASIC), and/or a suitable processing unit.

Radar system 500 includes one or more radar antenna(s) 515 (front end) and a radar signal processing unit 517 configured to generate a radar signal (chirp) 550 and process reflected radar signals 550. Radar signal processing unit 517 is connected via bus 508 to the processor 502. In some embodiments, radar signal processing unit 517 includes a digital to analog converter to convert digital signals or information from the processor 502 into the radar signals 550.

In one or more embodiments, computer-readable storage medium 504 is an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 504 includes a compact disk-read only memory (CD-ROM), a compact disk-read/write (CD-R/W), and/or a digital video disc (DVD).

In one or more embodiments, computer-readable storage medium 504 stores computer program code 506 configured to cause radar system 500 to be usable for performing a portion or all of the noted processes and/or methods. In one or more embodiments, computer-readable storage medium 504 also stores information which facilitates performing a portion or all of the noted processes and/or methods. In one or more embodiments, computer-readable storage medium 504 stores library 507 of parameters (e.g. TOF data, angle of arrival, angle of departure, radar signatures, azimuth, zenith, elevation) as disclosed herein.

Radar system 500 includes I/O interface 510. I/O interface 510 is coupled to external circuitry. In one or more embodiments, I/O interface 510 includes a keyboard, keypad, mouse, trackball, trackpad, touchscreen, and/or cursor direction keys for communicating information and commands to processor 502.

Radar system 500 also includes network device 512 coupled to processor 502. Network device 512 allows radar system 500 to communicate with network 514, to which one or more other computer systems are connected. Network device 512 includes wireless network interfaces such as BLUETOOTH, WIFI, LTE, 5G, WIMAX, GPRS, or WCDMA or wired network interfaces such as ETHERNET, CAN bus, USB, or IEEE-1364. In one or more embodiments, a portion or all of noted processes and/or methods, is implemented in two or more radar systems 500.

Radar system 500 is configured to receive information through I/O interface 510. The information received through I/O interface 510 includes one or more of instructions, data, and/or other parameters for processing by processor 502. The information is transferred to processor 502 via bus 508. Radar system 500 is configured to receive information related to a UI through I/O interface 510. The information is stored in computer-readable storage medium 504 as user interface (UT) 542.

FIGS. 6-11 illustrate high-integrity vehicle localization systems with different arrangements for the reflectors 110. The different locations of the reflectors 110 with respect to the antennas of the wayside communication devices 108 in addition to the RCS of the reflectors 110 are used as a classification technique to enhance a localization algorithm. In some embodiments, localization is based on two key attributes (a) unique identification of the location 107 based on the arrangement of the reflectors 110 and (b) accurate estimation of the vehicle's position with respect to the location 107. In some embodiments, the relative position of the reflectors 110 with respect to the antenna(s) of wayside communication device 108 and the RCS of the reflectors 110 are used to identify or verify the identification of the wayside communication device 108 and thus the location 107. In some embodiments, the position of the location 107 is stored and then looked up once the vehicle localization system detects the wayside communication device 108 associated with the location 107. The position of the vehicle 102 is then determined given the position of the location 107 and the position of the vehicle 102 relative to the location 107.

Figure 6:
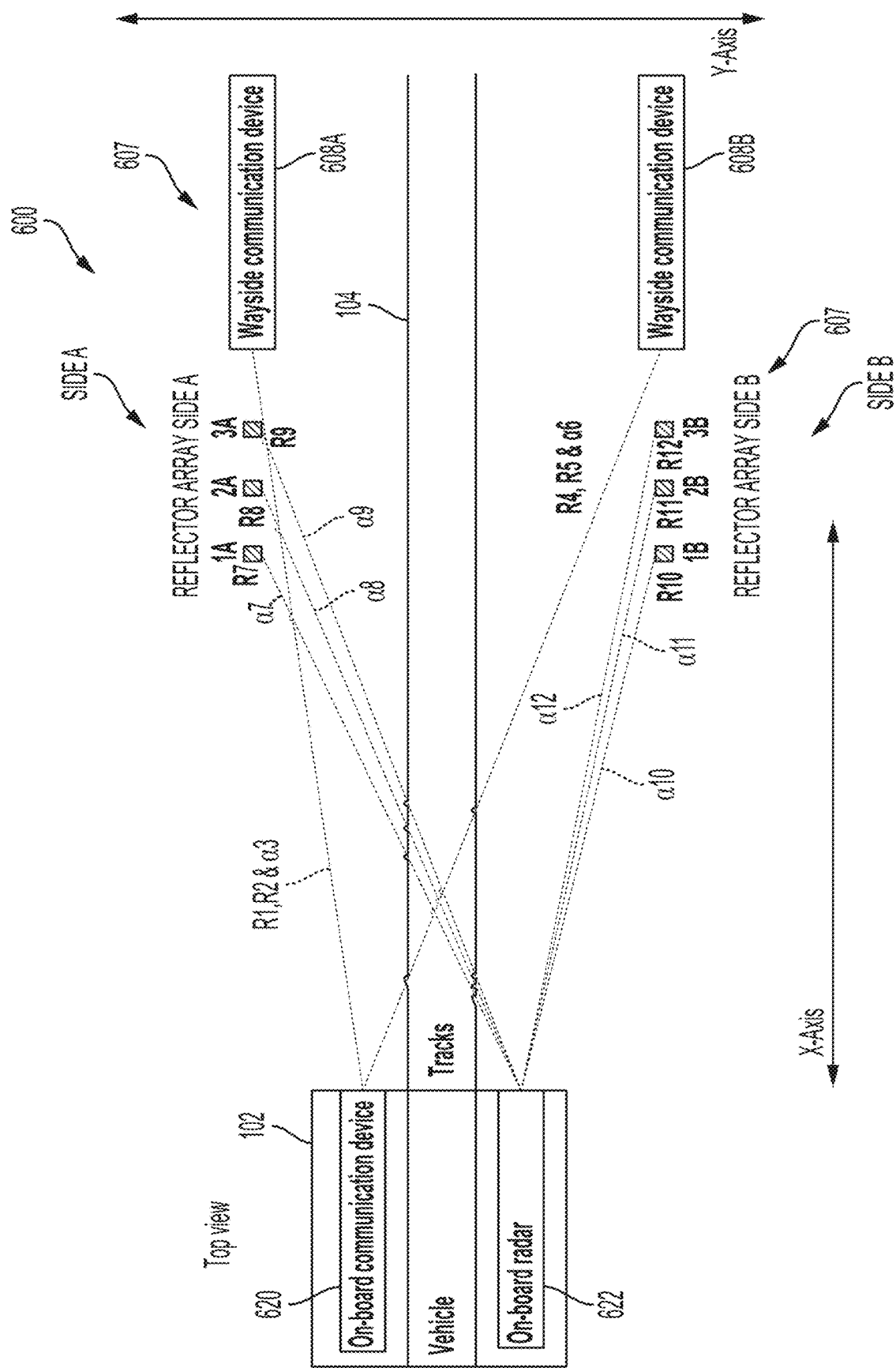
FIG. 6 is a top view of a high-integrity vehicle localization system, in accordance with some embodiments.

FIG. 6 is a top view of a high-integrity vehicle localization system 600, in accordance with some embodiments.

The high-integrity vehicle localization system 600 includes an on-board communication device 620 and a radar 622 on board the vehicle 102. The radar 622 may be a frequency-modulated continuous wave (FMCW) radar or non FMCW radar using other modulation (encoding) techniques. In some embodiments, the on-board communication device 620 corresponds with the on-board communication device 120 shown in FIG. 1B and the radar 622 corresponds with the radar system 122 in FIG. 1A.

In this embodiment, the guideway 104 extends in a direction parallel with the X-axis. One side of the guideway is labeled Side A and another side of the guideway is labeled Side B. Side A and Side B are displaced with respect to a second direction that is parallel with the Y-axis. The Y-axis is perpendicular to the X-axis.

At location 607 on side A of the wayside of the guideway 104, the high-integrity vehicle localization system 600 includes a wayside communication device 608A and three reflectors, labeled reflector 1A, reflector 2A, and reflector 3A. In some embodiments, the wayside communication device 608A corresponds with one of the wayside communication devices 108 in FIG. 1A at a particular location 107. Each reflector 1A, reflector 2A, reflector 3A corresponds with a reflector 110 in FIG. 1A.

At location 607 on side B of the wayside of the guideway 104, the high-integrity vehicle localization system 600 includes wayside communication device 608B and three side B reflectors, labeled reflector 1B, reflector 2B, reflector 3B. Collectively or generically the wayside communication device 608A and the wayside communication device 608B are referred to as wayside communication device(s) 608. In some embodiments, the wayside communication device 608B corresponds with one of the wayside communication devices 108 in FIG. 1A at a particular location 107. Each reflector 1B, reflector 2B, reflector 3B corresponds with a reflector 110 in FIG. 1A.

In FIG. 6, reflector 1A, reflector 2A, reflector 3A on side A are each aligned with respect to the Y-axis and displaced with respect to the X-axis. In this example, reflector 1A, reflector 2A, reflector 3A on side A all have the same tetrahedron shape. Reflector 1A, reflector 2A, reflector 3A on side A are each associated with wayside communication device 608A in Side A of the guideway 104.

In FIG. 6, reflector 1B, reflector 2B, reflector 3B on side B are each aligned with respect to the Y-axis and displaced with respect to the X-axis. In this example, reflector 1B, reflector 2B, reflector 3B on side B all have the same tetrahedron shape. Reflector 1B, reflector 2B, reflector 3B on side B are each associated with wayside communication device 608B on Side B of the guideway 104.

In this embodiment, the arrangement of reflector 1A, reflector 2A, and reflector 3A on side A is the same as reflector 1B, reflector 2B, and reflector 3B on side B.

The high-integrity vehicle localization system 600 is configured to obtain various range and AoA/AoD measurements labeled R1, R2, R4, R5, R7, R8, R9, R10, R11, R12, $\alpha 3$, $\alpha 6$, $\alpha 7$, $\alpha 8$, $\alpha 9$, $\alpha 10$, $\alpha 11$ and $\alpha 12$.

R1 is the range estimate obtained by the on-board communication device 620 using RSSI in conjunction with a transmitted communication signal to the wayside communication device 608A. When the train approaches the wayside communication devices 608, a first rough range estimation is performed using RSSI based on the expected signal to noise distribution with respect to the range between the on-board communication device and the wayside communication device (Poisson distribution).

R2 is the range estimate obtained by the on-board communication device 620 using FM RTT in conjunction with a transmitted communication signal to the wayside communication device 608A. The FM RTT is based on the round trip time of flight between the on-board communication device 620 and the wayside communication device 608A.

$\alpha 3$ is the angle of arrival and/or angle of departure estimate obtained by the on-board communication device 620 using the communication device Multiple In Multiple Out (MIMO) antennas structure in conjunction with a transmitted communication signal to the wayside communication device 608A.

R4 is the range estimate obtained by the on-board communication device 620 using RSSI in conjunction with a transmitted communication signal to the wayside communication device 608B.

R5 is the range estimate obtained by the on-board communication device 620 using FM RTT in conjunction with a transmitted communication signal to the wayside communication device 608B using FM RTT.

$\alpha 6$ is the angle of arrival and/or angle of departure estimate obtained by the on-board communication device 620 using the communication device Multiple In Multiple Out (MIMO) antennas structure with a transmitted communication signal to the wayside communication device 608B.

The position of the train obtained using communication infrastructure varies in accuracy depending on actual capabilities and features of the communication system. However, this estimate serves as an input to the fusion algorithm where radar 622 focuses on the designated area identified by the on-board communication device 620 and wayside communication devices 608. Radar 622 extracts measurements from the target represented by the reflector array associated with the wayside communication device 608A.

R7 and $\alpha 7$ are the range and angle of arrival measured by the radar 622 transmitting a radar signal to reflector 1A in the reflectors array associated with wayside communication device 608A on side A and receiving a return signal.

R8 and $\alpha 8$ are the range and angle of arrival measured by the radar 622 transmitting a radar signal to reflector 2A in the reflectors array associated with wayside communication device 608A on side A and receiving a return signal.

R9 and $\alpha 9$ are the range and angle of arrival measured by the radar 622 transmitting a radar signal to reflector 3A in the reflectors array associated with wayside communication device 608A on side A and receiving a return signal.

R10 and $\alpha 10$ are the range and angle of arrival measured by the radar 622 transmitting a radar signal to reflector 1B in the reflectors array associated with wayside communication device 608B on side B and receiving a return signal.

R11 and $\alpha 11$ are the range and angle of arrival measured by the radar 622 transmitting a radar signal to reflector 2B in the reflectors array associated with wayside communication device 608B on side B and receiving a return signal.

R12 and $\alpha 12$ are the range and angle of arrival measured by the radar 622 transmitting a radar signal to reflector 3B in the reflectors array associated with wayside communication device 608B on side B and receiving a return signal.

In some embodiments, range measurements R1, R2, R4, R5, R7, R8, R9, R10, R11, R12 and angle of arrival and/or angle of departure measurements $\alpha 3$, $\alpha 6$, $\alpha 7$, $\alpha 8$, $\alpha 9$, $\alpha 10$, $\alpha 11$, $\alpha 12$ are all sent to a computer device, such as computer device 124 in FIG. 1B. The computer device 124 is configured to implement a fusion algorithm that takes range measurements R1, R2, R4, R5, R7, R8, R9, R10, R11, R12 and angle of arrival and/or angle of departure measurements $\alpha 3$, $\alpha 6$, $\alpha 7$, $\alpha 8$, $\alpha 9$, $\alpha 10$, $\alpha 11$, $\alpha 12$ as input and outputs a high integrity position estimate for the vehicle 102. Each of the range measurements R1, R2, R4, R5, R7, R8, R9, R10, R11, R12 and angle of arrival and/or angle of departure measurements $\alpha 3$, $\alpha 6$, $\alpha 7$, $\alpha 8$, $\alpha 9$, $\alpha 10$, $\alpha 11$, $\alpha 12$ increases the accuracy of localizing the vehicle 102. Examples of the fusion algorithm are discussed in U.S. patent application Ser. No. 16/714,175 filed on Dec. 13, 2019 and U.S. patent application Ser. No. 17/115,348 filed on Dec. 8, 2020, which are each incorporated by reference in their entireties.

Figure 7:
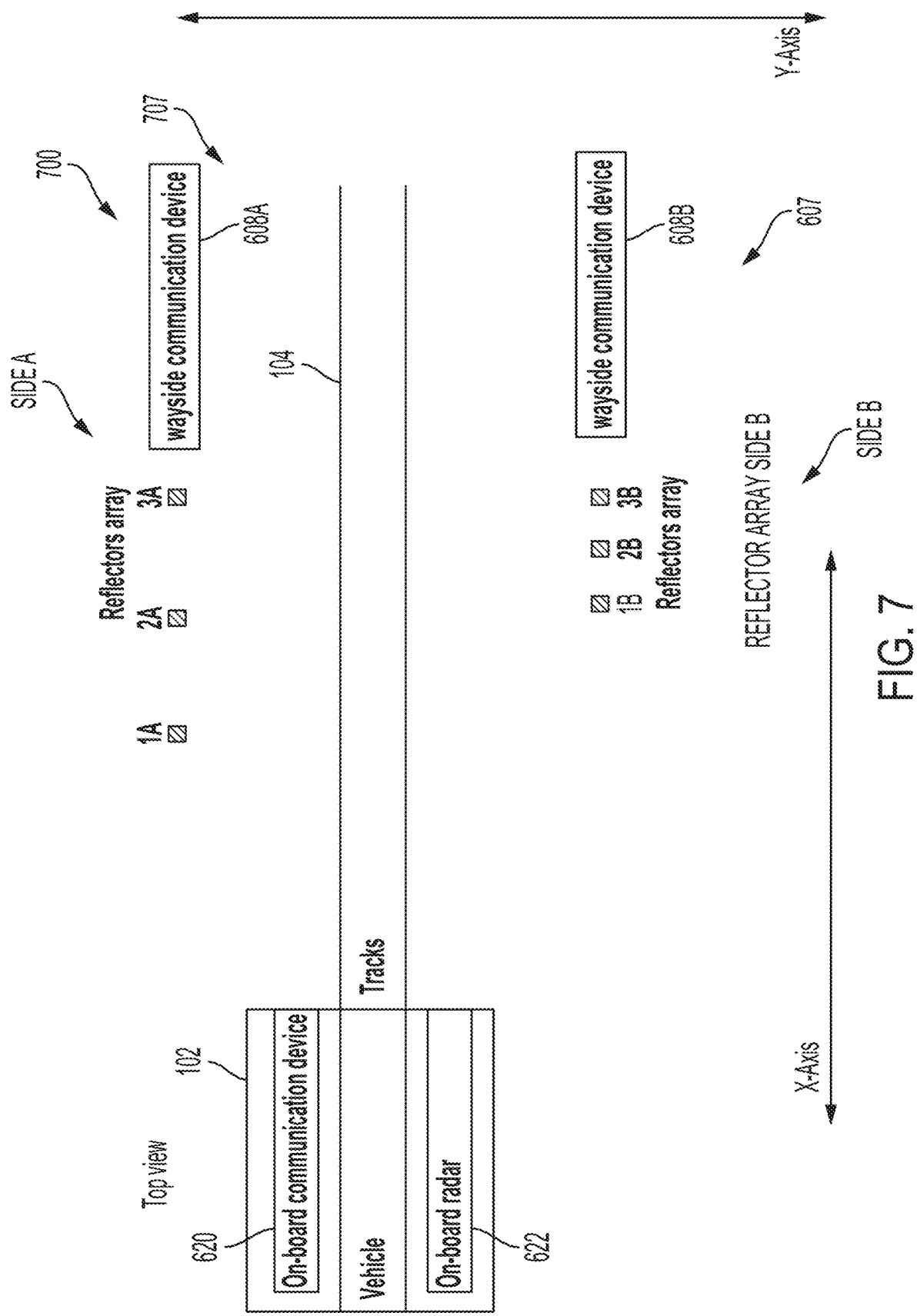
FIG. 7 is a top view of a high-integrity vehicle localization system, in accordance with some embodiments.

FIG. 7 is a top view of a high-integrity vehicle localization system 700, in accordance with some embodiments.

High-integrity vehicle localization system 700 in FIG. 7 is the same as high-integrity vehicle localization system 600 in FIG. 6, except that reflector 1A, reflector 2A, and reflector 3A on side A do not have the same configuration as reflector 1B, reflector 2B, and reflector 3B on side B.

Reflector 1A, reflector 2A, and reflector 3A on side A are aligned with respect to the Y-axis and displaced with respect to the X-axis. Additionally, reflector 1B, reflector 2B, and reflector 3B on side B are aligned with respect to the Y-axis and displaced with respect to the X-axis. However, reflector 1A, reflector 2A, and reflector 3A on side A are spaced further apart with respect to the X-axis than reflector 1B, reflector 2B, and reflector 3B on side B.

In some embodiments, range measurements R1, R2, R4, R5, R7, R8, R9, R10, R11, R12 and angle of arrival and/or angle of departure measurements α3, α6, α7, α8, α9, α10, α11, α12 are made by the high-integrity vehicle localization system 700 in the same manner discussed above with respect to high-integrity vehicle localization system 600 in FIG. 6.

Figure 8:
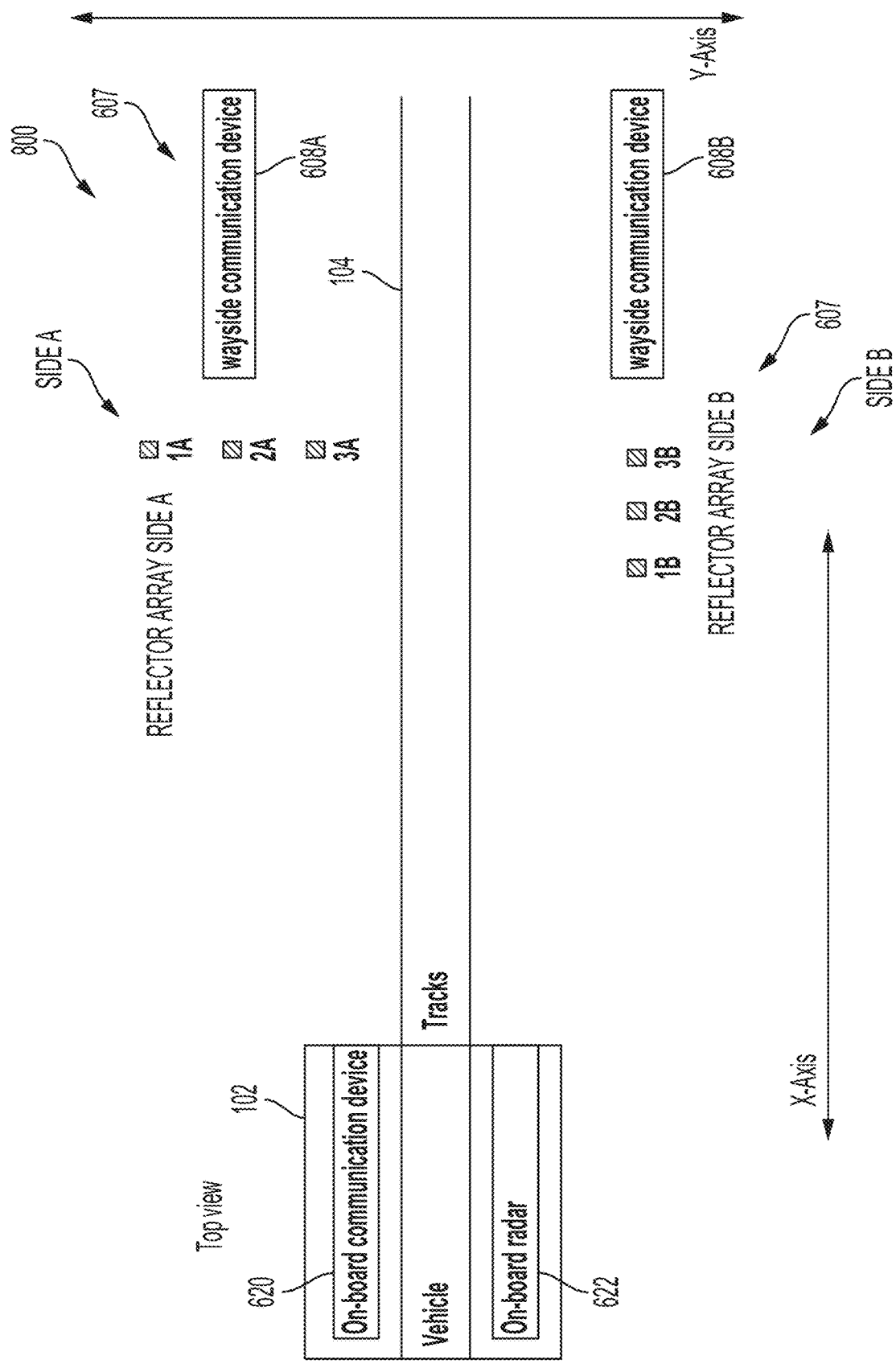
FIG. 8 is a top view of a high-integrity vehicle localization system, in accordance with some embodiments.

FIG. 8 is a top view of a high-integrity vehicle localization system 800, in accordance with some embodiments.

High-integrity vehicle localization system 800 in FIG. 8 is the same as high-integrity vehicle localization system 600 in FIG. 6, except that reflector 1A, reflector 2A, and reflector 3A on side A do not have the same configuration as reflector 1B, reflector 2B, and reflector 3B on side B.

Reflector 1A, reflector 2A, and reflector 3A on side A are aligned with respect to the X-axis and displaced with respect to the Y-axis. Additionally, reflector 1B, reflector 2B, and reflector 3B on side B are aligned with respect to the Y-axis and displaced with respect to the X-axis.

In some embodiments, range measurements R1, R2 R4, R5, R7, R8, R9, R10, R11, R12 and angle of arrival and/or angle of departure measurements α3, α6, α7, α8, α9, α10, α11, α12 are made by the high-integrity vehicle localization system 800 in the same manner discussed above with respect to high-integrity vehicle localization system 600 in FIG. 6.

Figure 9:
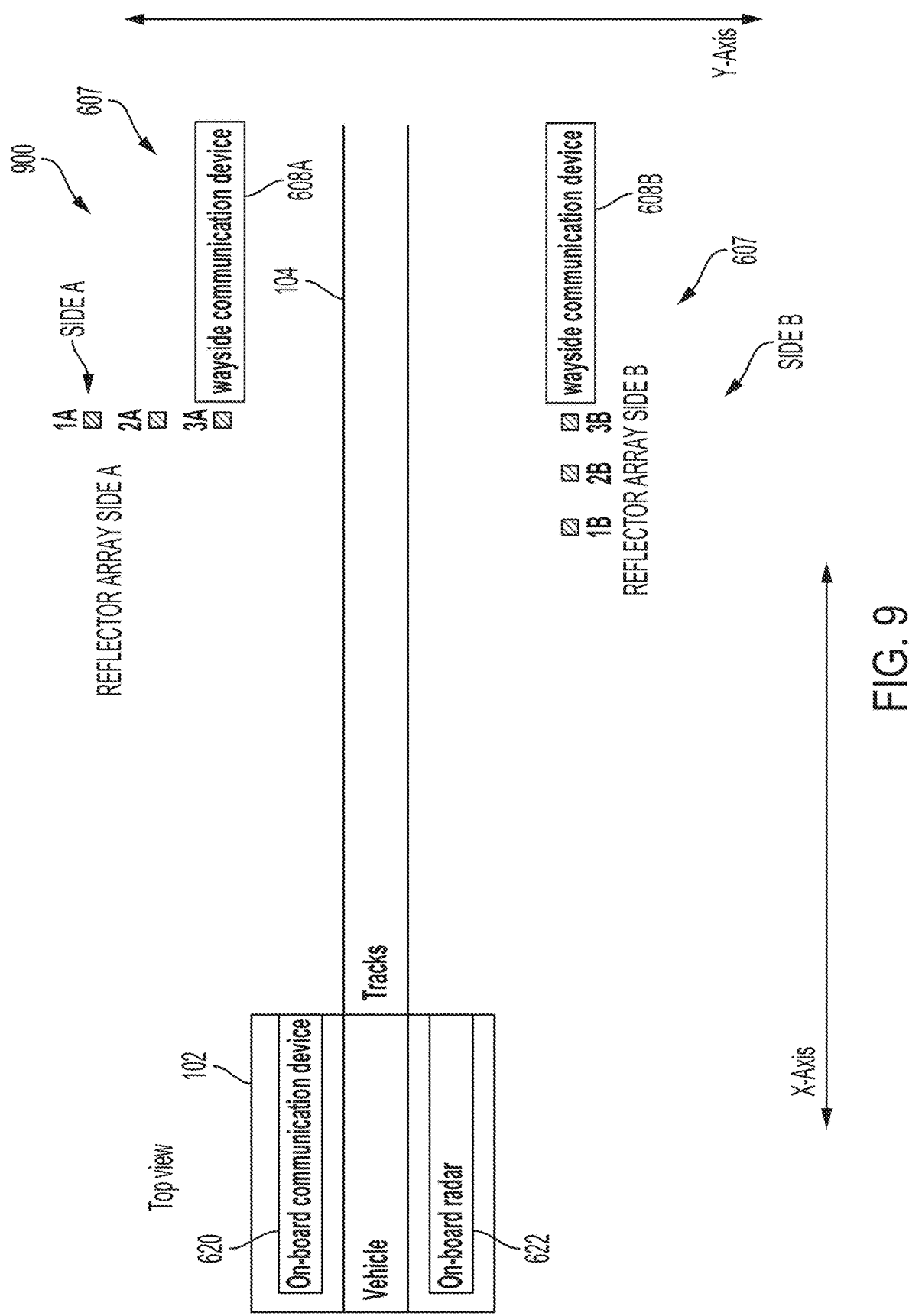
FIG. 9 is a top view of a high-integrity vehicle localization system, in accordance with some embodiments.

FIG. 9 is a top view of a high-integrity vehicle localization system 900, in accordance with some embodiments.

High-integrity vehicle localization system 900 in FIG. 9 is the same as high-integrity vehicle localization system 600 in FIG. 6, except that reflector lA, reflector 2A, and reflector 3A on side A do not have the same configuration as reflector 1B, reflector 2B, and reflector 3B on side B.

Reflector 1A, reflector 2A, and reflector 3A on side A are aligned with respect to the X-axis and displaced with respect to the Y-axis. Additionally, reflector 1B, reflector 2B, and reflector 3B on side B are aligned with respect to the Y-axis and displaced with respect to the X-axis. As such, the high-integrity vehicle localization system 900 is similar to the high-integrity vehicle localization system 800 in FIG. 8 except that reflector 1A, reflector 2A, and reflector 3A are closer to wayside communication device 608A on side A and reflector 1B, reflector 2B, and reflector 3B are closer to wayside communication device 608B on side B.

In some embodiments, range measurements R1, R2, R4, R5, R7, R8, R9, R10, R11, R12 and angle of arrival and/or angle of departure measurements α3, α6, α7, α8, α9, α10, α11, α12 are made by the high-integrity vehicle localization system 900 in the same manner discussed above with respect to high-integrity vehicle localization system 600 in FIG. 6.

Figure 10:
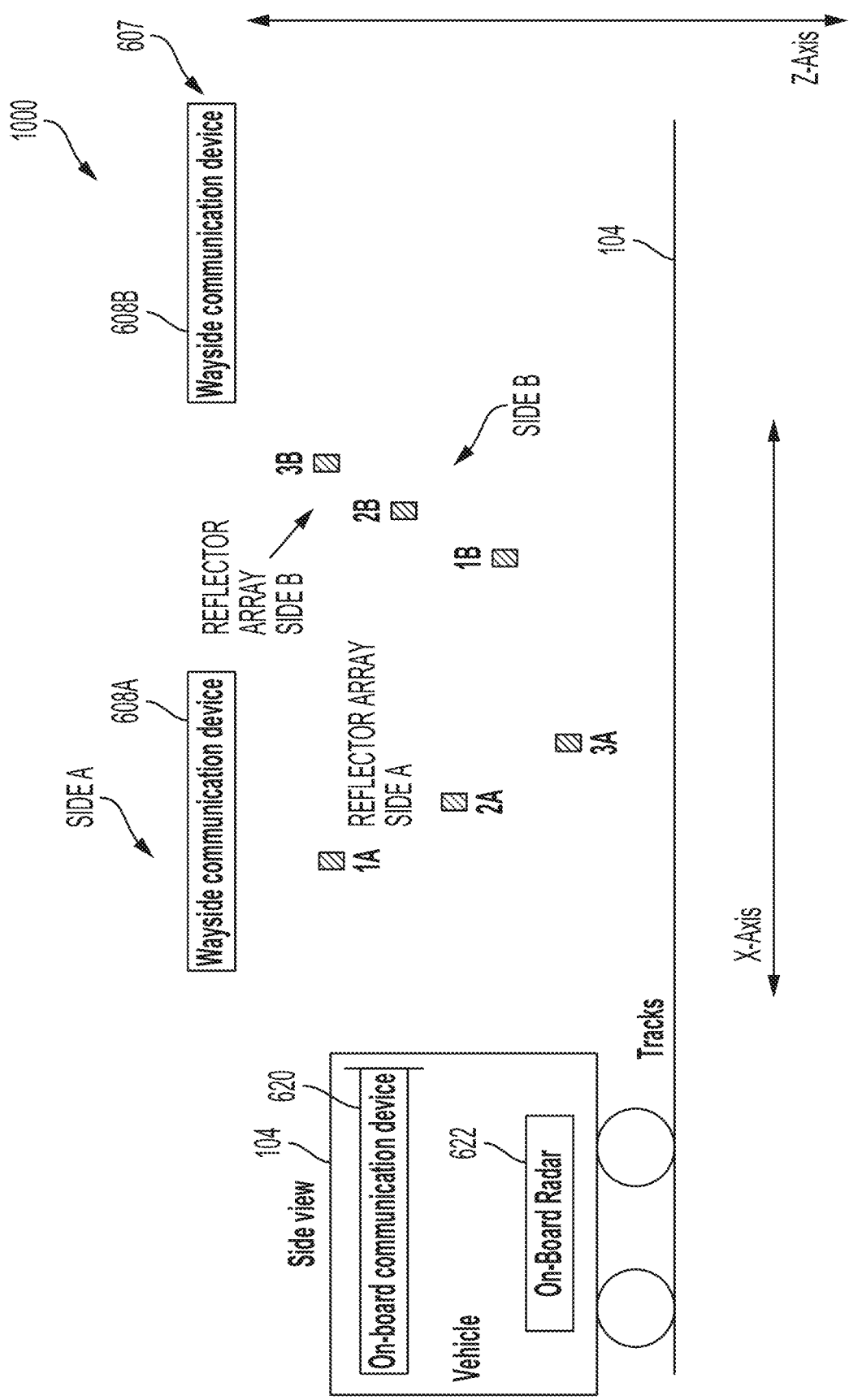
FIG. 10 is a side view of a high-integrity vehicle localization system, in accordance with some embodiments.

FIG. 10 is a side view of a high-integrity vehicle localization system 1000, in accordance with some embodiments.

High-integrity vehicle localization system 1000 in FIG. 10 is the same as high-integrity vehicle localization system 600 in FIG. 6, except for the configuration of reflector 1A, reflector 2A, and reflector 3A on side A and reflector 1B, reflector 2B, and reflector 3B on side B.

Reflector 1A, reflector 2A and reflector 3A on side A are displaced both with respect to the X-axis and the Z-axis. The Z-axis is perpendicular with respect to both the X-axis and the Y-axis. Reflector 1A is the reflector on side A furthest to the left with respect to the X-axis and highest with respect to the Z-axis. Reflector 3A is the reflector on side A furthest to the right with respect to the X-axis and lowest with respect to the Z-axis. Reflector 2A is the reflector on side A that is between reflector 1A with respect to the X-axis and also with respect to the Z-axis.

Reflector 3B is the reflector on side B furthest to the left with respect to the X-axis and highest with respect to the Z-axis. Reflector 1B is the reflector on side B furthest to the right with respect to the X-axis and lowest with respect to the Z-axis. Reflector 2B is the reflector on side B that is between reflector 1 with respect to the X-axis and also with respect to the Z-axis.

Reflector 3B on side B is higher than reflector 1A on side A but reflector 1A on side A is higher than reflector 2B on side B. Reflector 2B on side B is higher than reflector 2B on side A but reflector 2A on side A is higher than reflector 1A on side B. Reflector 3B on side B is higher than reflector 1A on side B. Reflector 1B, reflector 2B and reflector 3B on side B are all further to the right of the page with respect to the X-axis than reflector 1A, reflector 2A, and reflector 3A on side A.

The variation of the height of reflector 1A, reflector 2A, and reflector 3A on side A and reflector 1B, reflector 2B, and reflector 3B on side B results in a reflection of a radar signal from the radar 622 with a unique radar signature that allows for the location 607 to be identified based on the unique signature. In some embodiments, the unique radar signature is an amplitude and/or phase of the reflected radar signal with a unique and identifiable pattern with respect to the frequency and/or time domain. In some embodiments, the unique radar signal has unique angle of returns and/or elevation of returns.

Figure 11:
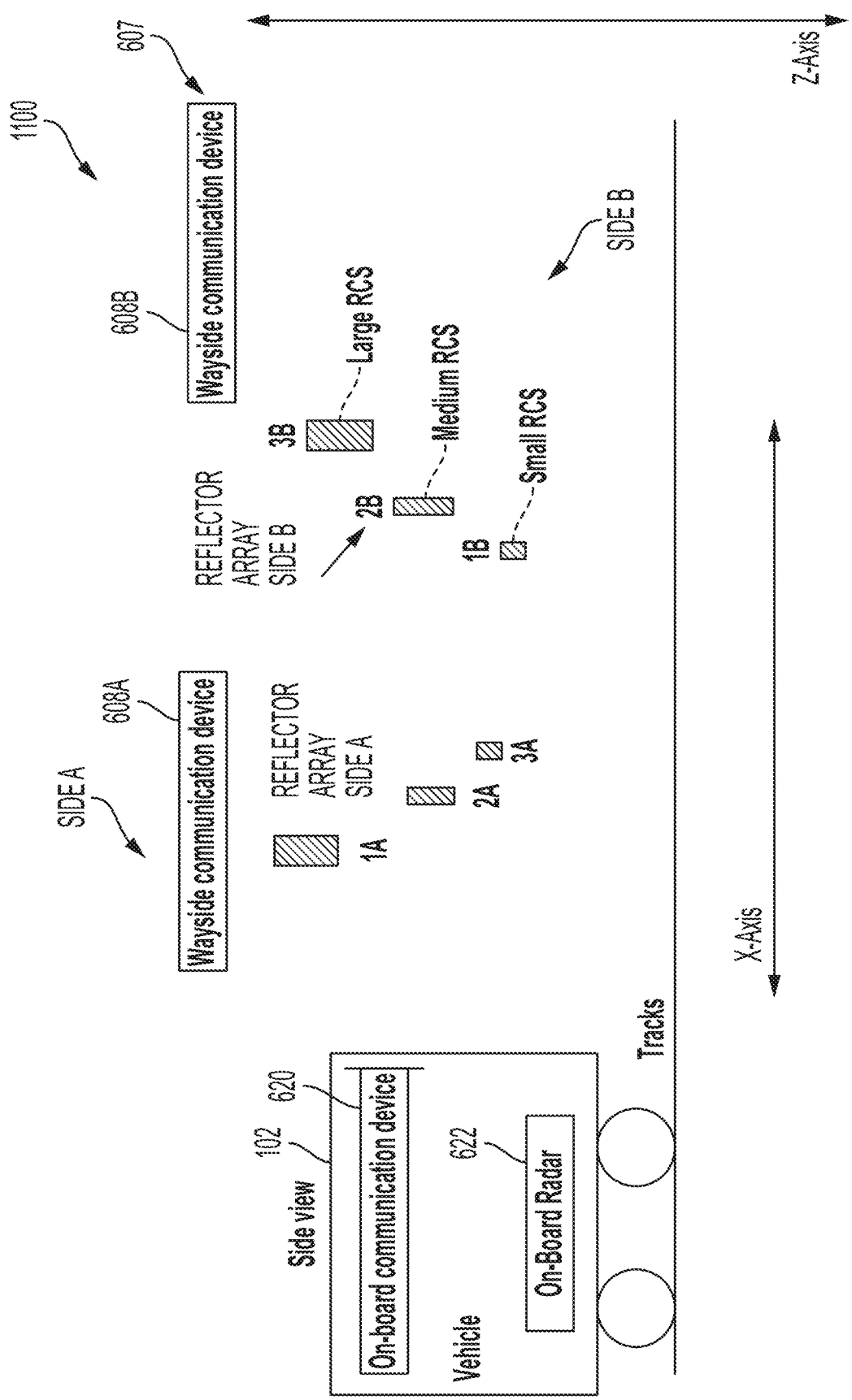
FIG. 11 is a side view of a high-integrity vehicle localization system, in accordance with some embodiments.

FIG. 11 is a side view of a high-integrity vehicle localization system 1100, in accordance with some embodiments.

High-integrity vehicle localization system 1100 in FIG. 11 is the same as high-integrity vehicle localization system 600 in FIG. 6, except for the configuration of reflector 1A, reflector 2A, and reflector 3A on side A and reflector 1B, reflector 2B, and reflector 3B on side B.

Reflector 1A, reflector 2A and reflector 3A on side A are displaced both with respect to the X-axis and the Z-axis. Reflector 1A is the reflector on side A furthest to the left of the page with respect to the X-axis and highest with respect to the Z-axis. Reflector 3A is the reflector on side A furthest to the right of the page with respect to the X-axis and lowest with respect to the Z-axis. Reflector 2A is the reflector on side A that is between reflector 1A with respect to the X-axis and also with respect to the Z-axis.

Reflector 1A on side A has a larger RCS than reflector 2A and reflector 3A on side A. Reflector 2A on side A has a larger RCS than reflector 3A on side A.

Reflector 3B is the reflector on side B furthest to the left of the page with respect to the X-axis and highest in elevation with respect to the Z-axis. Reflector 1B is the reflector on side B furthest to the right with respect to the X-axis and lowest with respect to the Z-axis. Reflector 2B is the reflector on side B that is between reflector 1B with respect to the X-axis and also with respect to the Z-axis.

Reflector 3B on side B has a larger RCS than reflector 1A and reflector 2A on side A. Reflector 2A on side A has a larger RCS than reflector 1A on side A.

Reflector 3B on side B is higher than reflector 1A on side A but reflector 1A on side A is higher in elevation than reflector 2B on side B. Reflector 2 on side B is higher than reflector 2 on side A but reflector 2 on side A is higher than reflector 1 on side B. Reflector 3B on side B is higher than reflector 1B on side B. Reflector 1B, reflector 2B and reflector 3B on side B are all further to the right of the page with respect to the X-axis than reflector 1A, reflector 2A, and reflector 3A on side A.

Reflector 1A on side A has the same RCS as reflector 3B on side B. Reflector 2A on side A has the same RCS as reflector 2B on side B. Reflector 3A on side A has the same RCS as reflector 1B on side B. In other embodiments, reflector 1A on side A has a different RCS than reflector 3B on side B. In other embodiments, reflector 2A on side A has a different RCS than reflector 2B on side B. In other embodiments, reflector 3A on side A has a different RCS than reflector 1B on side B.

The variation in RCSs and height of elevation of reflector 1A, reflector 2A, and reflector 3A on side A and reflector 1B, reflector 2B, and reflector 3B on side B to reflect a radar signal from the radar 622 with a unique radar signature that allows for the location 607 to be identified based on the unique signature. In some embodiments, the unique radar signature is an amplitude and/or phase of the reflected radar signal with a unique and identifiable pattern with respect to the frequency and/or time domain. In some embodiments, the unique radar signal has unique angle of returns and/or elevation of returns.

Figure 12:
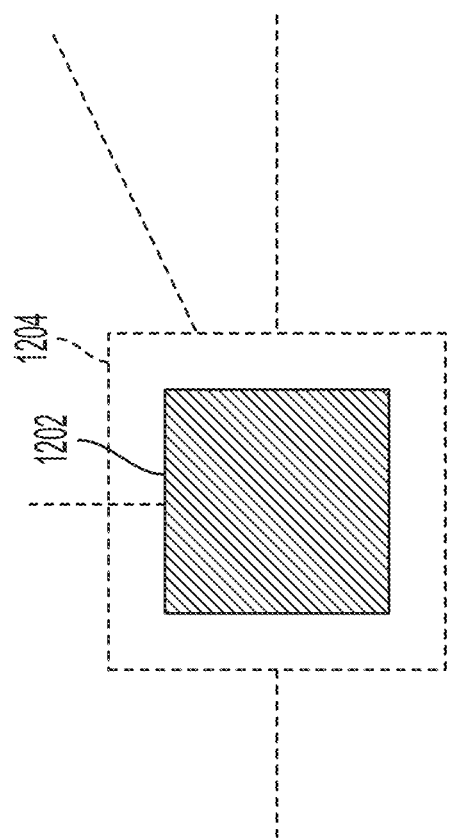
FIG. 12 is a top view of an antenna of a wayside communication device and a reflector that at least partially encapsulates the antenna, in accordance with some embodiments.

FIG. 12 is a top view of an antenna 1202 of a wayside communication device and a reflector 1204 that at least partially encapsulates the antenna 1202, in accordance with some embodiments.

The antenna 1202 corresponds to antenna 220 of wayside communication device 200 in FIG. 2, in some embodiments. The reflector 1204 corresponds with reflector 110 in FIG. 1A at a particular location 107.

In this embodiment, the reflector 1204 is a radome that at least partially encapsulates the antenna 1202. The reflector 1204 is transparent to the communication signal from the on-board communication device 120 (See FIG. 1B) and reflective of the radar signal from the radar system 122 (See FIG. 1B). In some embodiments, a communication signal is transmitted to the antenna 1202 on the wayside communication device 108 (See FIG. 1A). The antenna is at least partially encapsulated by the reflector 1204. The reflector 1204 is transparent to a base frequency band of the communication signal. In some embodiments, the base frequency band of the communication signal is between 2.4 GHz to 10 GHz. A vehicle location estimation is obtained by the on-board communication device 120 based on the communication signal as described above. In some embodiments, the reflector 1204 fully encapsulates the antenna 1202.

A radar signal is transmitted by the radar system 122 (See FIG. 1B) to the wayside communication device 108 (See FIG. 1A). The reflector 1204 is retroreflective at a base frequency band of the radar signal. In some embodiments, the computer device 124 (See FIG. 1B) receives measurements from the on-board communication device 120 (See FIG. 1B) and/or the radar system 122 (See FIG. 1B) and increases the accuracy of the vehicle location estimation based on the radar signal return. In some embodiments, the base frequency band of the radar system 122 (See FIG. 1B) is between 76 GHz to 81 GHz. A base frequency band of the communication signal that is between 2.4 GHz to 10 GHz and a base frequency band of the radar system 122 that is between 76 GHz to 81 GHz provides a "wide" gap between the two base frequency bands.

In some embodiments, the reflector 1204 is formed from a frequency selective surface (FSS) metamaterial. The FSS material is transparent to the base frequency band of the communication signal and retroreflective at the base frequency band of the radar signal.

In some embodiments, the range and AoA/AoD estimates of the communication signal is input into a radar target selection algorithm (beam steering and range gating bins). Based on the range and AoA/AoD estimates from the communication signal, a location window for the radar signal is initially selected to more accurately obtain a location for the vehicle 102 (See FIG. 1A).

Figure 13:
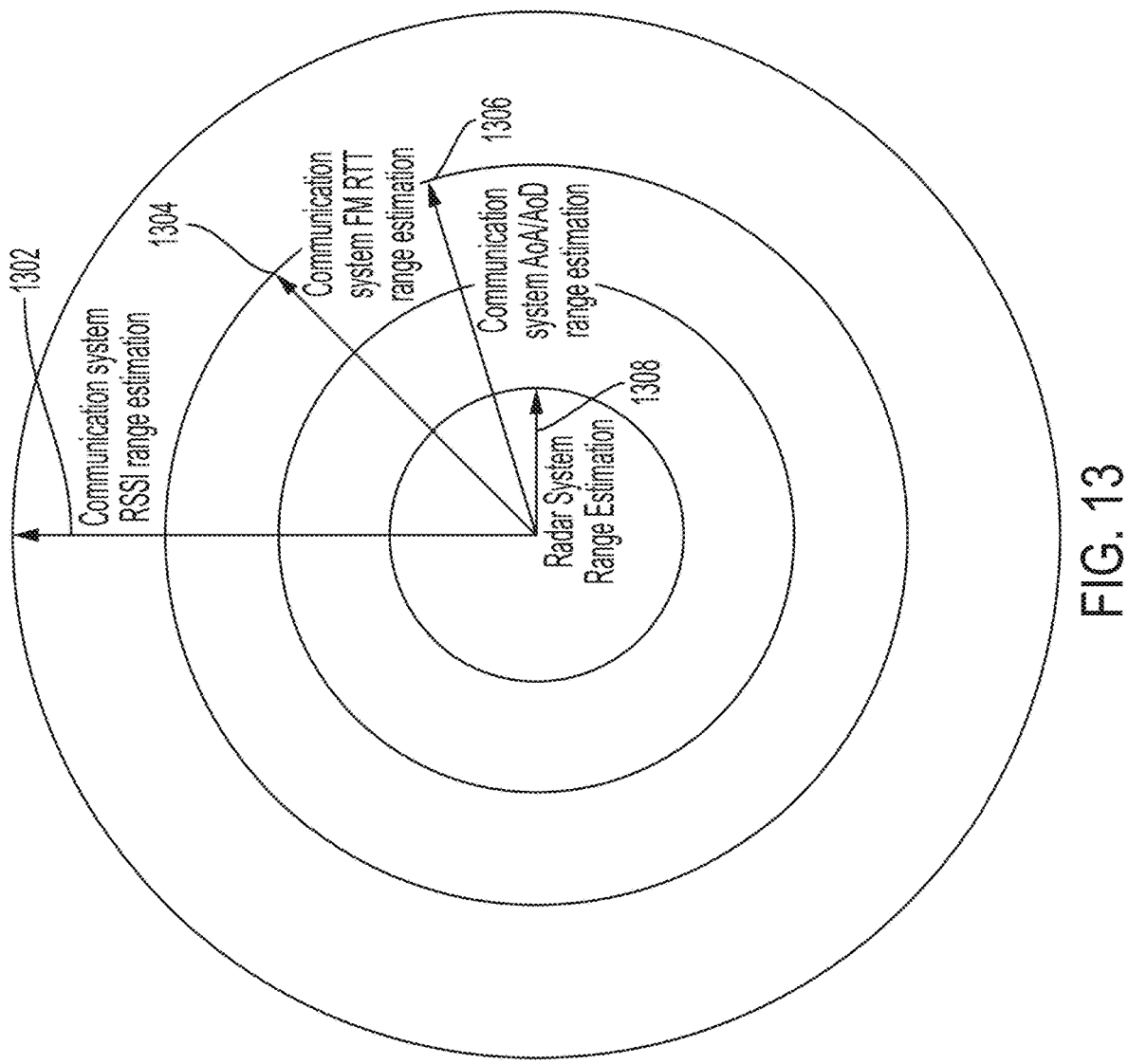
FIG. 13 is a range graph of a maximum range for each of one or more range estimation techniques, in accordance with some embodiments.

FIG. 13 is a range accuracy graph of the maximum range for each of the range measurement techniques, in accordance with some embodiments.

The center of the range graph represents a location of an antenna of the wayside communication device.

Range 1302 has a range accuracy that is acceptable out to the range 1302 but is the least accurate of the range measurement techniques. Range 1302 represents that the range accuracy remains acceptable out to the range 1302 when estimating the range to the antenna at the center using RSSI techniques.

Range 1304 has a range accuracy that remains acceptable to a range 1304 where the range 1304 is smaller than range 1302 but has more accuracy than RSSI techniques. Range 1304 represents that the range accuracy remains acceptable out to the range 1304 when estimating the range to the antenna using FM RTT range measurement techniques.

Range 1306 has a range accuracy that remains acceptable to a range 1306 where the range 1306 is similar to range 1304 as its accuracy is still determined by the FM RTT techniques. Range 1306 to the antenna is augmented with angle of arrival and/or angle of departure measurements which enables localizing the vehicle with single range and single AoA/AoD.

Range 1308 has a range accuracy that remains acceptable to a range 1308 where the range 1308 is smaller than range 1306 but more accuracy than measuring the range using FM RTT. Range 1308 represents that the range accuracy remains acceptable out to the range 1308 when estimating the range to the antenna using a radar signal. Range 1308 to the antenna is augmented with angle of arrival and/or angle of departure measurements which enables localizing the vehicle with single range and single AoA/AoD.

The ranges 1302, 1304, 1306, 1308 are for illustrative purposes only and not to scale.

Figure 14A:
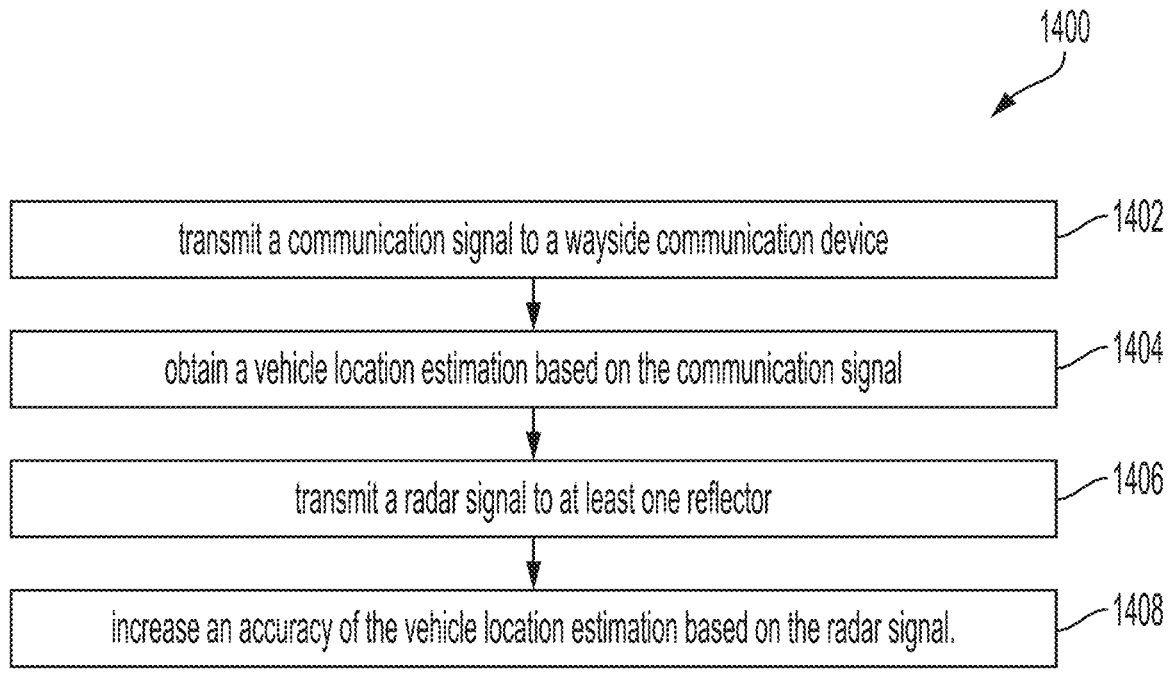
FIG. 14A is a flowchart of a method of locating a guideway-mounted vehicle, in accordance with some embodiments.

FIG. 14A is a flowchart 1400 of a method of locating a guideway-mounted vehicle, in accordance with some embodiments.

The guideway-mounted vehicle corresponds with vehicle 102 in FIG. 1A and FIG. 6-FIG. 11. Flow begins at block 1402.

At block 1402, a communication signal is transmitted to a wayside communication device. In some embodiments, block 1402 is performed by an on-board communication device, such as on-board communication device 120 in FIG. 1B, on-board communication device 300 in FIG. 3, and on-board communication device 620 in FIG. 6-FIG. 11. The communication signal corresponds with communication signal 352 in FIG. 3. The wayside communication device corresponds with wayside communication device 108 in FIG. 1A, wayside communication device 200 in FIG. 2, and wayside communication devices 608 in FIG. 6-FIG. 11. Flow then proceeds to block 1404.

At block 1404, a vehicle location estimation is obtained based on the communication signal. In some embodiments, the computer device 124 in FIG. 1B is configured to perform block 1404. Flow then proceeds to block 1406.

At block 1406, a radar signal is transmitted to at least one reflector. In some embodiments, block 1406 is performed by the radar system 122 in FIG. 1B, radar system 500 in FIG. 5, and radar 622 in FIG. 6-FIG. 11. The radar signal corresponds with radar signal 550 in FIG. 5. The at least one reflector corresponds with reflectors 110 in FIG. 1A, reflector 1A, reflector 2A, and reflector 3A on side A of FIG. 6-FIG. 11, reflector 1B, reflector 2B, reflector 3B on side B of FIG. 6-FIG. 11, and reflector 1204 of FIG. 12. Flow then proceeds to block 1408.

At block 1408, an accuracy of the vehicle location estimation is increased based on the radar signal. In some embodiments, block 1408 is performed by the computer device 124 in FIG. 1B. The radar signal corresponds with radar signal 550 in FIG. 5.

Figure 14B:
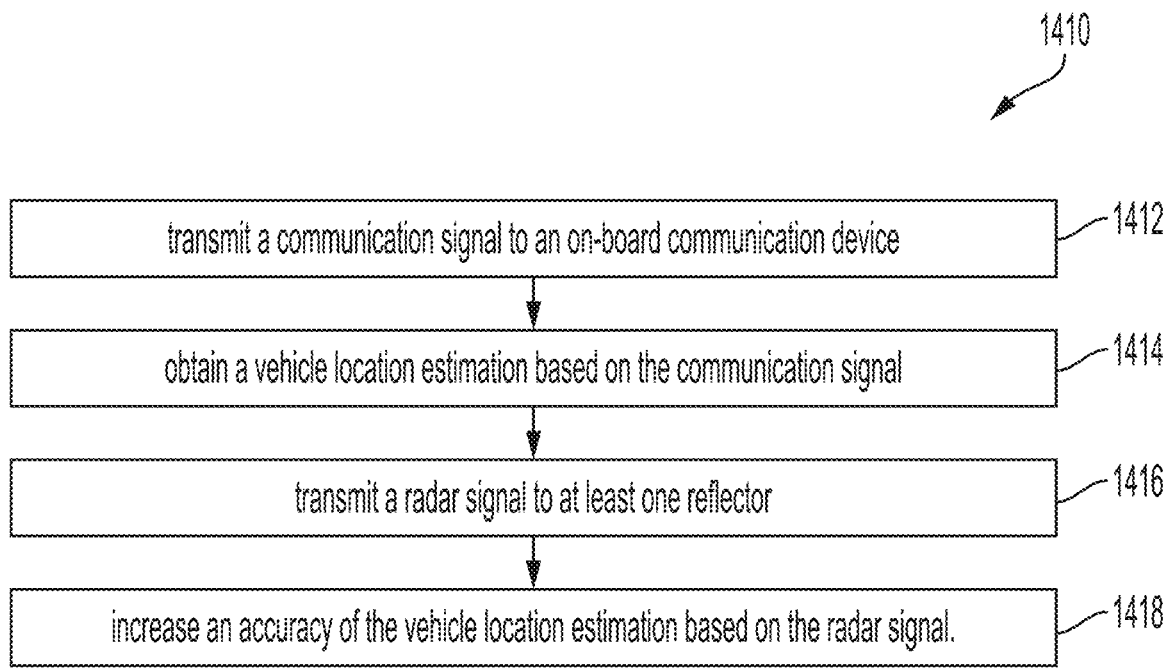
FIG. 14B is a flowchart of a method of locating a guideway-mounted vehicle, in accordance with some embodiments.

FIG. 14B is a flowchart 1410 of a method of locating a guideway-mounted vehicle, in accordance with some embodiments.

The guideway-mounted vehicle corresponds with vehicle 102 in FIG. 1A and FIG. 6-FIG. 11. Flow begins at block 1412.

At block 1412, a communication signal is transmitted to an on board communication device. In some embodiments, block 1412 is performed by a wayside communication device, such as wayside communication device 108 in FIG. 1A, wayside communication device 200 in FIG. 2, and wayside communication devices 608 in FIG. 6-FIG. 11. The communication signal corresponds with communication signal 252 in FIG. 2. The on-board communication device corresponds with wayside communication device 108 in FIG. 1A, wayside communication device 200 in FIG. 2, and wayside communication devices 608 in FIG. 6-FIG. 11. Flow then proceeds to block 1404.

At block 1414, a vehicle location estimation is obtained based on the communication signal. In some embodiments, the computer device 124 in FIG. 1B is configured to perform block 1414. Flow then proceeds to block 1416.

At block 1416, a radar signal is transmitted to at least one reflector. In some embodiments, block 1416 is performed by the radar system 122 in FIG. 1B, radar system 500 in FIG. 5, and radar 622 in FIG. 6-FIG. 11. The radar signal corresponds with radar signal 550 in FIG. 5. The at least one reflector corresponds with reflectors 110 in FIG. 1A, reflector 1A, reflector 2A, and reflector 3A on side A of FIG. 6-FIG. 11, reflector 1B, reflector 2B, reflector 3B on side B of FIG. 6-FIG. 11, and reflector 1204 of FIG. 12. Flow then proceeds to block 1418.

At block 1418, an accuracy of the vehicle location estimation is increased based on the radar signal. In some embodiments, block 1418 is performed by the computer device 124 in FIG. 1B. The radar signal corresponds with radar signal 550 in FIG. 5.

Figure 15A:
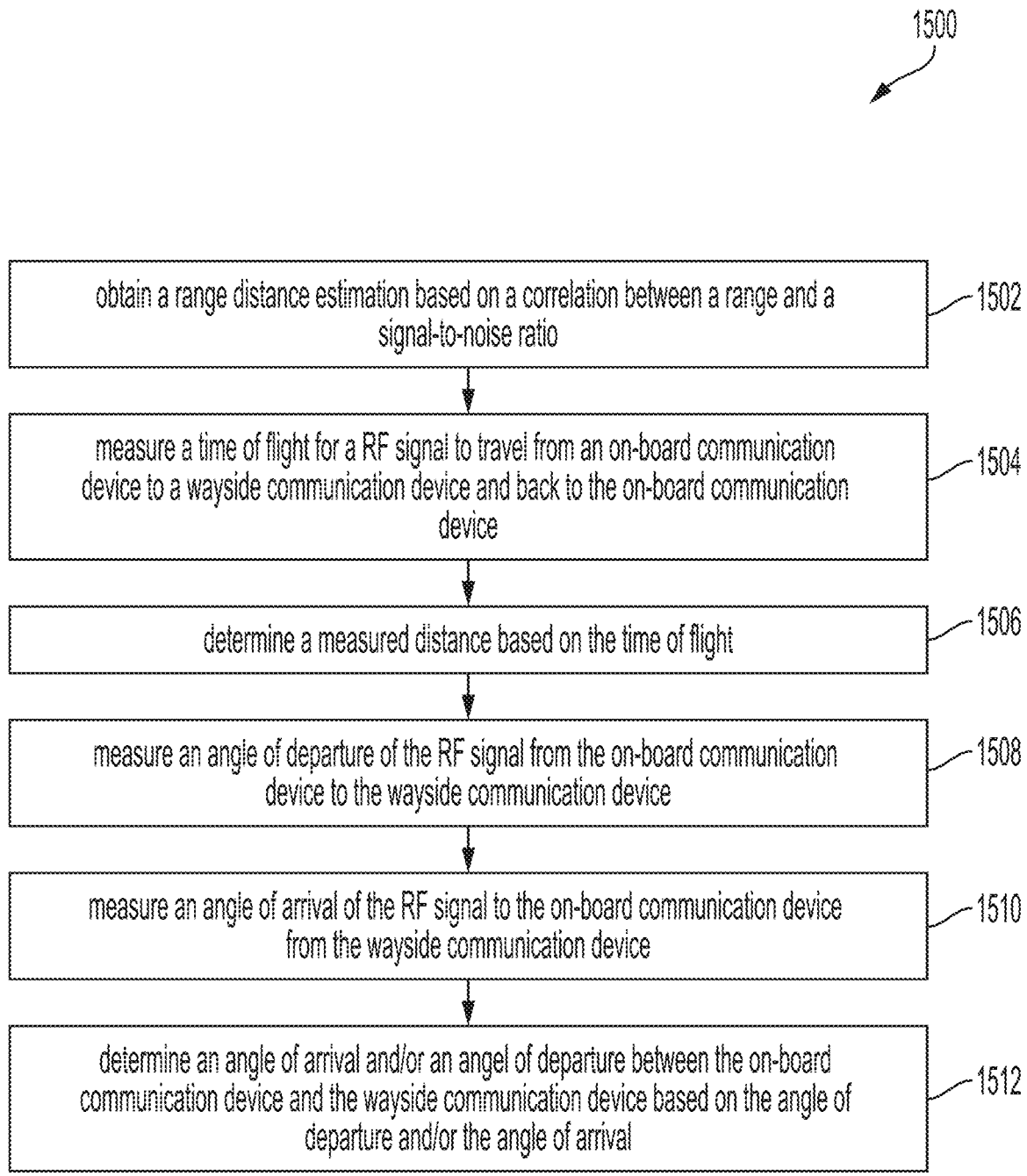
FIG. 15A is a flowchart of a method of obtaining a range estimation based on a communication signal, in accordance with some embodiments.

FIG. 15A is a flowchart 1500 of a method of obtaining a range estimation based on a communication signal, in accordance with some embodiments.

The flowchart 1500 corresponds to block 1404 in FIG. 14A, in accordance with some embodiments. Flow begins at block 1502.

At block 1502, a range distance estimation based on a correlation between a range and a signal to noise ratio is obtained. In some embodiments, the signal-to-noise ratio correlation to range distance estimation is an RSSI estimation where the signal to noise distribution is based on Poisson's distribution. It should be noted that block 1502 is performed several times, such as when there are multiple wayside communication devices at a particular location, such as the examples shown in FIG. 6-FIG. 11 having wayside communication device 608A and wayside communication device 608B. Flow then proceeds to block 1504.

At block 1504, a time of flight is measured for an RF signal to travel from an on-board communication device to a wayside communication device and back to the on-board communication device. In some embodiments, block 1504 is performed multiple times, such as when there are multiple on-board communication devices (See on-board communication devices 120 in FIG. 1A) and/or multiple wayside communication devices (See wayside communication device 608A and wayside communication device 608B in FIG. 6-FIG. 11). In some embodiments, the RF signal is a communication signal. Flow then proceeds to block 1506.

At block 1506, a measured distance is determined based on the time of flight. In some embodiments, block 1506 is performed multiple times such as when block 1504 is performed various times. Flow then proceeds to block 1508.

At block 1508, an angle of departure of the RF signal from the on-board communication device to the wayside communication device is measured. In some embodiments, block 1508 is performed multiple times, such as when there are multiple on-board communication devices (See on-board communication devices 120 in FIG. 1A) and/or multiple wayside communication devices (See wayside communication device 608A and wayside communication device 608B in FIG. 6-FIG. 11). Flow then proceeds to block 1510.

At block 1510, an angle of arrival of a second RF signal from the wayside communication device to the on-board communication device is measured. In some embodiments, block 1508 is performed multiple times, such as when there are multiple on-board communication devices (See on-board communication devices 120 in FIG. 1A) and/or multiple wayside communication devices (See wayside communication device 608A and wayside communication device 608B in FIG. 6-FIG. 11). In some embodiments, the second RF signal is a second communication signal. Flow then proceeds to block 1512.

At block 1512, an angle of arrival and/or angle of departure between the on-board communication device and the wayside communication device based on the angle of departure and/or the angle of arrival is determined. In some embodiments, block 1512 is performed multiple times, such as when block 1508 and block 1510 are performed multiple times.

In FIG. 15A, all of blocks 1502-1512 are performed. In some embodiments, all of the angle of arrival and/or angle of departure from these blocks are input into a fusion algorithm to obtain a position estimation. In some embodiments, only block 1502 is performed but not blocks 1504-1512 (block 1502 is referred to as subset 1 of blocks). In some embodiments, only blocks 1504 and 1506 are performed but not 1502 and 1508-1512 (combination of block 1504 and block 1506 is referred to as subset 2 of blocks). In some embodiments, only blocks 1508 and 1512 are performed but not blocks 1502-1506 and 1510 (combination of block 1508 and 1512 are referred to as subset 3 of blocks). In some embodiments, only blocks 1510 and 1512 are performed but not blocks 1502-1506 and 1508 (combination of block 1510 and 1512 are referred to as subset 4 of blocks). In some embodiments, only blocks 1508, 1510 and 1512 are performed but not blocks 1502-1506 (combination of block 1508, 1510 and 1512 are referred to as subset 5 of blocks). In some embodiments, more than one of subset 1, 2, 3, 4, 5 of blocks is performed but not all of subset 1, 2, 3, 4, 5 of blocks.

Figure 15B:
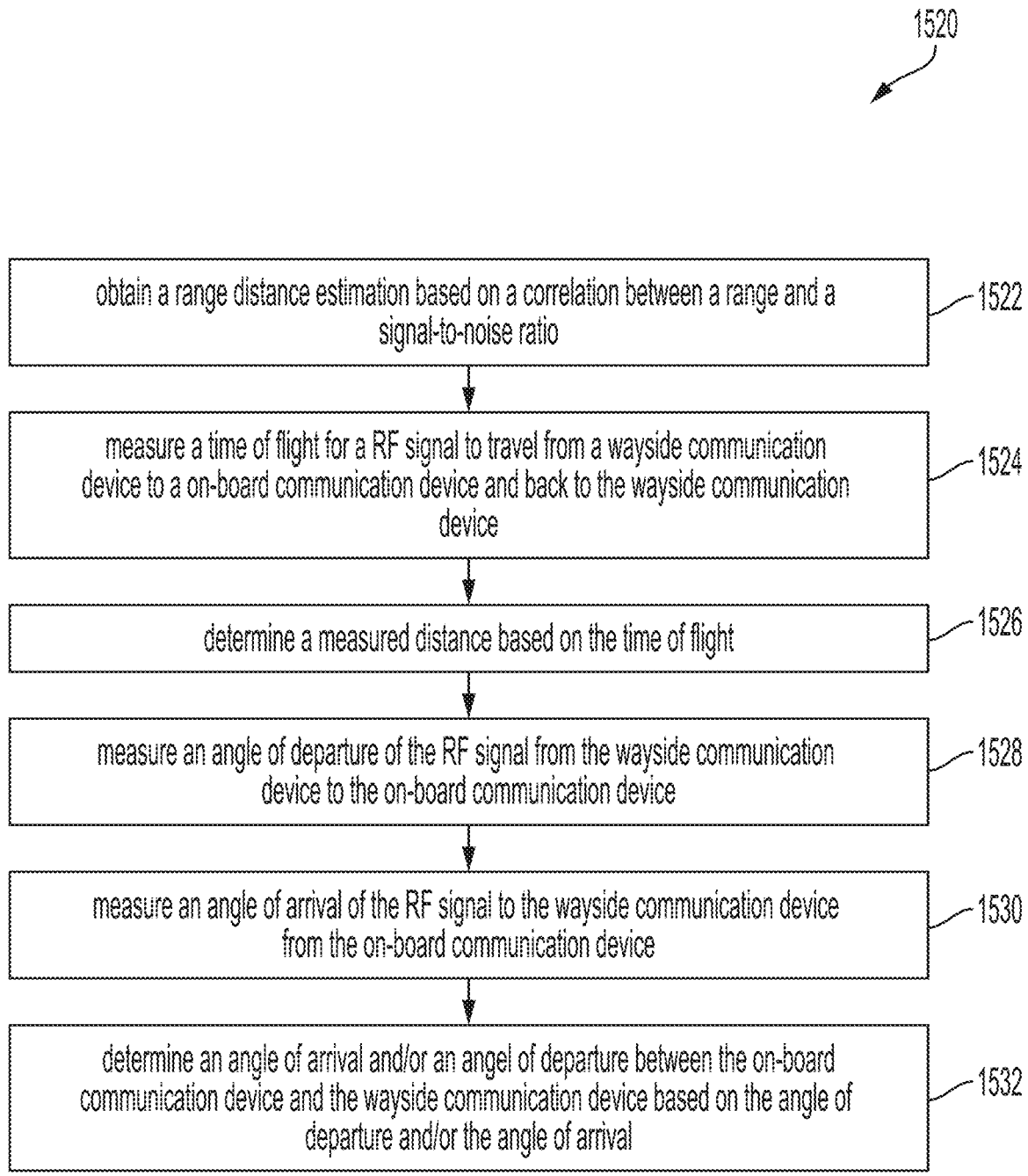
FIG. 15B is a flowchart of a method of obtaining a range estimation based on a communication signal, in accordance with some embodiments.

FIG. 15B is a flowchart 1520 of a method of obtaining a range estimation based on a communication signal, in accordance with some embodiments.

The flowchart 1520 corresponds to block 1414 in FIG. 14B, in accordance with some embodiments. Flow begins at block 1522.

At block 1522, a range distance estimation based on a correlation between a range and a signal to noise ratio is obtained. In some embodiments, the signal-to-noise ratio correlation to range distance estimation is an RSSI estimation where the signal to noise distribution is based on Poisson's distribution. It should be noted that block 1522 is performed several times, such as when there are multiple on-board communication devices on board the guideway-mounted vehicle, such as the example shown in FIG. 1A having on-board communication devices 120. Flow then proceeds to block 1524.

At block 1524, a time of flight is measured for an RF signal to travel from a wayside communication device to an on-board communication device and back to the wayside communication device. In some embodiments, block 1524 is performed multiple times, such as when there are multiple on-board communication devices (See on-board communication devices 120 in FIG. 1A) and/or multiple wayside communication devices (See wayside communication device 608A and wayside communication device 608B in FIG. 6-FIG. 11). In some embodiments, the RF signal is a communication signal. Flow then proceeds to block 1526.

At block 1526, a measured distance is determined based on the time of flight. In some embodiments, block 1526 is performed multiple times such as when block 1524 is performed various times. Flow then proceeds to block 1528.

At block 1528, an angle of departure of the RF signal from the wayside communication device to the on-board communication device is measured. In some embodiments, block 1528 is performed multiple times, such as when there are multiple on-board communication devices (See on-board communication devices 120 in FIG. 1A) and/or multiple wayside communication devices (See wayside communication device 608A and wayside communication device 608B in FIG. 6-FIG. 11). Flow then proceeds to block 1530.

At block 1530, an angle of arrival of a second RF signal from the on-board communication device to the wayside communication device is measured. In some embodiments, block 1528 is performed multiple times, such as when there are multiple on-board communication devices (See on-board communication devices 120 in FIG. 1A) and/or multiple wayside communication devices (See wayside communication device 608A and wayside communication device 608B in FIG. 6-FIG. 11). In some embodiments, the second RF signal is a second communication signal. Flow then proceeds to block 1532.

At block 1532, an angle of arrival and/or angle of departure between the on-board communication device and the wayside communication device based on the angle of departure and/or the angle of arrival is determined. In some embodiments, block 1532 is performed multiple times, such as when block 1528 and block 1530 are performed multiple times.

In FIG. 15B, all of blocks 1522-1532 are performed. In some embodiments, all of the angle of arrival and/or angle of departure from these blocks are input into a fusion algorithm to obtain a position estimation. In some embodiments, only block 1522 is performed but not blocks 1524-1532 (block 1522 is referred to as subset 1 of blocks). In some embodiments, only blocks 1524 and 1526 are performed but not 1522 and 1528-1532 (combination of block 1524 and block 1526 is referred to as subset 2 of blocks). In some embodiments, only blocks 1528 and 1532 are performed but not blocks 1522-1526 and 1530 (combination of block 1528 and 1532 are referred to as subset 3 of blocks). In some embodiments, only blocks 1530 and 1532 are performed but not blocks 1522-1526 and 1528 (combination of block 1530 and 1532 are referred to as subset 4 of blocks). In some embodiments, only blocks 1528, 1530 and 1532 are performed but not blocks 1522-1526 (combination of block 1528, 1530 and 1532 are referred to as subset 5 of blocks). In some embodiments, more than one of subset 1, 2, 3, 4, 5 of blocks is performed but not all of subset 1, 2, 3, 4, 5 of blocks.

Figure 16A:
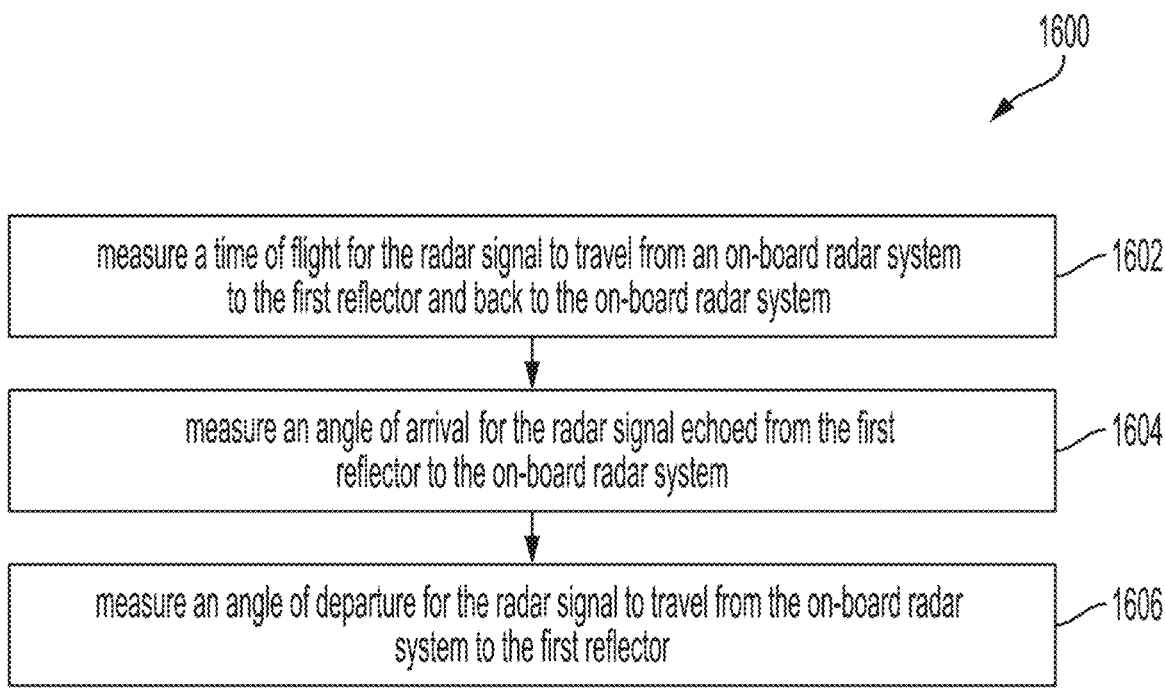
FIG. 16A is a flowchart of a method of an increasing accuracy of the vehicle location estimation based on the radar signal, in accordance with some embodiments.

FIG. 16A is a flowchart 1600 of a method of an increasing accuracy of the vehicle location estimation based on the radar signal, in accordance with some embodiments.

The flowchart 1600 corresponds to block 1408 in FIG. 14A, in accordance with some embodiments.

At block 1602, a time of flight is measured for the radar signal to travel from an on-board radar system to a reflector and back to the on-board radar system. In some embodiments, block 1602 is performed multiple times such as when there are multiple radar systems, such as radar system 122 in FIG. 1B. Flow then proceeds to block 1604.

At block 1604, an angle of arrival is measured for the radar signal echoed from the first reflector to the on-board radar system. Flow then proceeds to block 1606 . . . .

At block 1606, an angle of departure is measured for the radar signal to travel from the on-board radar system to the first reflector.

In some embodiments, at block 1604, an angle of arrival is measured for the radar signal echoed from the first reflector to a wayside radar system. Flow then proceeds to block 1606.

At block 1606, an angle of departure is measured for the radar signal to travel from a wayside radar system to the first reflector.

Figure 16B:
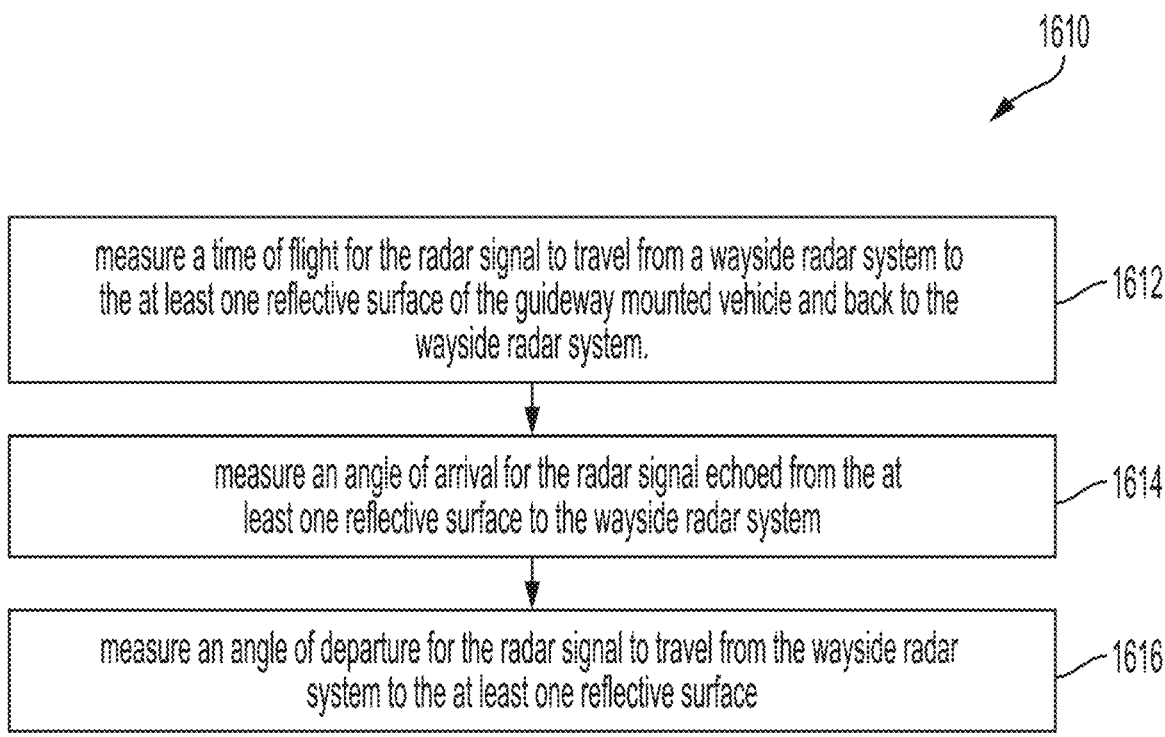
FIG. 16B is a flowchart of a method of an increasing accuracy of the vehicle location estimation based on the radar signal, in accordance with some embodiments.

FIG. 16B is a flowchart 1610 of a method of an increasing accuracy of the vehicle location estimation based on the radar signal, in accordance with some embodiments.

The flowchart 1610 corresponds to block 1418 in FIG. 14B, in accordance with some embodiments.

At block 1612, a time of flight is measured for the radar signal to travel from a wayside radar system to at least one reflective surface of the guideway-mounted vehicle and back to the wayside radar system. In some embodiments, block 1612 is performed multiple times such as when there are multiple radar systems at a location of the wayside. Flow then proceeds to block 1614.

At block 1614, an angle of arrival is measured for the radar signal echoed from the at least one reflective surface to the wayside radar system. Flow then proceeds to block 1616.

At block 1616, an angle of departure is measured for the radar signal to travel from the wayside radar system to the at least one reflective surface.

In some embodiments, at block 1614, an angle of arrival is measured for the radar signal echoed from the at least one reflective surface to a wayside radar system. Flow then proceeds to block 1616.

Figure 17A:
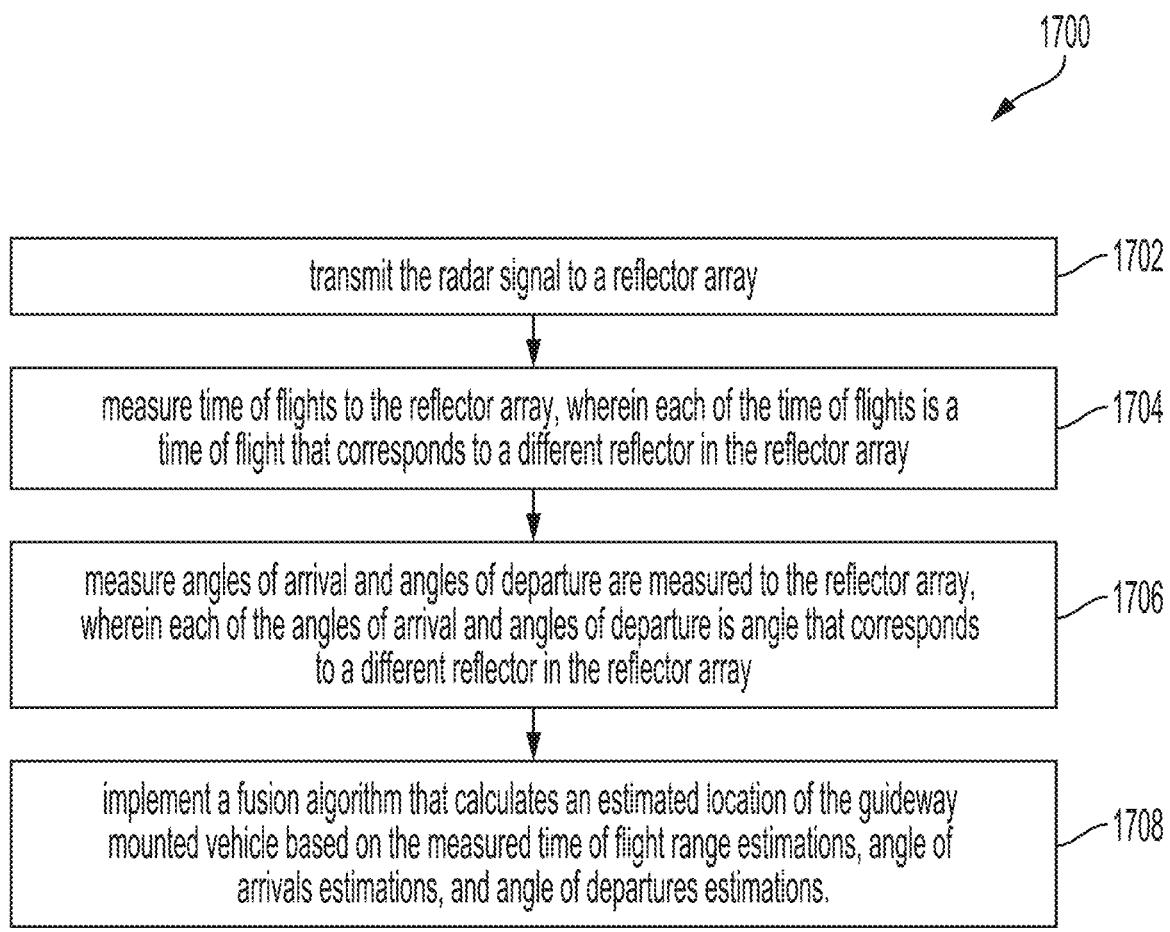
FIG. 17A is a flowchart of a method of locating a guideway-mounted vehicle, in accordance with some embodiments.

FIG. 17A is a flowchart 1700 of a method of locating a guideway-mounted vehicle, in accordance with some embodiments.

Flowchart 1700 includes blocks 1702-1706. Block 1702 corresponds to block 1406 in FIG. 14A in accordance with some embodiments. Blocks 1704 and 1706 correspond with block 1408 in FIG. 14A, in accordance with some embodiments.

At block 1702, the radar signal is transmitted to a reflector array. Exemplary reflector arrays include the reflector arrays of reflector 1A, reflector 2A, reflector 3A on side A and reflector 1B, reflector 2B, reflector 3B on side B shown in FIG. 6-FIG. 11. Flow then proceeds to block 1704.

At block 1704, time of flights are measured to the reflector array, wherein each of the time of flights is a time of flight that corresponds to a different reflector in the reflector array. Flow then proceeds to block 1706.

At block 1706, angles of arrival and angles of departure are measured to the reflector array, wherein each of the angles of arrival and angles of departure is an angle that corresponds to a different reflector in the reflector array. Flow then proceeds to block 1708.

At block 1708, a fusion algorithm is implemented that calculates an estimated location of the guideway-mounted vehicle based on the measured time of flight range estimations, angle of arrival estimations and angle of departure estimations. The range estimation corresponds with the range estimation determined at 1404 of FIG. 14A. In FIG. 17A, a single radar signal is used to determine all of the time of flights to each of the reflectors. The angle of arrival and angle of departure estimations corresponds with the angle of arrival and angle of departure estimations determined at 1408 of FIG. 14A. In FIG. 17A, radar signals are used to determine all of the time of flights, angle of arrivals and angle of departures to each of the reflectors.

Figure 17B:
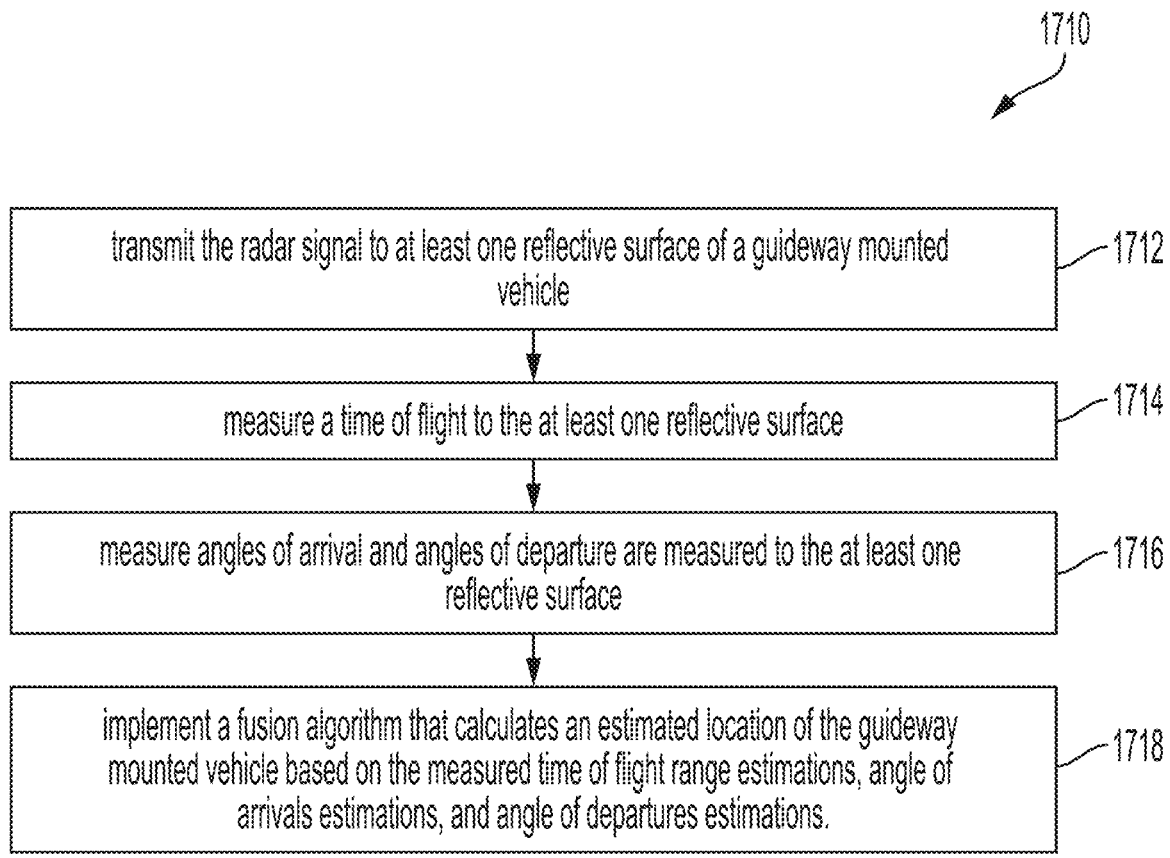
FIG. 17B is a flowchart of a method of locating a guideway-mounted vehicle, in accordance with some embodiments.

FIG. 17B is a flowchart 1710 of a method of locating a guideway-mounted vehicle, in accordance with some embodiments.

Flowchart 1710 includes blocks 1712-1716. Block 1712 corresponds to block 1416 in FIG. 14B in accordance with some embodiments. Blocks 1714 and 1716 correspond with block 1418 in FIG. 14B, in accordance with some embodiments.

At block 1712, the radar signal is transmitted to at least one reflective surface of the guideway-mounted vehicle. Flow then proceeds to block 1714.

At block 1714, a time of flight are measured to the at least one reflective surface. Flow then proceeds to block 1716.

At block 1716, angles of arrival and angles of departure are measured to the at least one reflective surface, wherein each of the angles of arrival and angles of departure is an angle that corresponds to a different reflector in the at least one reflective surface. Flow then proceeds to block 1718.

At block 1718, a fusion algorithm is implemented that calculates an estimated location of the guideway-mounted vehicle based on the measured time of flight range estimations, angle of arrival estimations and angle of departure estimations.

Figure 18:
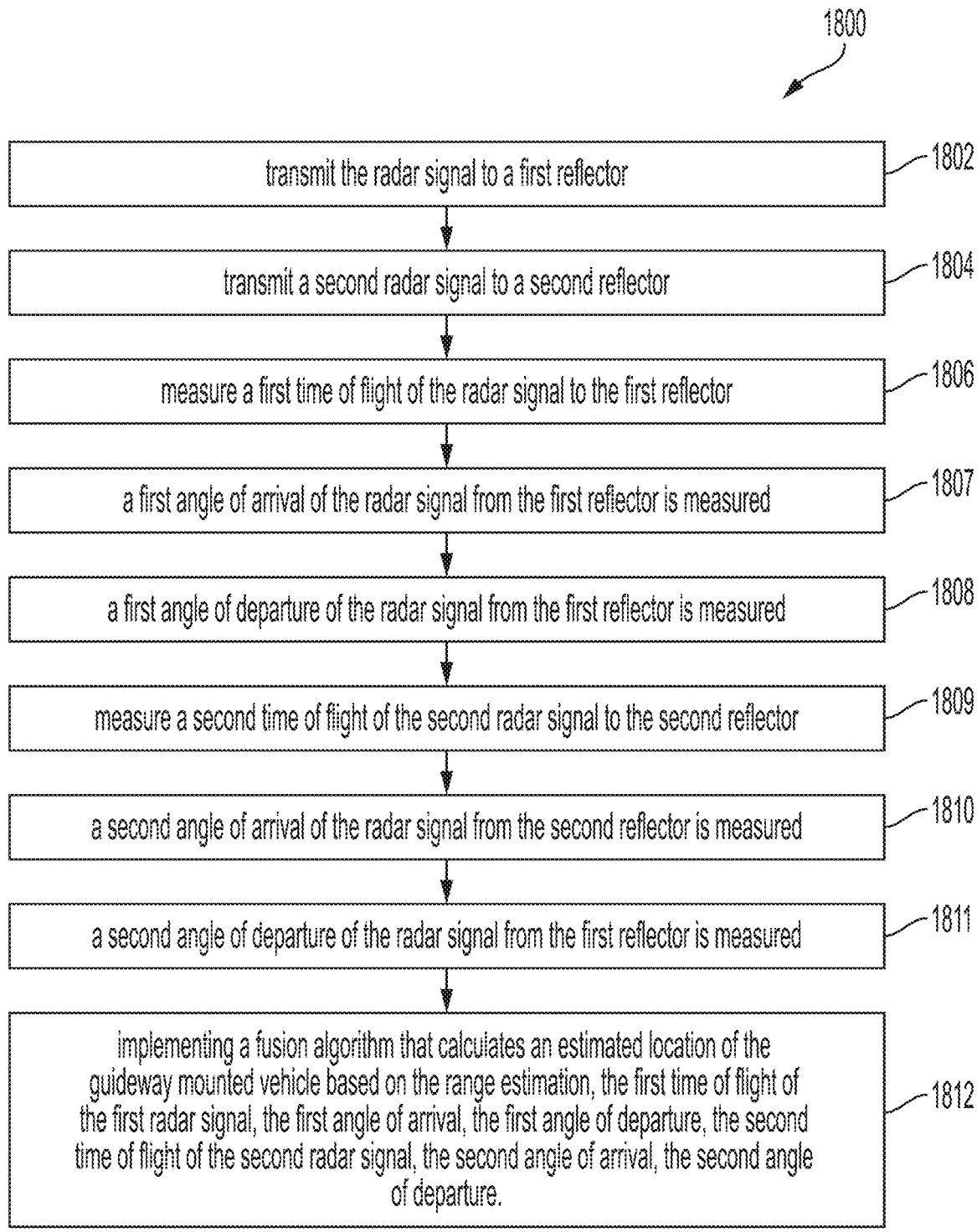
FIG. 18 is a flowchart of a method of locating a guideway-mounted vehicle, in accordance with some embodiments.

FIG. 18 is a flowchart 1800 of a method of locating a guideway-mounted vehicle, in accordance with some embodiments.

Flowchart 1800 includes blocks 1802-1810. Block 1802 corresponds to block 1406 in FIG. 14 in accordance with some embodiments. Blocks 1806-1810 correspond with block 1408 in FIG. 14, in accordance with some embodiments.

At block 1802, the radar signal is transmitted to a first reflector. Exemplary first reflector includes reflector 1A, reflector 2A, reflector 3A on side A and reflector 1B, reflector 2B, reflector 3B on side B shown in FIG. 6-FIG. 11. Exemplary radar signal is radar signal 550 in FIG. 5. In some embodiments, the radar system that generates the radar signal is on in the vehicle and is an on-board radar system and, in some embodiments, the radar system is wayside to the guideway and is an wayside radar system. Flow then proceeds to block 1804.

At block 1804, a second radar signal is transmitted to a second reflector. Exemplary first reflector includes reflector 1A, reflector 2A, reflector 3A on side A and reflector 1B, reflector 2B, reflector 3B on side B shown in FIG. 6-FIG. 11. Exemplary second radar signal is radar signal 550 in FIG. 5. Flow then proceeds to block 1806.

At block 1806, a first time of flight of the radar signal to the first reflector is measured. Flow then proceeds to block 1807.

At block 1807, a first angle of arrival of the radar signal from the first reflector is measured. Flow then proceeds to block 1808.

At block 1808, a first angle of departure of the radar signal to the first reflector is measured. Flow then proceeds to block 1809.

At block 1809, a second time of flight of the second radar signal to the second reflector is measured. Flow then proceeds to block 1810.

At block 1810, a second angle of arrival of the radar signal from the second reflector is measured. Flow then proceeds to block 1811.

At block 1811, a second angle of departure of the radar signal to the first reflector is measured. Flow then proceeds to block 1812.

At block 1812, a fusion algorithm is implemented that calculates an estimated location of the guideway-mounted vehicle based on the first time of flight (range estimation to the first reflector), the first angle of arrival (from the first reflector), the first angle of departure (to the first reflector), the second time of flight (range estimation to the second reflector), the second angle of arrival (from the second reflector), and the second angle of departure (to the second reflector). The range estimation corresponds with the range estimation determined in block 1404 in FIG. 14. Note that in some embodiments more than two radar signals are transmitted to measure more than two time of flights, more than two angle of arrivals and more than two angle of departures. These additional radar signals are transmitted to additional radar reflectors such as to a third radar reflector, in some embodiments. These additional time of flights, angle of arrivals and angle of departures are also input into the fusion algorithm to increase the accuracy of the estimated location of the guideway-mounted vehicle.

Figure 19:
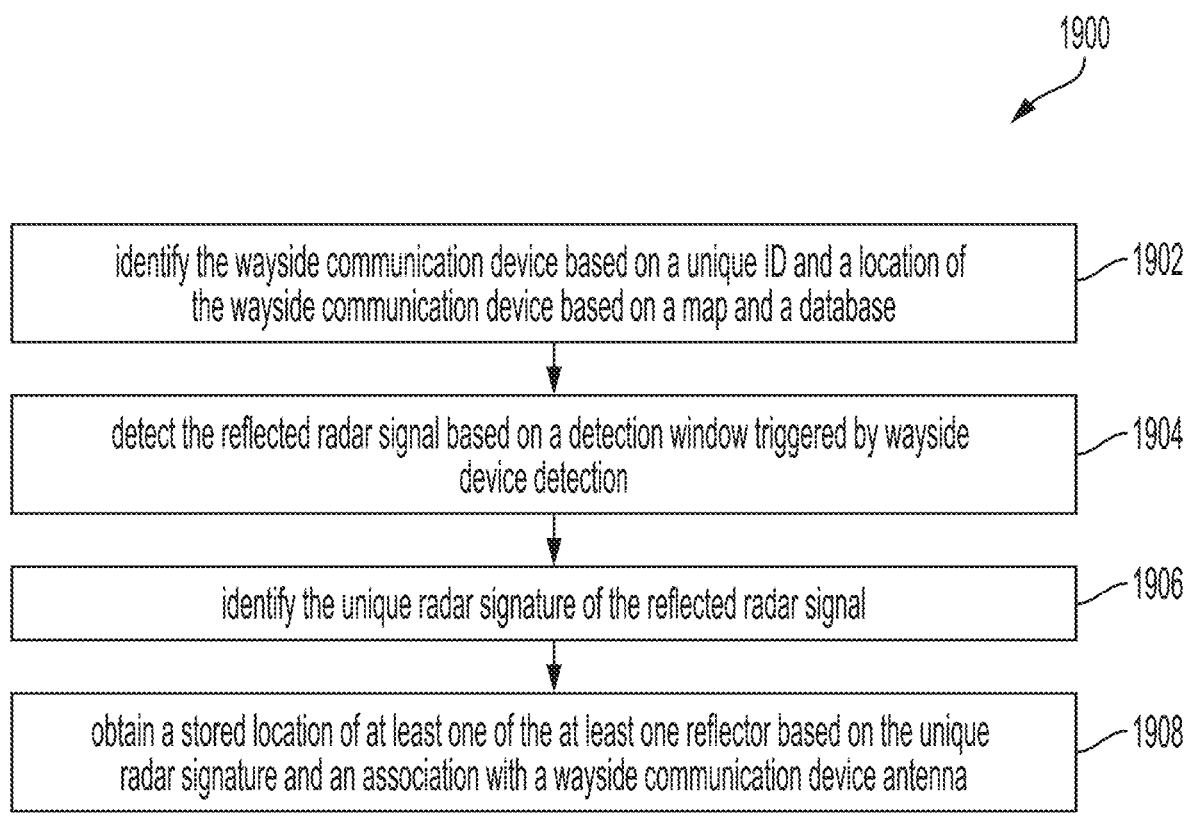
FIG. 19 is a flowchart of a method of an increasing accuracy of the range estimation based on the radar signal, in accordance with some embodiments.

FIG. 19 is a flowchart 1900 of a method of an increasing accuracy of the range estimation based on the radar signal, in accordance with some embodiments.

The flowchart 1900 corresponds to block 1408 in FIG. 14, in accordance with some embodiments. Flowchart 1900 includes blocks 1902-1908. Flow begins at block 1902.

At block 1902, the wayside communication device is identified based on a unique ID and a location of the wayside communication device is determined based on a map and a database. Flow then proceeds to block 1904.

At block 1904, a reflected radar signal is detected based on a detection window triggered by wayside device detection. Flow then proceeds to block 1906. In some embodiments, a reflector array is placed at a particular location having reflectors arranged to reflect the radar signal so that the reflected radar signal has a unique radar signature.

At block 1906, the unique radar signature of the reflected radar signal is detected. In some embodiments, the unique radar signature is the unique signature of the reflector array. Flow then proceeds at block 1908.

At block 1908, a stored location of the identified reflector or reflectors is obtained based on the unique radar signature and the association with the location. In some embodiments, a digital version of the unique signature is transmitted to a server to find a match in a database. Once the match is found, the reflector location data associated with the identified wayside communication device is obtained to identify the location of the reflector. In this manner, reflector arrays or other reflective objects with unique radar signatures are used to associate the location of the reflector or reflectors array with the location of the wayside communication device.

Figure 20:
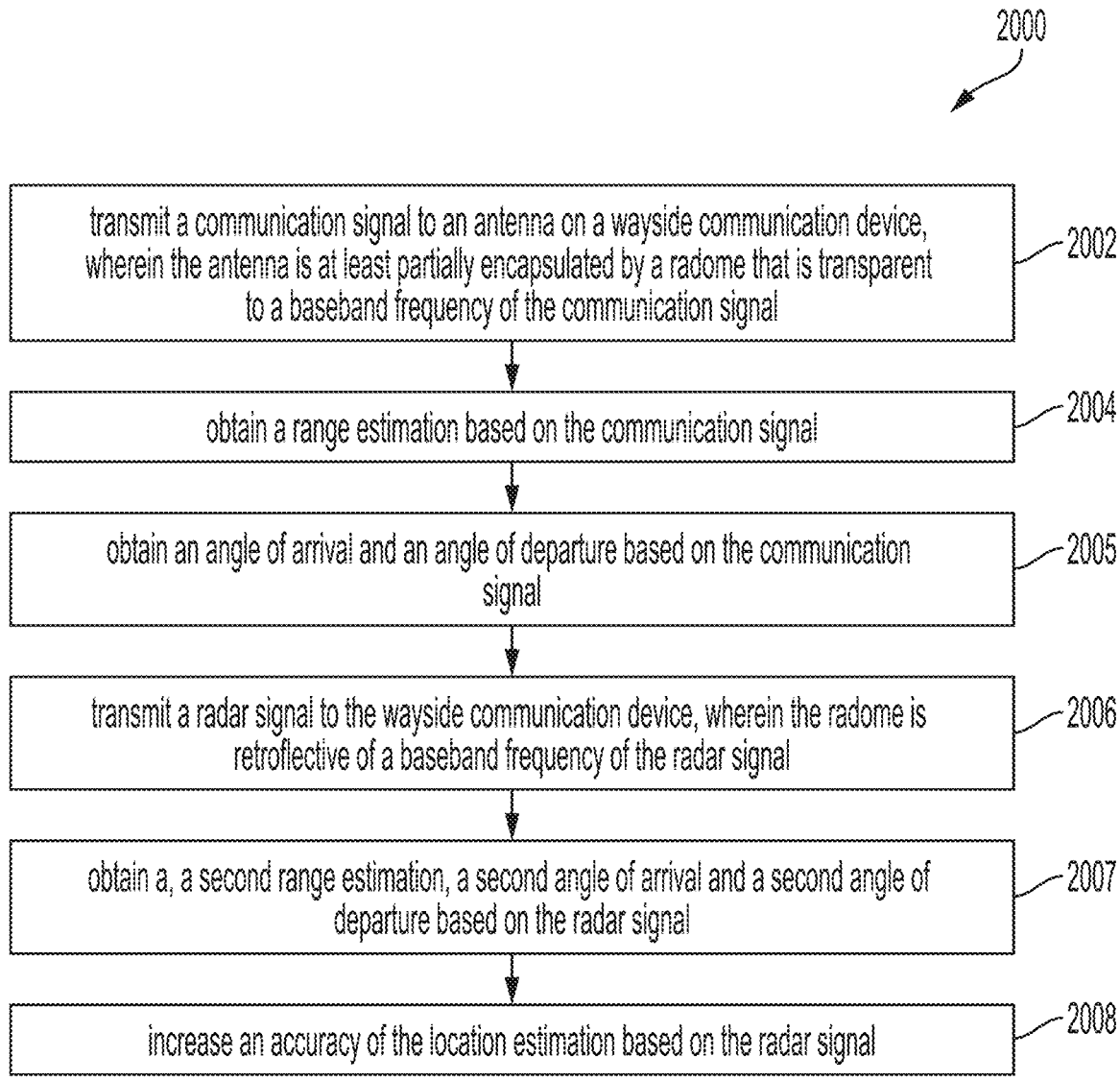
FIG. 20 is a flowchart of a method of locating a guideway-mounted vehicle, in accordance with some embodiments.

FIG. 20 is a flowchart 2000 of a method of locating a guideway-mounted vehicle, in accordance with some embodiments.

The guideway-mounted vehicle corresponds with vehicle 102 in FIG. 1A and FIG. 6-FIG. 11. Flow begins at block 2002.

At block 2002, a communication signal is transmitted to an antenna on a wayside communication device, wherein the antenna is at least partially encapsulated by a radome that is transparent to a base frequency band of the communication signal. In some embodiments, block 2002 is performed by an on-board communication device, such as on-board communication device 120 in FIG. 1B, on-board communication device 300 in FIG. 3, and on-board communication device 620 in FIG. 6-FIG. 11. The communication signal corresponds with communication signal 352 in FIG. 3. The wayside communication device corresponds with wayside communication device 108 in FIG. 1A, wayside communication device 200 in FIG. 2, and wayside communication devices 608 in FIG. 6-FIG. 11. In some embodiments, the antenna of the wayside communication device corresponds with antenna 1202 in FIG. 12. In some embodiments, the radome corresponds with the reflector 1204 in FIG. 12. In some embodiments, the base frequency band of the communication signal is between 2.4 GHz and 10 GHz. Flow then proceeds to block 1404.

At block 2004, a range estimation is obtained based on the communication signal. In some embodiments, the computer device 124 in FIG. 1B is configured to perform block 2004. Flow then proceeds to block 2005.

At block 2005, an angle of arrival and angle of departure are obtained based on the communication signal. Flow then proceeds to block 2006.

At block 2006, a radar signal is transmitted to the wayside communication device, wherein the radome is retroreflective at a base frequency band of the radar signal. In some embodiments, block 2006 is performed by the radar system 122 in FIG. 1B, radar system 500 in FIG. 5, and radar 622 in FIG. 6-FIG. 11. The radar signal corresponds with radar signal 550 in FIG. 5. In some embodiments, the base frequency band of the radar signal is between 76 GHz to 81 GHz. Flow then proceeds to block 2007.

At block 2007, a second range estimation, a second angle of arrival and a second angle of departure are obtained based on the radar signal. Flow then proceeds to block 2008

At block 2008, an accuracy of the location estimation is increased based on the radar signal range, AoA and AoD estimations. In some embodiments, block 1408 is performed by the computer device 124 in FIG. 1B.

Figure 21:
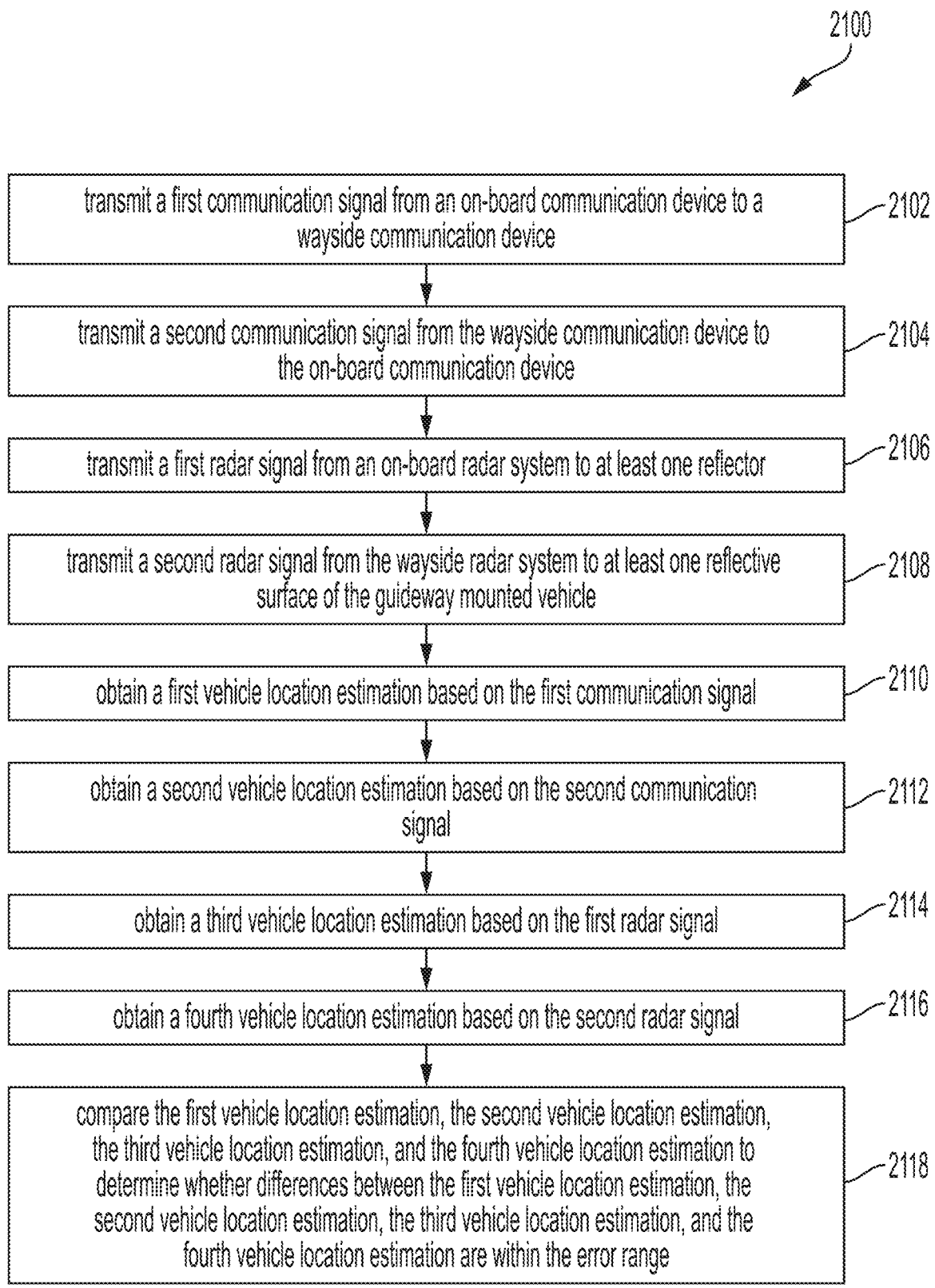
FIG. 21 is a flowchart of a method of locating a guideway-mounted vehicle, in accordance with some embodiments.

FIG. 21 is a flowchart 2100 of a method of locating a guideway-mounted vehicle, in accordance with some embodiments.

Flowchart 2100 includes blocks 2102-2118. Flow begins at block 2102.

At block 2102, a first communication signal is transmitted from an on-board communication device to a wayside communication device. Flow then proceeds to block 2104.

At block 2104, a second communication signal from the wayside communication device to the on-board communication device. Flow then proceeds to block 2106.

At block 2106, a first radar signal is transmitted from an on-board radar system to at least one reflector. Flow then proceeds to block 2108.

At block 2108, a second radar signal is transmitted from the wayside radar system to at least one reflective surface of the guideway-mounted vehicle. Flow then proceeds to block 2110.

At block 2110, a first vehicle location estimation is obtained based on the first communication signal. Flow then proceeds to block 2112.

At block 2112, a second vehicle location estimation is obtained based on the second communication signal. Flow then proceeds to block 2114.

At block 2114, a third vehicle location estimation is obtained based on the first radar signal. Flow then proceeds to block 2116.

At block 2116, a fourth vehicle location estimation is obtained based on the second radar signal. Flow then proceeds to block 2118.

At block 2118, the first vehicle location estimation, the second vehicle location estimation, the third vehicle location estimation, and the fourth vehicle location estimation are compared to determine whether differences between the first vehicle location estimation, the second vehicle location estimation, the third vehicle location estimation, and the fourth vehicle location estimation are within the error range.

Figure 22:
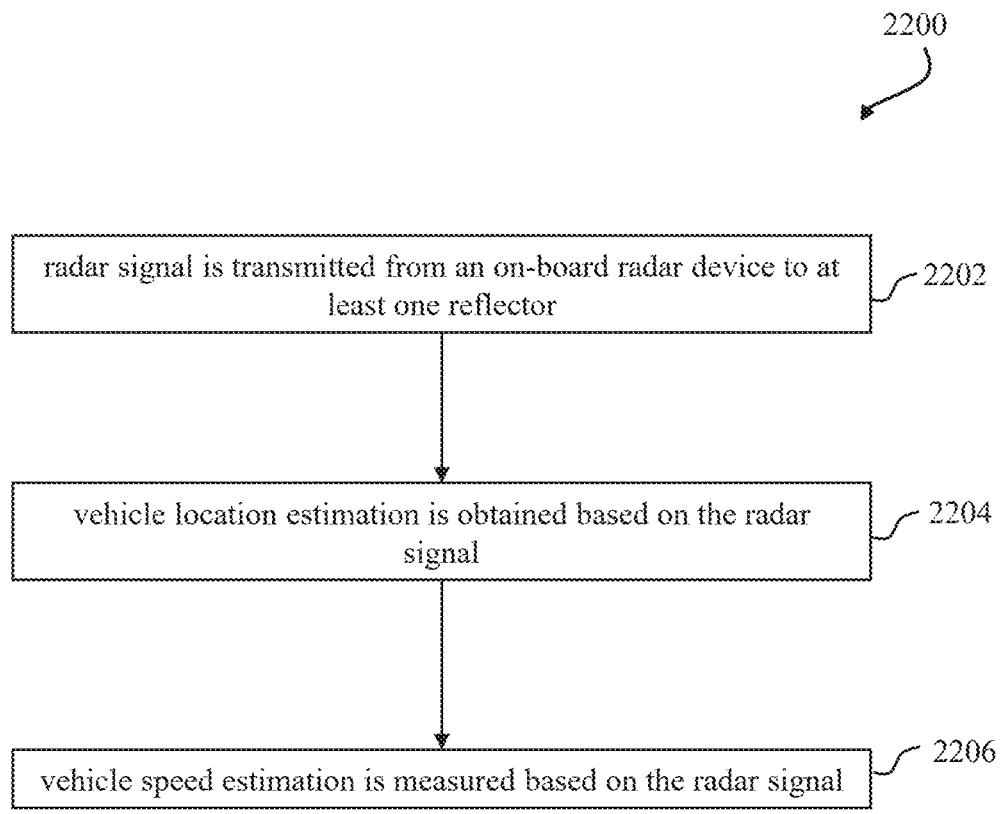
FIG. 22 is a flowchart of a method of locating a guideway-mounted vehicle, in accordance with some embodiments.

FIG. 22 is a flowchart 2200 of a method of locating a guideway-mounted vehicle, in accordance with some embodiments.

Flowchart 2200 includes blocks 2202-2206. Flow begins at block 2202.

At block 2202, a radar signal is transmitted from an on-board radar device to at least one reflector. Flow then proceeds to block 2204.

At block 2204, a vehicle location estimation is obtained based on the radar signal. In some embodiments, a high safety integrity vehicle location estimation of the guideway-mounted vehicle is determined by using a range estimation, AoD of the radar signal, and an AoA of the reflected radar signal. A location of the reflector(s) is known and is identified with a unique ID or based on a unique radar signature. Using the unique ID and/or unique radar signature, the location of the reflector is obtained from a database. Flow then proceeds to block 2204.

At block 2206, the vehicle speed estimation is measured based on the radar signal. In some embodiments, one of the advantages for using the reflector(s) is that the reflector(s) are stationary. Therefore, the relative radial speed measured represents the ground speed component along the line of sight (LOS) from the radar to the reflector. A transformation is calculated taking into account azimuth and elevation angles. The reflector eliminates the risk that the relative radial speed measured by the radar is measured with respect to a non-stationary target. In some embodiments, Doppler frequency-modulated continuous wave (FMCW) techniques are used to measure the range to a target in the field of view (FOV), the angular position of the target in the FOV, and the radial relative speed between the radar and the target. In some embodiments, non-Doppler FMCW techniques are used to measure the range to a target in the FOV, the angular position of the target in the FOV, and the radial relative speed between the radar and the target.

In some embodiments, a method of locating a guideway mounted vehicle, the method includes: transmitting a communication signal to a wayside communication device; obtaining a range estimation based on the communication signal; transmitting a radar signal to at least one reflector; and increasing an accuracy of the range estimation based on the radar signal. In some embodiments, the obtaining the range estimation based on the communication signal, includes obtaining a signal-to-noise ratio range distance correlation that correlates the range estimation with a signal-to-noise ratio of the communication signal based on a signal to noise distribution of the communication signal. In some embodiments, the at least one reflector includes a reflector array having reflectors arranged to reflect the radar signal so that the reflected radar signal has a unique radar signature and wherein the increasing the accuracy of the range estimation based on the radar signal includes: detecting the reflected radar signal; identifying the unique radar signature of the reflected radar signal; associating the reflectors with the wayside communication device based on the unique radar signature; and obtaining a stored location of at least one of the at least one reflector based on the unique radar signature and the association with the wayside communication device. In some embodiments, the obtaining the range estimation based on the communication signal, includes: measuring a time of flight for the communication signal to travel from an on-board communication device to the wayside communication device and back to the on-board communication device; and determining a measured distance based on the time of flight. In some embodiments, the at least one reflector includes a first reflector and wherein the increasing the accuracy of the range estimation based on the radar signal includes: measuring a time of flight for the radar signal to travel from an on-board radar system to the first reflector and back to the on-board radar system, wherein the on-board radar system is on board the guideway mounted vehicle. In some embodiments, the obtaining the range estimation based on the communication signal, includes: measuring an angle of departure of the communication signal from an on-board communication device to the wayside communication device; measuring an angle of arrival of a second communication signal from the wayside communication device to the on-board communication device; and determining a location of the guideway mounted vehicle based on the range estimation, the angle of departure, and the angle of arrival. In some embodiments, the transmitting the communication signal to the wayside communication device includes transmitting the communication signal to an antenna on the wayside communication device, wherein the antenna is at least partially encapsulated by a radome that is transparent to a base frequency band of the communication signal, wherein the at least one reflector includes the radome; the transmitting the radar signal to the at least one reflector includes transmitting the radar signal to the radome of the wayside communication device, wherein the radome is retroreflective at a base frequency band of the radar signal. In some embodiments, the base frequency band of the communication signal is between 2.4 GHz to 10 GHz; and the base frequency band of the radar signal is between 76 GHz to 81 GHz. In some embodiments, the transmitting the radar signal to the at least one reflector includes transmitting the radar signal to a reflector array; wherein increasing the accuracy of the range estimation based on the radar signal includes measuring time of flights to the reflector array, wherein each of the time of flights is a time of flight that corresponds to a different reflector in the reflector array. In some embodiments, the increasing the accuracy of the range estimation based on the radar signal further includes implementing a fusion algorithm that calculates an estimated location of the guideway mounted vehicle based on the range estimation, an estimated angle of departure, and an angle of arrival In some embodiments, the transmitting the radar signal to the at least one reflector includes transmitting the radar signal to a first reflector and wherein the method further includes transmitting a second radar signal to a second reflector. In some embodiments, increasing the accuracy of the range estimation based on the radar signal includes implementing a fusion algorithm that calculates an estimated location of the guideway mounted vehicle based on the range estimation, the radar signal, and the second radar signal.

In some embodiments, an on-board communication system for a guideway mounted vehicle, includes: at least one wireless communication device; at least one radar device; a non-transient computer readable medium configured to store computer executable instructions; and at least one processor operably associated with the at least one wireless communication device, the at least one radar device, and the non-transient computer readable medium, wherein, when the computer executable instructions are executed by the at least one processor, the at least one processor is configured to: transmit a communication signal from the at least one wireless communication device to a wayside communication device; obtain a range estimation based on the communication signal; obtain an angle of arrival and angle of departure based on the communication signal transmit a radar signal from the at least one radar device to at least one reflector; obtain a second angle of arrival and a second angle of departure based on the radar signal; and increase an accuracy of the vehicle location estimation based on the radar signal In some embodiments, to obtain the range estimation based on the communication signal, the at least one processor is configured to obtain a signal-to-noise ratio range distance estimation that correlates the range estimation with a signal-to-noise ratio of the communication signal based on a signal to noise distribution of the communication signal. In some embodiments, the at least one reflector includes a reflector array having reflectors arranged to reflect the radar signal so that the reflected radar signal has a unique radar signature and wherein the at least one processor is configured to increase the accuracy of the vehicle location estimation based on the radar signal by: detecting the reflected radar signal; identifying the unique radar signature of the reflected radar signal; associating the wayside communication device with the unique radar signature; and obtaining a stored location of the at least one of the at least one reflector based on the unique radar signature. In some embodiments, the at least one processor is configured to increase the accuracy of the vehicle location estimation based on the radar signal by: measuring the second angle of departure of the radar signal from an on-board radar to a reflector, wherein the at least one radar device comprises the on-board radar and the at least one reflector comprises the reflector; measuring the second angle of arrival of the radar signal from the reflector to the on-board radar; determining a position of the guideway mounted vehicle based on the angle of arrival of the second communication signal, the angle of departure of the second communication signal, and the range estimation. In some embodiments, the at least one processor is configured to obtain the vehicle location estimation based on the communication signal by: measuring an angle of arrival of a second communication signal from the wayside communication device to an on-board communication device; and measuring an angle of arrival of a second communication signal from the wayside communication device to an on-board communication device; and determining a position of the guideway mounted vehicle based on the angle of arrival, the angle of departure, and the range estimation. In some embodiments: the transmitting the communication signal to the wayside communication device includes transmitting the communication signal to an antenna on the wayside communication device, wherein the antenna is at least partially encapsulated by a radome that is transparent to a base frequency band of the communication signal, wherein the at least one reflector includes the radome; the transmitting the radar signal to the at least one reflector includes transmitting the radar signal to the radome of the wayside communication device, wherein the radome is retroreflective at a base frequency band of the radar signal.

In some embodiments, a method of locating a guideway mounted vehicle, the method includes: transmitting a communication signal to an antenna on a wayside communication device, wherein the antenna is at least partially encapsulated by a radome that is transparent to a base frequency band of the communication signal; obtaining a range estimation based on the communication signal; transmitting a radar signal to the wayside communication device, wherein the radome is retroreflective at a base frequency band of the radar signal; and increasing an accuracy of the range estimation based on the radar signal. In some embodiments, obtaining the range estimation based on the communication signal includes obtaining the range estimation based on a signal to noise distribution of the communication signal as a result of a range between the wayside communication device and an on-board communication device that transmits the communication signal.

In some embodiments, a method of locating a guideway-mounted vehicle, the method includes: transmitting a communication signal between an on-board communication device and a wayside communication device; obtaining a vehicle location estimation based on the communication signal; transmitting a radar signal to at least one reflective surface; and increasing an accuracy of the vehicle location estimation based on the radar signal. In some embodiments, the transmitting the communication signal between the on-board communication device and the wayside communication device, includes: transmitting the communication signal from the on-board communication device to the wayside communication device. In some embodiments, the obtaining the vehicle location estimation based on the communication signal, includes: receiving a second communication signal from the wayside communication device to the on-board communication device in response to the communication signal transmitted from the on-board communication device, wherein the second communication signal is modulated to include a unique identification for the wayside communication device; obtaining the unique identification of the wayside communication device from the second communication signal; obtaining location data that identifies a wayside location of the wayside communication device based on the unique identification; and compute the vehicle location estimation based on the location data and at least one of the communication signal and the second communication signal. In some embodiments, the transmitting the communication signal between the on-board communication device and the wayside communication device, includes: transmitting the communication signal from the wayside communication device to the on-board communication device. In some embodiments, the communication signal is modulated to include a unique identification of the wayside communication device wherein the obtaining the vehicle location estimation based on the communication signal, includes: obtaining the unique identification of the wayside communication device from the second communication signal; obtaining location data that identifies a wayside location of the wayside communication device based on the unique identification; and transmitting a second communication signal from the on-board communication device to the wayside communication device in response to the communication signal transmitted from the wayside communication device; compute the vehicle location estimation based on the location data and at least one of the communication signal and the second communication signal. In some embodiments, the at least one reflective surface includes at least one reflector at a wayside of a guideway wherein the transmitting the radar signal to the at least one reflective surface, includes: transmitting the radar signal from an on-board radar system to the at least one reflector. In some embodiments, the increasing the accuracy of the vehicle location estimation based on the radar signal, includes detecting the reflected radar signal; identify a unique radar signature of the at least one reflector from the reflected radar signal; obtain location data of the at least one reflector or the wayside communication device from a database based on the unique radar signature; and compute the vehicle location estimation based on the radar signal and the location data. In some embodiments, the at least one reflector includes at least one retroreflector at the wayside of the guideway. In some embodiments: the wayside communication device includes one or more antennas; and the at least one reflector includes a radome that at least partially encapsulates the one or more antennas. In some embodiments, the at least one reflective surface includes at least one guideway-mounted vehicle surface and wherein the transmitting the radar signal to the at least one reflective surface, includes transmitting the radar signal from a wayside radar system to the at least one guideway-mounted vehicle surface. In some embodiments, the increasing the accuracy of the vehicle location estimation based on the radar signal, includes: detecting the reflected radar signal; obtaining a unique radar signature of the guideway-mounted vehicle; obtaining location data that identifies a location of the wayside communication device or of the wayside radar system; compute the vehicle location estimation based on the radar signal and the location data.

In some embodiments, a method of locating a guideway-mounted vehicle, includes: transmitting a first signal from an on-board device to a wayside device; transmitting a second signal from the wayside device to the on-board device; obtaining a first vehicle location estimation based on the first signal; obtaining a second vehicle location estimation based on the second signal; comparing the first vehicle location estimation and the second vehicle location estimation to determine whether a difference between the first vehicle location estimation and the second vehicle location estimation are within a defined error range. In some embodiments, the method further includes: implementing a fusion algorithm to calculate a third vehicle location estimation based on the first vehicle location estimation and the second vehicle location estimation. In some embodiments: the on-board device includes an on-board communication device; the first signal includes a first communication signal; the wayside device includes a wayside communication device; the second signal includes a second communication signal. In some embodiments, the method further includes: transmitting a first radar signal from an on-board radar system to at least one reflector; transmitting a second radar signal from the wayside radar system to at least one reflective surface of the guideway-mounted vehicle; obtaining a third vehicle location estimation based on the first radar signal; obtaining a fourth vehicle location estimation based on the second radar signal; wherein the comparing the first vehicle location estimation and the second vehicle location estimation to determine whether the difference between the first vehicle location estimation and the second vehicle location estimation are within a defined error range includes comparing the first vehicle location estimation, the second vehicle location estimation, the third vehicle location estimation, and the fourth vehicle location estimation to determine whether differences between the first vehicle location estimation, the second vehicle location estimation, the third vehicle location estimation, and the fourth vehicle location estimation are within the error range. In some embodiments, the method further includes: implementing a fusion algorithm to calculate a fifth vehicle location estimation based on the first vehicle location estimation, the second vehicle location estimation, the third vehicle location estimation, and the fourth vehicle location estimation. In some embodiments, the method further includes: the on-board device includes an on-board radar system; the first signal includes a first radar signal; the wayside device includes a wayside radar system; the second signal includes a second radar signal.

In some embodiments, a method of locating a guideway-mounted vehicle, includes: transmitting a communication signal to an on-board communication device; obtaining a vehicle location estimation based on the communication signal; transmitting a radar signal to at least one reflective surface of the guideway-mounted vehicle; and increasing an accuracy of the range estimation based on the radar signal.

In some embodiments, a method of locating a guideway-mounted vehicle includes: transmitting a radar signal from an on-board radar device to at least one reflector; obtaining a vehicle location estimation based on the radar signal; and measuring the vehicle speed estimation based on the radar signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of locating a guideway-mounted vehicle, the method comprising:
   obtaining a vehicle location estimation based on one or more RF communication signals between the guideway-mounted vehicle and a wayside communication device;
   transmitting a radar signal to a reflector array, the reflector array being associated with the wayside communication device and including a plurality of reflectors;
   receiving one or more reflected radar signals corresponding to an interaction between the radar signal and the reflector array;
   identifying a location of the reflector array based on a radar signature of the one or more reflected radar signals;
   determining one or more distances between the guideway-mounted vehicle and the reflector array based on the one or more reflected radar signals, one or more angles of arrival of the one or more reflected radar signals, or both; and
   increasing an accuracy of the vehicle location estimation based on the identified location of the reflector array, the one or more distances, the one or more angles of arrival, or a combination thereof,
   wherein:
   the one or more RF communication signals are within a first base frequency band,
   the radar signal is within a second base frequency band,
   the second base frequency band is higher than the first base frequency band,
   the radar signature is based on a spatial separation of the plurality of reflectors, radar cross sections of the plurality of reflectors, or a combination thereof,
   an antenna of the wayside communication device for transmitting or receiving one of the one or more RF communication signals is at least partially encapsulated by a radome,
   the radome is configured to be transparent to the first base frequency band and retroreflective within the second base frequency band, and
   the radome is configured as a reflector of the reflector array.

2. The method of claim 1, wherein:
   the obtaining the vehicle location estimation based on includes:
   obtaining a signal-to-noise ratio of the one or more RF communication signals; and
   obtaining a range estimation between the guideway-mounted vehicle and the wayside communication device based on a signal-to-noise ratio range distance correlation that correlates the range estimation with the signal-to-noise ratio of the on or more RF communication signals.

3. The method of claim 1, wherein:
   the identifying the location of the reflector array comprises:
   identifying the radar signature of the one or more reflected radar signals; and
   obtaining the location of the reflector array that is stored in association with the wayside communication device and the radar signature.

4. The method of claim 1, wherein:
   the obtaining the vehicle location estimation includes:
   measuring a time of flight from an on-board communication device of the guideway-mounted vehicle to the wayside communication device and back to the on-board communication device based on the one or more RF communication signals; and
   determining a range estimation between the guideway-mounted vehicle and the wayside communication device based on the time of flight.

5. The method of claim 1, wherein:
   the determining the one or more distances between the guideway-mounted vehicle and the reflector array includes:
   measuring a set of time of flight from an on-board radar system of the guideway-mounted vehicle to corresponding reflectors of the reflector array and back to the on-board radar system; and
   determining a set of distances between the guideway-mounted vehicle and the corresponding reflectors of the reflector array as the one or more distances based on the set of time of flight.

6. The method of claim 1, wherein:
the obtaining the vehicle location estimation further comprises:
measuring an angle of departure of a first subset of the one or more RF communication signals from an on-board communication device to the wayside communication device; or
measuring an angle of arrival of a second subset of the one or more RF communication signals from the wayside communication device to the on-board communication device, and
the vehicle location estimation is determined further based on the angle of departure, the angle of arrival, or both.

7. The method of claim 1, wherein:
the first base frequency band for the one or more RF communication signals is between 500 MHz to 65 GHz; and
the second base frequency band for the radar signal is between 76 GHz to 81 GHz.

8. The method of claim 1, wherein:
the radome is based on a frequency selective surface material.

9. The method of claim 1, further comprising:
identifying, based on the vehicle location estimation, a window in which the reflector array is expected to reside,
wherein the transmitting the radar signal to the reflector array is based on the identified window.

10. The method of claim 1, wherein:
the spatial separation of the plurality of reflectors corresponds to
the plurality of reflectors being aligned with respect to a first axis along a track direction and spaced apart with respect to a second axis perpendicular to the track direction,
the plurality of reflectors being aligned with respect to the second axis and spaced apart with respect to the first axis, or
the plurality of reflectors being spaced apart with respect to the first axis and the second axis.

11. The method of claim 1, wherein:
the radar cross sections of the plurality of reflectors correspond to the plurality of reflectors having different radar cross sections.

12. An on-board communication system for a guideway-mounted vehicle, comprising:
at least one wireless RF communication device;
at least one radar device;
a non-transient computer-readable medium configured to store computer-executable instructions; and
at least one processor operably associated with the at least one wireless RF communication device, the at least one radar device, and the non-transient computer-readable medium, wherein, when the computer-executable instructions are executed by the at least one processor, the at least one processor is configured to:
obtain a vehicle location estimation based on one or more RF communication signals between the guideway-mounted vehicle and a wayside communication device;
transmit a radar signal from the at least one radar device to a reflector array, the reflector array being associated with the wayside communication device and including a plurality of reflectors;
receive one or more reflected radar signals corresponding to an interaction between the radar signal and the reflector array;
identify a location of the reflector array based on a radar signature of the one or more reflected radar signals;
determine one or more distances between the guideway-mounted vehicle and the reflector array based on the one or more reflected radar signals, one or more angles of arrival of the one or more reflected radar signals, or both; and
increase an accuracy of the vehicle location estimation based on identified location of the reflector array, the one or more distances, the one or more angles of arrival, or a combination thereof,
wherein:
the one or more RF communication signals are within a first base frequency band,
the radar signal is within a second base frequency band,
the second base frequency band is higher than the first base frequency band,
the radar signature is based on a spatial separation of the plurality of reflectors, radar cross sections of the plurality of reflectors, or a combination thereof,
an antenna of the wayside communication device for transmitting or receiving one of the one or more RF communication signals is at least partially encapsulated by a radome,
the radome is configured to be transparent to the first base frequency band and retroreflective within the second base frequency band, and
the radome is configured as a reflector of the reflector array.

13. The on-board communication system of claim 12, wherein:
to obtain the vehicle location estimation, the at least one processor is configured to:
obtain a signal-to-noise ratio of the one or more RF communication signals; and
obtain a range estimation between the guideway-mounted vehicle and the wayside communication device based on a signal-to-noise ratio range distance correlation that correlates the range estimation with the signal-to-noise ratio of the one or more RF communication signals.

14. The on-board communication system of claim 12, wherein:
to identify the location of the reflector array, the at least one processor is configured to:
identify the radar signature of the one or more reflected radar signals; and
obtain the location of the reflector array that is stored in association with the wayside communication device and the radar signature.

15. The on-board communication system of claim 12, wherein:
to obtain the vehicle location estimation, the at least one processor is configured to:
measure an angle of departure of a first subset of the one or more RF communication signals from the wayside communication device to an on-board communication device; or
measure an angle of arrival of a second subset of the one or more RF communication signals from the wayside communication device to an on-board communication device, and the vehicle location estimation is determined further based on the angle of departure, the angle of arrival, or both.

16. The on-board communication system of claim 12, wherein:
the radome is based on a frequency selective surface material.

17. The on-board communication system of claim 12, wherein:
the at least one processor is configured to identify, based on the vehicle location estimation, a window in which the reflector array is expected to reside, and
wherein the radar signal is transmitted to the reflector array based on the identified window.

18. The on-board communication system of claim 12, wherein:
to obtain the vehicle location estimation, the at least one processor is configured to:
measure a time of flight from the guideway-mounted vehicle to the wayside communication device and back to the guideway-mounted vehicle based on the one or more RF communication signals; and
determine a range estimation between the guideway-mounted vehicle and the wayside communication device based on the time of flight.

19. The on-board communication system of claim 12, wherein:
to determine the one or more distances between the guideway-mounted vehicle and the reflector array, the at least one processor is configured to:
measure a set of time of flight from an on-board radar system of the guideway-mounted vehicle to corresponding reflectors of the reflector array and back to the on-board radar system; and
determine a set of distances between the guideway-mounted vehicle and the corresponding reflectors of the reflector array as the one or more distances based on the set of time of flight.

20. The on-board communication system of claim 12, wherein:
the first base frequency band for the one or more RF communication signals is between 500 MHz to 65 GHz; and
the second base frequency band for the radar signal is between 76 GHz to 81 GHz.

21. The on-board communication system of claim 12, wherein:
the spatial separation of the plurality of reflectors corresponds to
the plurality of reflectors being aligned with respect to a first axis along a track direction and spaced apart with respect to a second axis perpendicular to the track direction,
the plurality of reflectors being aligned with respect to the second axis and spaced apart with respect to the first axis, or
the plurality of reflectors being spaced apart with respect to the first axis and the second axis.

22. The on-board communication system of claim 12, wherein:
the radar cross sections of the plurality of reflectors correspond to the plurality of reflectors having different radar cross sections.

23. A method of locating a guideway-mounted vehicle, the method comprising:
transmitting an RF communication signal from the guideway-mounted vehicle to an antenna on a wayside communication device, wherein the RF communication signal is within a first base frequency band, the antenna is at least partially encapsulated by a radome, the radome is based on a frequency selective surface material, and the radome is configured to be transparent to the first base frequency band;
obtaining a first range estimation based on at least one of a signal strength or a time of flight of the RF communication signal;
transmitting a radar signal from the guideway-mounted vehicle to a reflector array associated with the wayside communication device, wherein the reflector array includes a plurality of reflectors, the radar signal is within a second base frequency band, the radome is retroreflective within the second base frequency band, and the radome is configured as a reflector of the reflector array;
receiving one or more reflected radar signals corresponding to an interaction between the radar signal and the reflector array;
identifying a location of the reflector array based on a radar signature of the one or more reflected radar signals;
obtaining a second range estimation based on the one or more reflected radar signals, the second range estimation corresponding to a distance between the guideway-mounted vehicle and the radome; and
determining a vehicle location estimation based on the identified location of the reflector array, the first range estimation, and the second range estimation,
wherein:
the second base frequency band is higher than the first base frequency band, and
the radar signature is based on a spatial separation of the plurality of reflectors, radar cross sections of the plurality of reflectors, or a combination thereof.

24. The method of claim 23, wherein:
the obtaining the first range estimation is based on a signal-to-noise distribution of the RF communication signal.

25. A method of locating a guideway-mounted vehicle, the method comprising:
transmitting, by an on-board communication device of the guideway-mounted vehicle, a first RF communication signal to a wayside communication device;
receiving, by the on-board communication device, a second RF communication signal from the wayside communication device in response to the first RF communication signal, wherein the first RF communication signal and the second RF communication signal are within a first base frequency band;
obtaining a vehicle location estimation based on the first RF communication signal, the second RF communication signal, or both;
transmitting a radar signal to a reflector array, the reflector array being associated with the wayside communication device and including a plurality of reflectors, wherein the radar signal is within a second base frequency band;
receiving one or more reflected radar signals corresponding to an interaction between the radar signal and the reflector array;
identifying a location of the reflector array based on a radar signature of the one or more reflected radar signals;
determining one or more distances between the guideway-mounted vehicle and the reflector array based on the one or more reflected radar signals, one or more angles of arrival of the one or more reflected radar signals, or both; and increasing an accuracy of the vehicle location estimation based on the identified location of the reflector array, the one or more distances, the one or more angles of arrival, or a combination thereof, wherein:

the second base frequency band is higher than the first base frequency band, the radar signature is based on a spatial separation of the plurality of reflectors, radar cross sections of the plurality of reflectors, or a combination thereof, an antenna of the wayside communication device for the first RF communication signal or the second RF communication signal is at least partially encapsulated by a radome, the radome is configured to be transparent to the first base frequency band and retroreflective within the second base frequency band, and the radome is configured as a reflector of the reflector array.

26. The method of claim 25, wherein:

the second RF communication signal is modulated to include a unique identification of the wayside communication device, and the obtaining the vehicle location estimation includes:
  obtaining the unique identification of the wayside communication device from the second RF communication signal;
  obtaining location data that identifies a wayside location of the wayside communication device based on the unique identification; and
  computing the vehicle location estimation based on the location data and at least one of the first RF communication signal and the second RF communication signal.

27. The method of claim 25, further comprising:

identifying, based on the vehicle location estimation, a window in which the reflector array is expected to reside, wherein the transmitting the radar signal to the reflector array is based on the identified window.

28. The method of claim 25, wherein:

the spatial separation of the plurality of reflectors corresponds to
  the plurality of reflectors being aligned with respect to a first axis along a track direction and spaced apart with respect to a second axis perpendicular to the track direction,
  the plurality of reflectors being aligned with respect to the second axis and spaced apart with respect to the first axis, or
  the plurality of reflectors being spaced apart with respect to the first axis and the second axis.

29. The method of claim 25, wherein:

the radar cross sections of the plurality of reflectors correspond to the plurality of reflectors having different radar cross sections.

30. A method of locating a guideway-mounted vehicle, comprising:

receiving, by an on-board communication device of the guideway-mounted vehicle, an RF communication signal from a wayside device, wherein the RF communication signal is within a first base frequency band;

obtaining a vehicle location estimation based on at least one of a signal strength or a time of flight of the RF communication signal;

transmitting a radar signal to a reflector array, the reflector array being associated with the wayside device and including a plurality of reflectors, and the radar signal being within a second base frequency band;

receiving one or more reflected radar signals corresponding to an interaction between the radar signal and the reflector array;

identifying a location of the reflector array based on a radar signature of the one or more reflected radar signals;

determining one or more distances between the guideway-mounted vehicle and the reflector array based on the one or more reflected radar signals, one or more angles of arrival of the one or more reflected radar signals, or both; and increasing an accuracy of the vehicle location estimation based on the identified location of the reflector array, the one or more distances, the one or more angles of arrival, or a combination thereof, wherein:

the second base frequency band is higher than the first base frequency band, the radar signature is based on a spatial separation of the plurality of reflectors, radar cross sections of the plurality of reflectors, or a combination thereof, an antenna of the wayside device for the RF communication signal is at least partially encapsulated by a radome, the radome is configured to be transparent to the first base frequency band and retroreflective within the second base frequency band, and the radome is configured as a reflector of the reflector array.

31. A method of locating a guideway-mounted vehicle, the method comprising:

transmitting an RF communication signal from an on-board communication device of the guideway-mounted vehicle to a wayside device, the wayside device including an antenna, wherein the RF communication signal is within a first base frequency band;

obtaining a first vehicle location estimation based on the RF communication signal;

transmitting a radar signal from an on-board radar device of the guideway-mounted vehicle to a reflector array, the reflector array being associated with the wayside device and including a plurality of reflectors, the radar signal being within a second base frequency band, and a reflector of the reflector array being a radome at least partially encapsulating the antenna of the wayside device;

receiving one or more reflected radar signals corresponding to an interaction between the radar signal and the reflector array;

determining a unique identity of the reflector array based on a radar signature of the one or more reflected radar signals;

obtaining a known location of the reflector array from a database based on the unique identity of the reflector array;

obtaining a second vehicle location estimation based on the one or more reflected radar signals and the known location of the reflector array; and obtaining a vehicle speed estimation based on the one or more reflected radar signals from the reflector array, wherein:
the radar signature is based on a spatial separation of the plurality of reflectors, radar cross sections of the plurality of reflectors, or a combination thereof, and
the radome is configured to be transparent to the first base frequency band and retroreflective within the second base frequency band.

\* \* \* \* \*